United States Patent
Nieschwitz et al.

(10) Patent No.: US 11,096,534 B2
(45) Date of Patent: Aug. 24, 2021

(54) CENTRAL VACUUM SYSTEM AND INLET VALVES THEREFOR

(71) Applicant: H-P Products, Inc., Louisville, OH (US)

(72) Inventors: Darrell V. Nieschwitz, Louisville, OH (US); Greg A. Calderone, Canton, OH (US); Shawn C. Metz, Louisville, OH (US)

(73) Assignee: H-P Products, Inc., Louisville, OH (US)

( * ) Notice: Subject to any disclaimer, the term of this patent is extended or adjusted under 35 U.S.C. 154(b) by 231 days.

(21) Appl. No.: 16/287,168

(22) Filed: Feb. 27, 2019

(65) Prior Publication Data

US 2019/0191946 A1   Jun. 27, 2019

Related U.S. Application Data

(63) Continuation of application No. 15/886,319, filed on Feb. 1, 2018, now Pat. No. 10,820,763, which is a continuation-in-part of application No. 15/675,228, filed on Aug. 11, 2017, now Pat. No. 10,433,690, application No. 16/287,168, which is a continuation-in-part of application No. 14/570,159, filed on Jan. 15, 2014, now Pat. No. 9,782,047.

(60) Provisional application No. 62/457,558, filed on Feb. 10, 2017, provisional application No. 61/923,949, filed on Jan. 6, 2014.

(51) Int. Cl.
*A47L 5/38* (2006.01)
*A47L 9/00* (2006.01)
*B60P 3/36* (2006.01)
*A47L 9/24* (2006.01)
*F16L 29/00* (2006.01)
*B60S 1/64* (2006.01)

(52) U.S. Cl.
CPC ............... *A47L 5/38* (2013.01); *A47L 9/0063* (2013.01); *A47L 9/242* (2013.01); *A47L 9/244* (2013.01); *B60P 3/36* (2013.01); *F16L 29/00* (2013.01); *B60S 1/64* (2013.01)

(58) Field of Classification Search
CPC .......... A47L 9/242; A47L 9/244; A47L 9/246; A47L 5/38; A47L 9/0063; B60P 3/36; F16L 29/00; B60S 1/64
See application file for complete search history.

(56) References Cited

U.S. PATENT DOCUMENTS

| | | |
|---|---|---|
| 2,953,806 A | 7/1958 | Walker |
| 2,943,698 A | 7/1960 | Bishop |
| 3,173,164 A | 3/1965 | Congdon |

(Continued)

FOREIGN PATENT DOCUMENTS

DE    102014119249    6/2006

*Primary Examiner* — Andrew A Horton
(74) *Attorney, Agent, or Firm* — Sand, Sebolt & Wernow Co., LPA

(57) ABSTRACT

A central vacuum cleaning system includes an inlet valve mounted at various locations in a structure or RV and connected to the inlet end of a vacuum conduit. A section of hose is slidably mounted within the conduit and extends from the inlet valve for cleaning an adjacent area. The hose includes a hose plug connected with a distal end of the hose. The hose plug includes an annular channel and an orthogonally aligned slot. The hose plug may also include a first seal and a second seal.

16 Claims, 40 Drawing Sheets

(56) References Cited

U.S. PATENT DOCUMENTS

| | | | |
|---|---|---|---|
| 3,353,996 A | 11/1967 | Hamrick | |
| 3,464,858 A | 9/1969 | Hamrick | |
| 3,520,725 A | 7/1970 | Hamrick | |
| 3,565,103 A | 2/1971 | Maselek | |
| 3,593,363 A | 7/1971 | Hamrick | |
| 3,676,986 A | 7/1972 | Reiling | |
| 4,050,113 A | 9/1977 | Wright et al. | |
| 4,213,479 A | 7/1980 | Pearson | |
| 4,336,427 A | 6/1982 | Lindsay | |
| 4,664,457 A | 5/1987 | Suchy | |
| 4,688,596 A | 8/1987 | Liebmann et al. | |
| 5,784,750 A | 7/1998 | Sankovic et al. | |
| 6,459,056 B1 * | 10/2002 | Graham | A47L 5/38 15/314 |
| 7,010,829 B2 | 3/2006 | Harman et al. | |
| 7,624,472 B2 | 12/2009 | Ambrose | |
| 7,945,990 B2 | 5/2011 | Gabric et al. | |
| 3,001,650 A1 | 8/2011 | Trotter | |
| 8,479,353 B2 | 7/2013 | Drivstuen et al. | |
| 8,590,098 B2 | 11/2013 | Smith et al. | |
| 2006/0169322 A1 | 8/2006 | Torkelson | |
| 2007/0017057 A1 | 1/2007 | Zimmerle et al. | |
| 2014/0150889 A1 | 6/2014 | Ragner | |
| 2014/0259509 A1 | 9/2014 | Harman | |

* cited by examiner

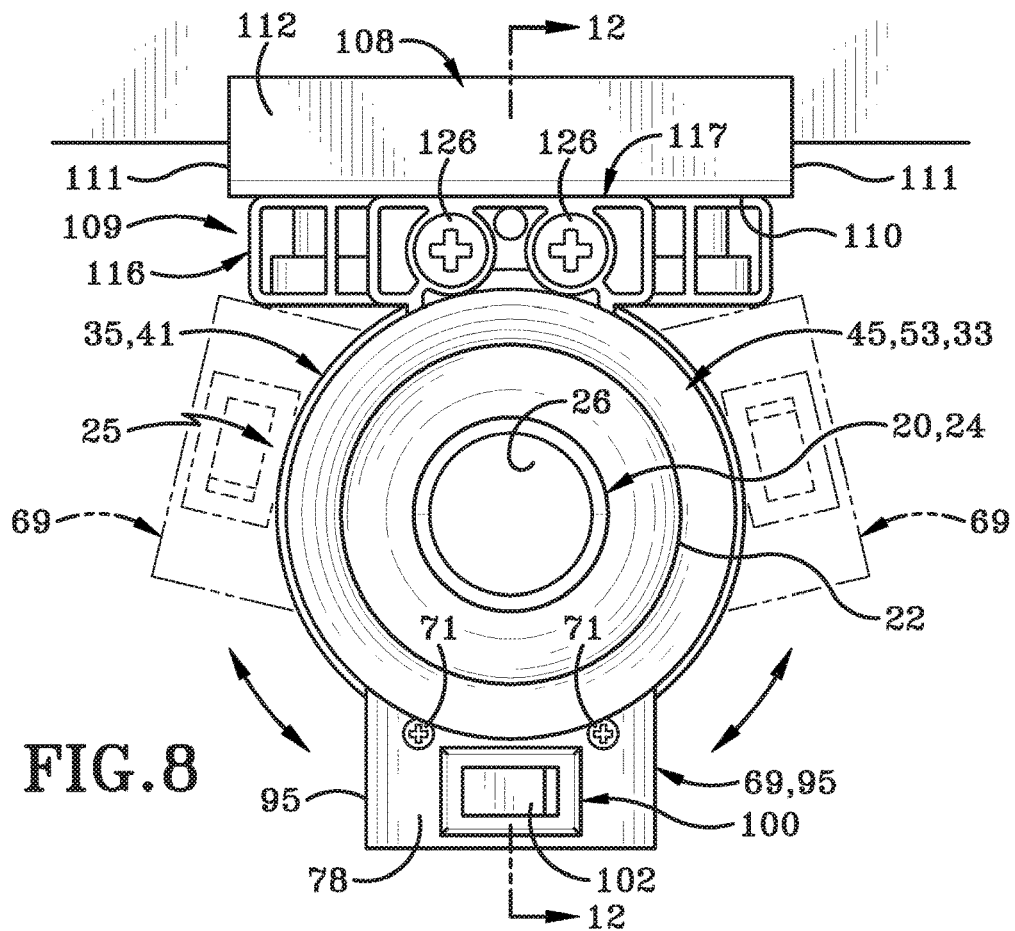
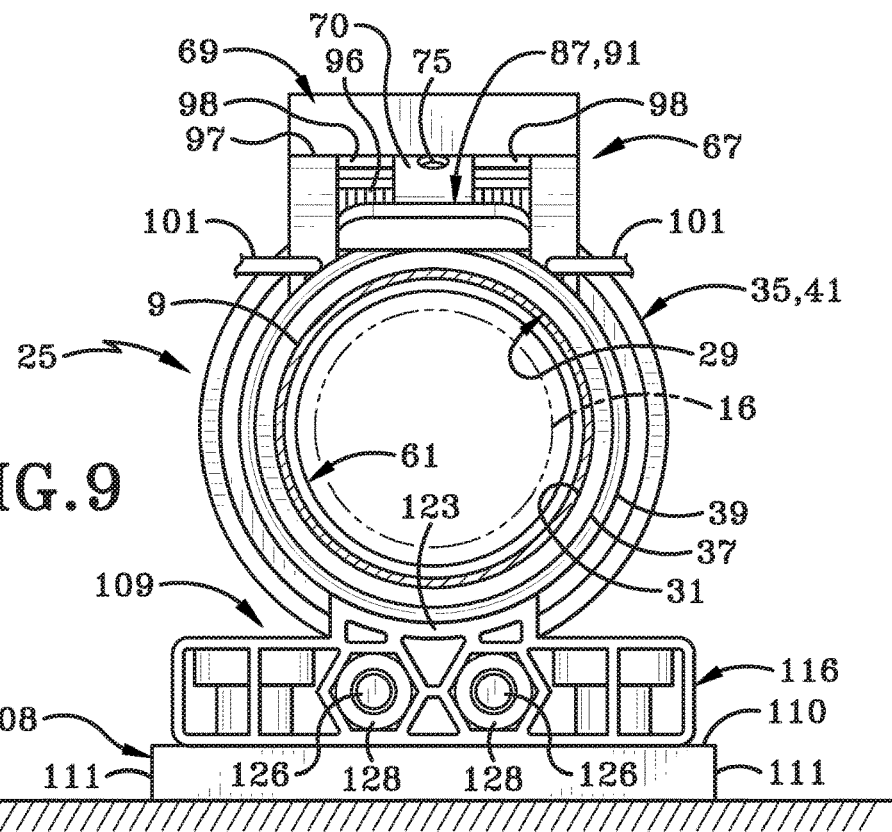

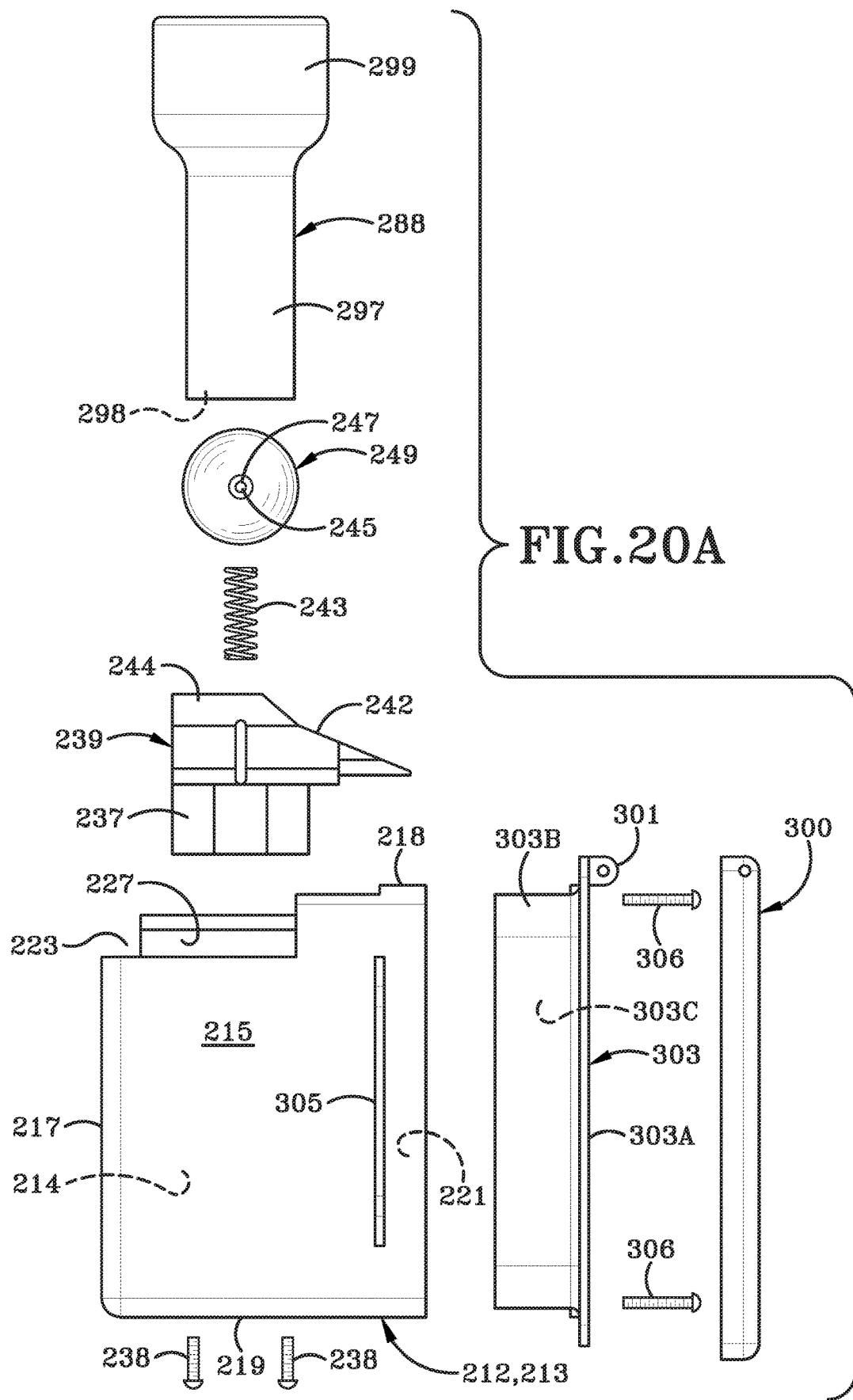

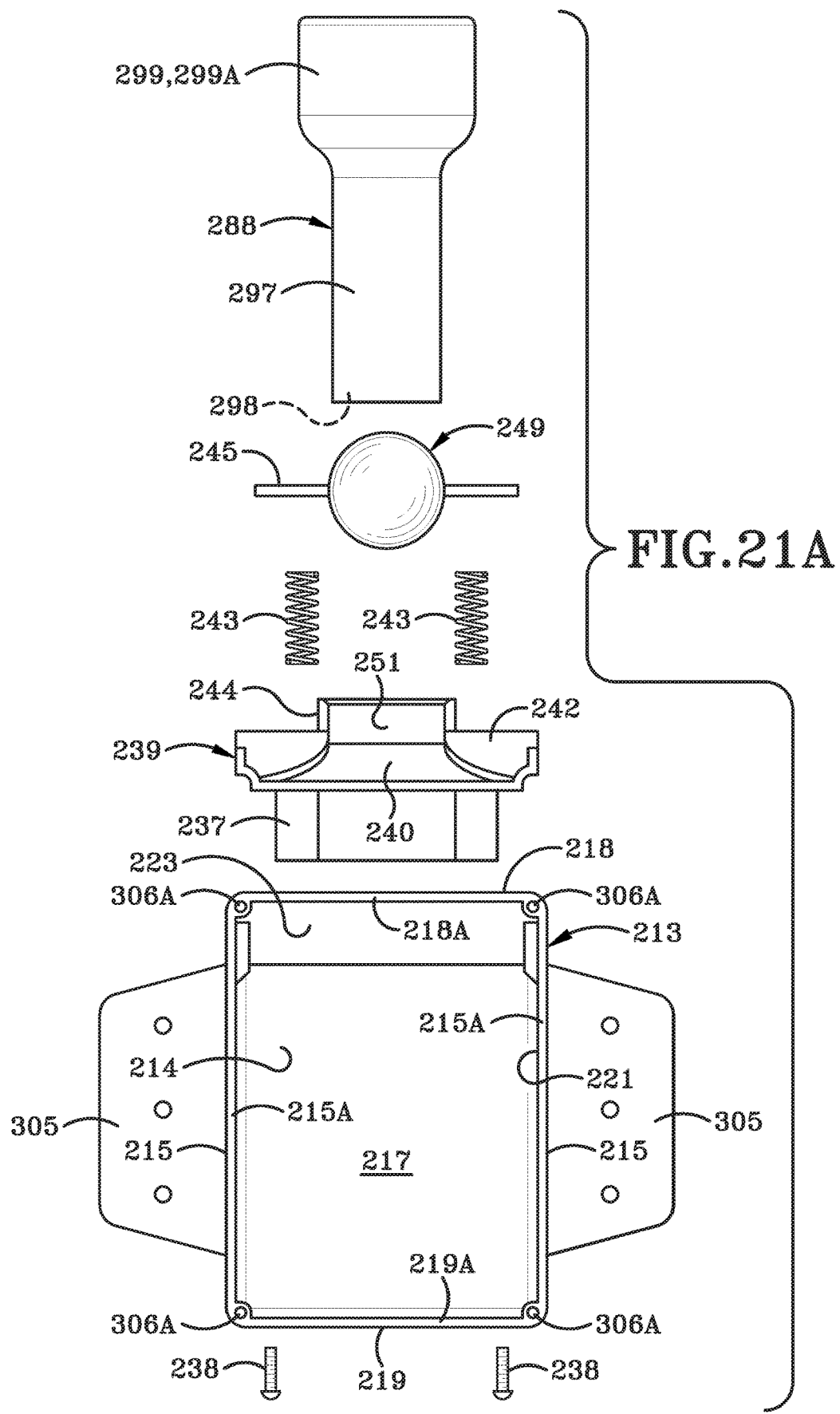

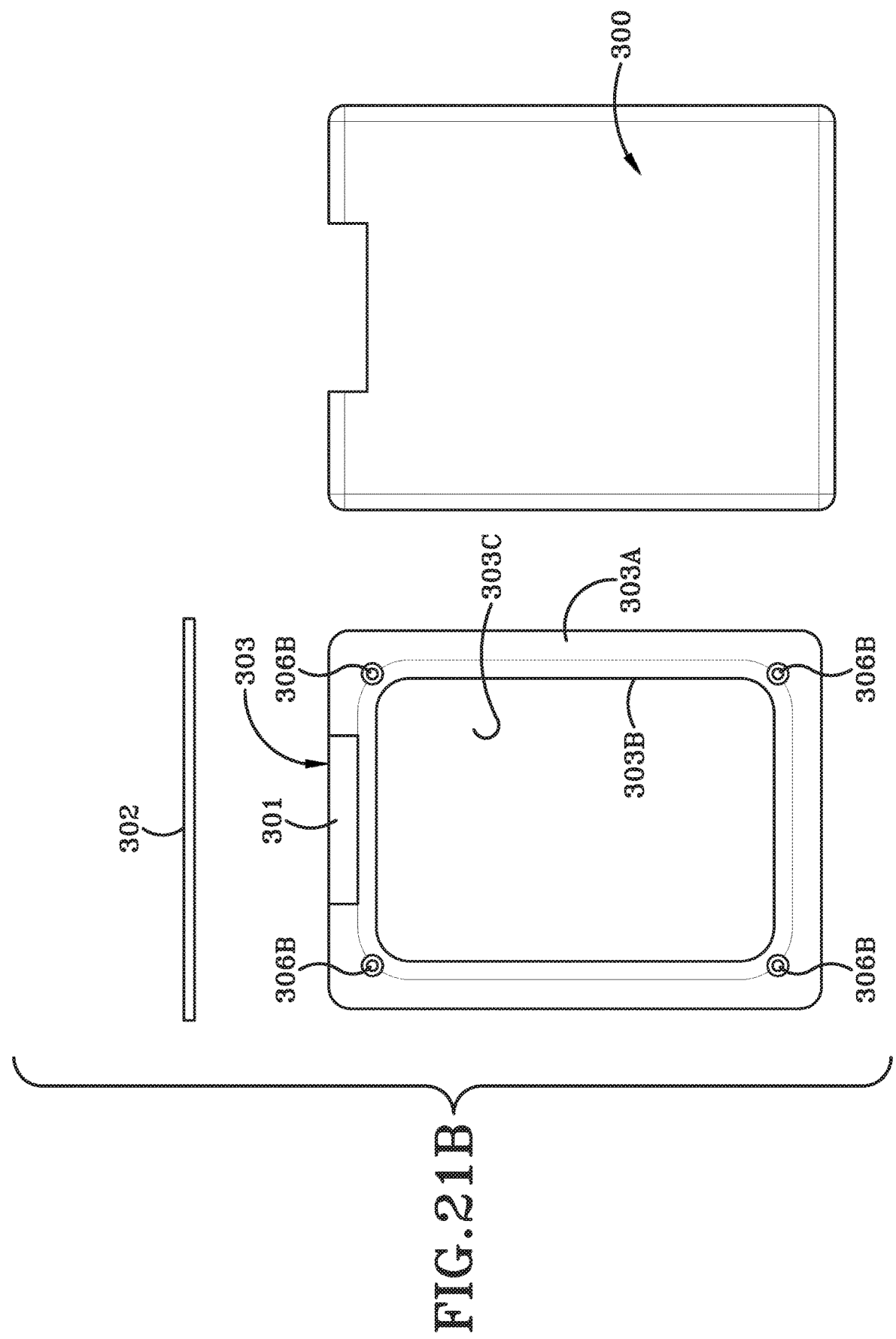

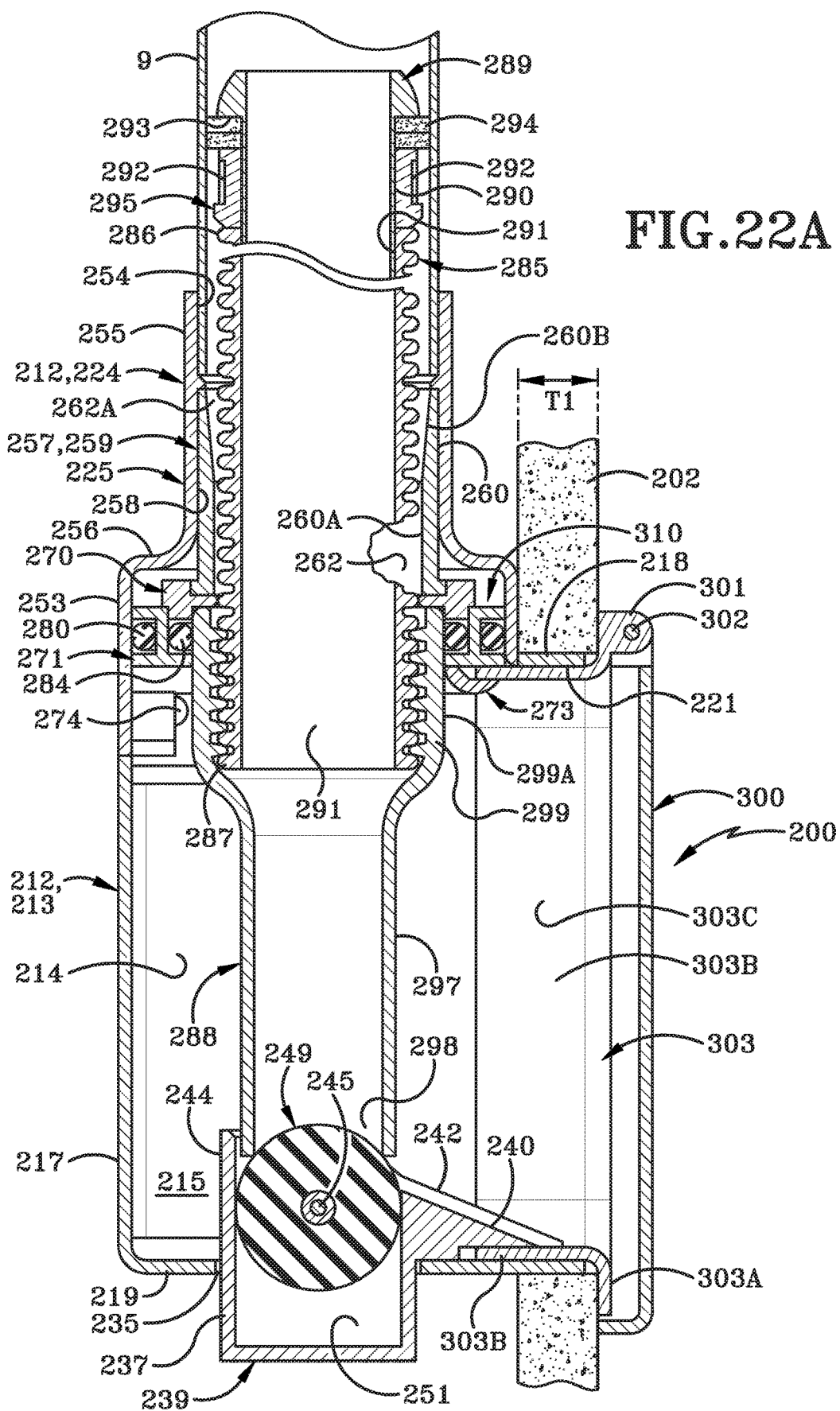

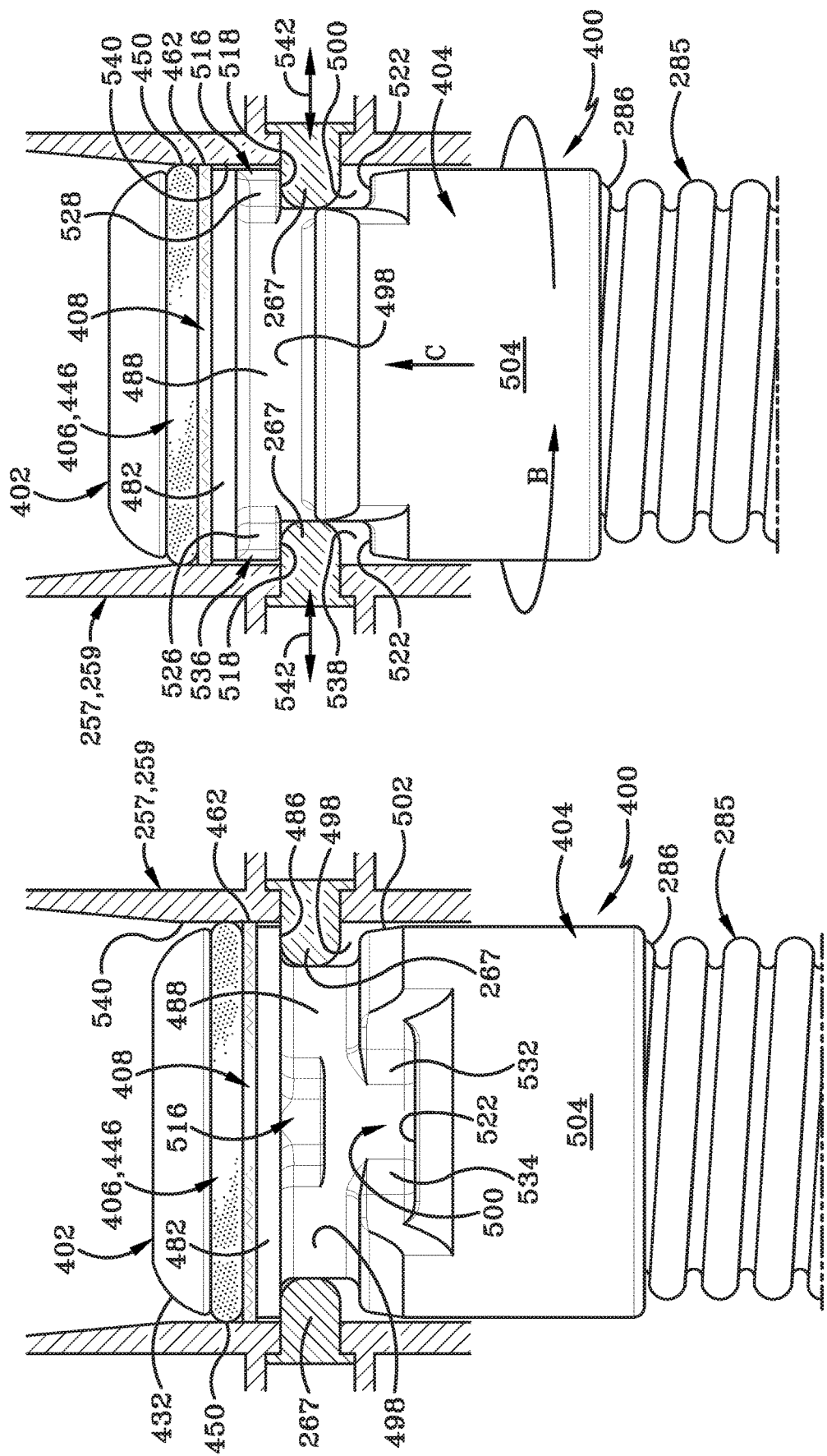

CENTRAL VACUUM SYSTEM AND INLET VALVES THEREFOR

CROSS REFERENCES TO RELATED APPLICATIONS

This application is a continuation application of U.S. patent application Ser. No. 15/886,319 filed on Feb. 1, 2018, which is a continuation-in-part of U.S. patent application Ser. No. 15/675,228 filed on Aug. 11, 2017, which claims the benefit of U.S. Provisional Patent Application Ser. No. 62/457,558, filed Feb. 10, 2017; the disclosures of which are entirely incorporated herein by reference.

This application also is a continuation-in-part application of U.S. patent application Ser. No. 14/570,159, filed Dec. 15, 2014 (now U.S. Pat. No. 9,782,047), which claims the benefit of U.S. Provisional Patent Application Ser. No. 61/923,949, filed Jan. 6, 2014, the disclosures of which are entirely incorporated herein by reference.

BACKGROUND

Technical Field

The invention relates to a central vacuum cleaning system, including inlet valves therefor which can be mounted on a structure in a variety of positions and connected to the inlet end of a vacuum conduit for holding the handle of a vacuum cleaning hose which is slidably mounted within the conduit when the hose is in a retracted position, and which seals the outlet end of a debris pickup nozzle handle and the vacuum conduit enabling the inlet valve to be of an open non-sealed construction and used in multiple inlet valve cleaning systems, and which provides a locking mechanism for releasably securing the hose in an extended condition from the conduit.

Background Information

Central vacuum systems for home and commercial use have been used for many years, examples of which are shown in U.S. Pat. Nos. 2,943,698 and 3,173,164. These systems generally are comprised of a main vacuum source which is usually mounted in the basement or other locations in the structure or closely adjacent thereto. The vacuum source is connected to various dedicated inlet valves in the structure by conduits or tubing. These inlet valves, also referred to valve boxes in the industry, are mounted in a wall, inside of a cabinet or in and on other structures by various types of flanges, brackets etc. Some examples are shown in U.S. Pat. Nos. 2,953,806, 3,520,725, 4,336,427, 6,459,056, and 7,624,472.

More recently, many of these vacuum systems use a hose that is slidably moveable and contained within the vacuum conduit and expandable therefrom, so that the hose is pulled from the conduit for cleaning an area and then retracted back into the vacuum conduit for storage after use. Some examples of such systems are shown in U.S. Pat. Nos. 2,953,806, 7,010,829, and 8,001,650. These systems have a handle or debris pickup nozzle which is attached to the end of the hose and which is retained in or stored closely adjacent to the inlet valve or on other types of supporting brackets or cradles when not in use, such as shown in the above-mentioned patents. Also, some of these prior art systems and inlet valves are provided with some type of locking mechanism to secure the hose in an extended position such as shown by the manually actuated locking mechanism of U.S. Pat. No. 7,010,829 or an external locking loop as shown in U.S. Pat. No. 8,590,098.

Heretofore, these inlet valves or valve boxes are sealed from the ambient atmosphere by a relatively air-tight box and closure door to seal the vacuum from the surrounding atmosphere. This air-tight sealing arrangement for the stored nozzle enables the vacuum system to be maintained operational for other inlet valves located throughout the structure which are also connected to the same vacuum source by the rigid tubing or flexible conduits. This air-tight sealing arrangement is necessary to maintain the vacuum operational throughout the system, but requires a more complicated and expensive inlet valve box than desirable for many applications and installations.

Thus, it is desirable to provide an inlet valve which can be open to the surrounding atmosphere in which the debris pickup nozzle is stored when not in use, which enables the other inlet valves of the vacuum cleaning system throughout the structure to be operational, and which will eliminate any noise or other problems that are associated with such prior art sealed inlet boxes.

Central vacuum cleaning systems also are becoming popular in recreational vehicles and camping trailers. However, one problem is that space is very limited and it is difficult to install the rigid type of vacuum supply conduits as used in most residential and commercial buildings. Furthermore, storage space for the cleaning hose and nozzle handle attached to the inlet end thereof is at a premium in these RVs. Also it is difficult to find an area within the RV to secure the handle when not in use as well as sealing the inlet end of the conduit when used in multiple vacuum inlets within the RV. Although prior art pneumatic systems for structures and RVs with an associated locking mechanism perform satisfactory, they require numerous components and are difficult to mount in a variety of locations and on available structures.

SUMMARY

In one aspect, the present disclosure may provide An inlet valve for mounting on a structure and connected to a conduit of a vacuum cleaning system comprising: a body formed with a bore with inner and outer open ends, said inner open end adapted to be connected with the conduit of the central vacuum cleaning system; a length of flexible hose adapted to be slidably mounted within the conduit and expandable from and retractable within the conduit and moveable through the bore of the body and through the outer open end, said hose having a nozzle end and a distal end; a handle mounted on the nozzle end of the hose, said handle having an open end for picking up debris from an adjacent area; a first seal mounted in the body and engageable with the handle when the hose is in a retracted position in the conduit and the handle is in a stored position in the body to provide a substantially air-tight seal between the handle and vacuum conduit; and a second seal for sealing the open end of the handle when the handle is in the stored position in the body, said first and second seals sealing the conduit and open end of the handle from the ambient atmosphere at the inlet valve.

In another aspect, the present disclosure may provide in combination, a length of flexible hose having a nozzle end and a distal end adapted to be slidably received in a conduit of a central vacuum cleaning system; and an inlet valve box for storing a handle mounted on the nozzle end of the hose when the handle is in a stored position within the inlet valve box; said valve box including: a housing having a front opening through which the hose is extendable and retractable, said housing having a lower portion including a plurality of walls forming an interior chamber open to the ambient atmosphere; a first seal mounted within the lower portion of the housing for sealing engagement with an open end of the handle when the handle is in a stored position in the interior chamber; a second seal mounted in an upper portion of the housing for sealing engagement with the handle when the handle is in the stored position; and said first and second seals sealing the open end of the handle and the conduit from the ambient atmosphere at the inlet valve box.

In accordance with one aspect, an exemplary embodiment of the present disclosure may provide a hose plug for connection with a vacuum hose conduit comprising: a first end opposite a second end defining a longitudinal direction therebetween; a longitudinal axis extending from the first end to the second end; a first cylindrical wall defining an annular channel extending circumferentially around the longitudinal axis; a first cam disposed within the annular channel adapted to release a button from a position near the cylindrical wall; a first slot formed in the cylindrical wall in open communication with the annular channel, wherein the first slot is adapted to receive the button therein. This embodiment or another exemplary embodiment may further provide wherein the first slot is orthogonal to the annular channel. This embodiment or another exemplary embodiment may further provide a ledge defining a portion of the first slot, wherein the ledge is longitudinally aligned with the first cam. This embodiment or another exemplary embodiment may further provide a first sloped wall orthogonal to the ledge; a second sloped wall spaced from the first sloped wall and orthogonal to the ledge; wherein the first slot is defined between the first sloped wall and the second sloped wall. This embodiment or another exemplary embodiment may further provide a second cylindrical wall extending towards the second end of the hose plug from the annular channel, wherein the second cylindrical wall has a larger radius than the first cylindrical wall; wherein the first sloped wall extends between the first cylindrical wall and the second cylindrical wall; and wherein the first sloped wall extends between the first cylindrical wall and the second cylindrical wall. This embodiment or another exemplary embodiment may further provide wherein the first sloped wall is curved and the second sloped wall is curved. This embodiment or another exemplary embodiment may further provide wherein the first sloped wall has a flat slope and the second sloped has a flat slope. This embodiment or another exemplary embodiment may further provide a portion of the annular channel that extends continuously below the first cam. This embodiment or another exemplary embodiment may further provide wherein the portion of the annular channel below the first cam is in open communication with the first slot that is longitudinally aligned with the first cam adapted to allow the button to bypass the first cam and slide down into the first slot by crossing through the portion of the annular channel below the first cam. This embodiment or another exemplary embodiment may further provide a sloped wall on the first cam extending between the cylindrical wall and an outer apex on the first cam, wherein the apex is adapted to depress the button. This embodiment or another exemplary embodiment may further provide wherein the sloped wall on the first cam is curved. This embodiment or another exemplary embodiment may further provide a first seal extending circumferentially around the longitudinal axis exterior to the first cylindrical wall; a second seal extending circumferentially around the longitudinal axis exterior to the first cylindrical wall; wherein the first seal and the second seal are offset towards the first end of the hose plug from the annular channel.

In accordance with one aspect, an exemplary embodiment of the present disclosure may provide hose plug for connection with the end of a hose comprising: a first end opposite a second end defining a longitudinal direction therebetween, and the second end adapted to connect with a vacuum hose and the first end adapted to connect with vacuum conduit; a longitudinal axis extending from the first end to the second end; a cylindrical wall extending longitudinally between the first end and the second end, and the first cylindrical wall defining an interior bore adapted to receive vacuum waste therethrough after passing through the vacuum hose; a first seal extending circumferentially around the longitudinal axis exterior to the first cylindrical wall; and a second seal extending circumferentially around the longitudinal axis exterior to the first cylindrical wall. This embodiment or another exemplary embodiment may further provide wherein the first and second seals are formed from different materials. This embodiment or another exemplary embodiment may further provide an inner diameter of the first seal greater than an inner diameter of the second seal. This embodiment or another exemplary embodiment may further provide an outer diameter of the second seal greater than an outer diameter of the first seal. This embodiment or another exemplary embodiment may further provide a convex outer surface on the first seal; and a flat outer surface on the second seal. This embodiment or another exemplary embodiment may further provide wherein the first seal is an elastomeric O-ring; and wherein the second seal is a felt ring. This embodiment or another exemplary embodiment may further provide an annular channel formed in the cylindrical wall extending circumferentially around the longitudinal axis; a longitudinally aligned slot formed in the cylindrical wall orthogonal to the annular channel; and wherein the first seal and the second seal are positioned towards the first end of the hose plug from the annular channel.

In accordance with yet another aspect, an exemplary embodiment of the present disclosure may provide a method for operating a vacuum hose comprising: rotating a vacuum hose having a hose plug connected to a distal end thereof about a longitudinal axis; effecting a biased button to move through an annular channel formed in the hose plug; moving the biased button in the annular channel below a cam; and moving the biased button into a slot formed in the hose plug orthogonal to the annular channel to prevent the vacuum hose from inadvertently being disconnected by the cam affecting the biased button.

In accordance with yet another aspect, an exemplary embodiment of the present disclosure may provide a hose plug for connection with a vacuum hose conduit comprising: a first end opposite a second end defining a longitudinal direction therebetween; a longitudinal axis extending from the first end to the second end; a first endwall that is convexly curved and oriented circumferentially around the longitudinal axis; a first channel disposed towards the second end from the first endwall and oriented circumferentially around the longitudinal axis; an elastomeric O-ring inserted in the first channel; a second channel disposed towards the second end from the first channel and oriented circumferentially around the longitudinal axis; a flexible ring inserted in the second channel; an annular ledge disposed towards the second end from the second channel and oriented circumferentially around the longitudinal axis; a third channel at least partially defined by the annular ledge such that the third channel is substantially disposed towards the second end from the second channel; a first cam disposed within the third channel adjacent the annular ledge adapted to release a button in positioned in a housing, wherein the button snaps into the third channel to secure the hose plug to the housing; a first slot longitudinally aligned with the first cam extending towards the second end in open communication with the third channel adapted to receive the button therein; and a cylindrical section extending towards the second end from the third channel, wherein the cylindrical section defines the slot. This embodiment or another exemplary embodiment may further provide a first sloped wall on the first cam extending from an inner end connected with an annular wall defining a portion of the third channel to an outer end adjacent the annular ledge, wherein the outer end of the sloped wall is adapted to press the button into the house to permit the housing to move along the longitudinal axis. This embodiment or another exemplary embodiment may further provide wherein the first sloped wall is convexly curved. This embodiment or another exemplary embodiment may further provide a second sloped wall on the cylindrical section, the second sloped wall extending from an inner end connected with a longitudinal wall defining a portion of the slot to an out end connected with an outer surface of the cylindrical section. This embodiment or another exemplary embodiment may further provide wherein the second sloped wall is convexly curved. This embodiment or another exemplary embodiment may further provide wherein the third channel has a radius less than the first channel and less than the second channel. This embodiment or another exemplary embodiment may further provide wherein the first channel has a larger radius than the second channel. This embodiment or another exemplary embodiment may further provide a second cam positioned diametrically opposite from the first cam in the third channel; and a second slot longitudinally aligned with the second cam extending towards the second end in open communication with the third channel adapted to receive another button therein. This embodiment or another exemplary embodiment may further provide a longitudinally-aligned width associated the first channel that is greater than a length of the cam so as to define a portion of the third channel that extends completely circumferential in an uninterrupted manner. This embodiment or another exemplary embodiment may further provide wherein the completely circumferential and uninterrupted portion of the third channel is position towards the second end from the first cam.

BRIEF DESCRIPTION OF THE SEVERAL VIEWS OF THE DRAWINGS

Various embodiments of the invention are set forth in the following description, are shown in the drawings and are particularly and distinctly pointed out and set forth in the appended claims. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 8 is a top plan view showing the locking collar in three adjusted positions on the mounting bracket.

FIG. 9 is a sectional view taken along line 9-9 in FIG. 5.

FIG. 20A is an exploded side elevational view showing many of the components in the lower portion of the valve box of FIGS. 19 and 20.

FIG. 21A is an exploded front elevational view of many of the components in the lower portion of the valve box as shown in FIG. 20A.

FIG. 21B is a front elevational view of the closure door and door mounting flange of the valve box as shown in FIG. 20A.

FIG. 22A is a sectional view taken on line 22A-22A in FIG. 20.

FIG. 34 is an operational environmental view of the hose plug inserted into a box top assembly with biased buttons received in an annular channel formed in the hose plug.

FIG. 35 is an operational environmental view of the hose plug inserted into a box top assembly with the hose plug being rotated and pushed in order to effectuate the movement of the biased buttons downwardly into a slot formed in the hose plug that is in open communication with the annular channel.

Similar numbers refer to similar parts throughout the drawings.

DETAILED DESCRIPTION

Figure 1:
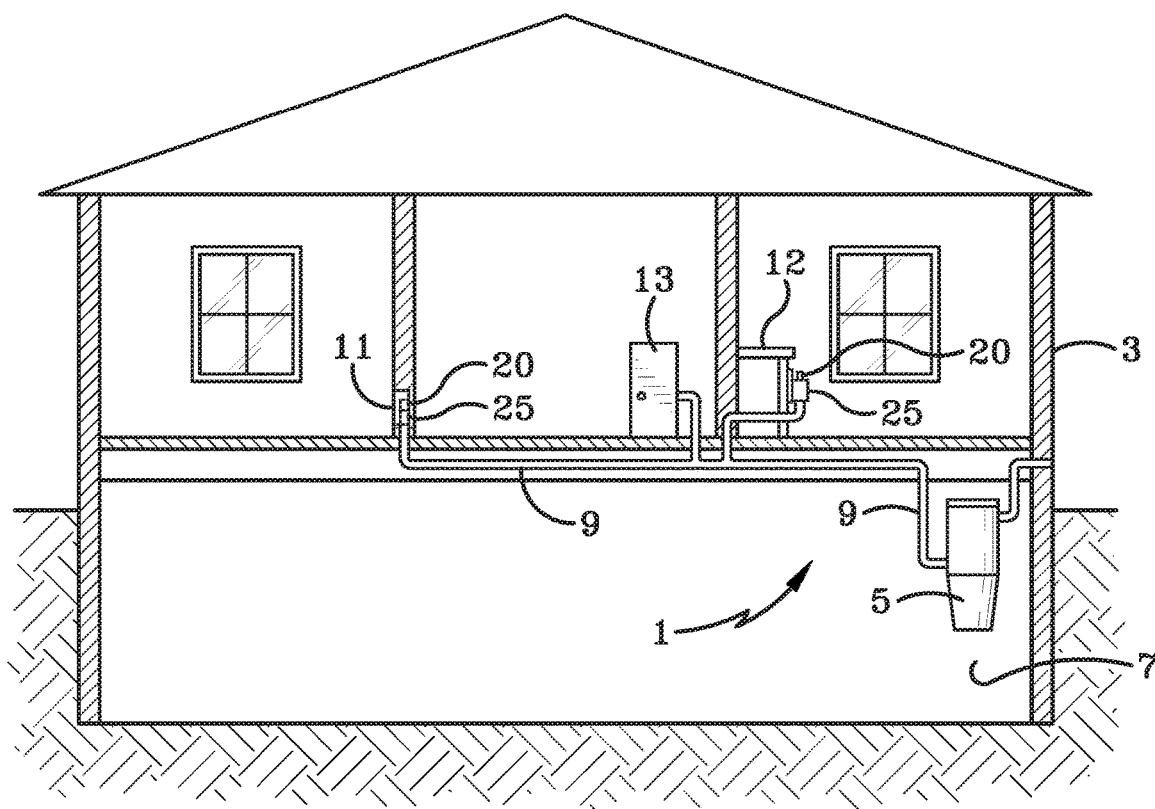
FIG. 1 is a diagrammatic view showing a structure having a central vacuum source in the lower level thereof connected to various inlet valves of the present disclosure located within the structure.

One example of a central vacuum cleaning system in which an inlet valve of the present disclosure is located is indicated generally at 1, and is shown in FIG. 1. A central vacuum source 5 is located within a usual structure 3 such as in a lower level 7. However, vacuum source 5 could be located at other locations in the structure or outside closely adjacent thereto. A plurality of vacuum source tubes or conduits 9 extend from vacuum source 5 to various locations or rooms within structure 3. The number of conduits will depend upon the size of the house, number of rooms, size of vacuum source 5, and other factors. These vacuum supply conduits are usually formed of rigid plastic and terminate at various inlet valves in the structure, three of which are shown in FIG. 1.

One of the vacuum supply conduits terminates at a usual air-tight wall valve 11, whereas another supply conduit terminates at a similar valve in a wall storage cabinet 13, with another supply conduit terminating at a first embodiment of the inlet valve of the present disclosure which is indicated generally at 25 and shown mounted under a counter 12. It is also readily understood that conduits 9 could extend into various locations within the structure and attached to other types of inlet valves without affecting the concept of the invention.

Figure 1A:
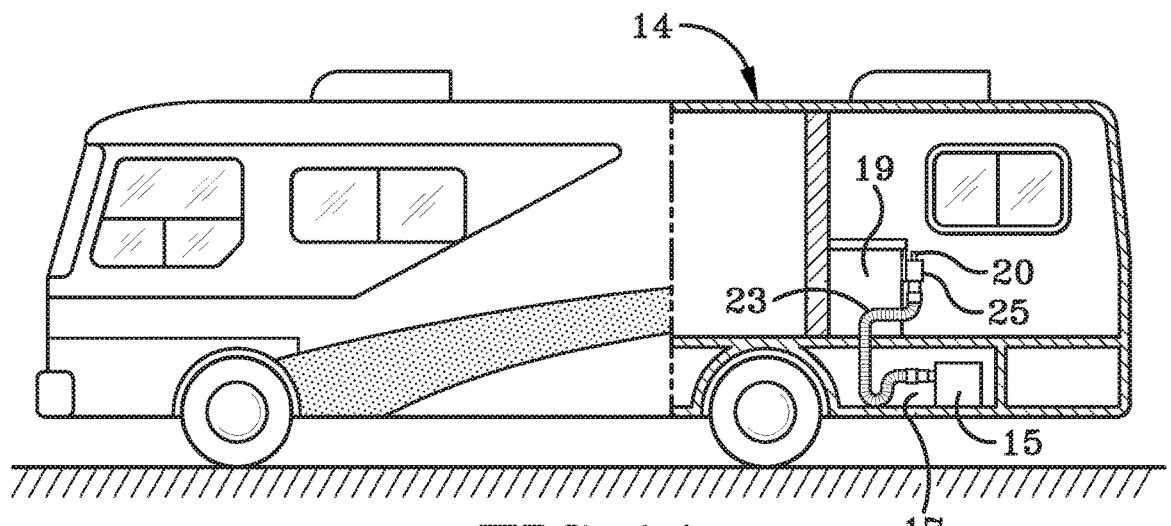
FIG. 1A is a diagrammatic view showing the central vacuum cleaning system and one of the inlet valves of the present disclosure comprised principally of a locking collar mounted within a recreational vehicle.

FIG. 1A illustrates the first inlet valve 25 of the present disclosure hereinafter referred to as a locking collar, installed in a recreational vehicle (RV) 14. Locking collar 25 is well suited for use in such a confined area such as an RV. In this type of vacuum system, a usual vacuum power supply 15 is located in a storage area 17 with inlet valve or collar 25 being located in a cabinet 19 or other easily accessible location within the RV. Preferably in an RV the vacuum supply conduit will be a flexible hose 23 in place of rigid conduits 9 of FIG. 1, enabling it to be installed to conform to the available space and contours of an RV when space is at a premium. Although FIG. 1A shows only a single inlet valve or collar 25, it is readily understood that the RV can have multiple inlet valves throughout the vehicle all connected to vacuum source 15.

Figure 2:
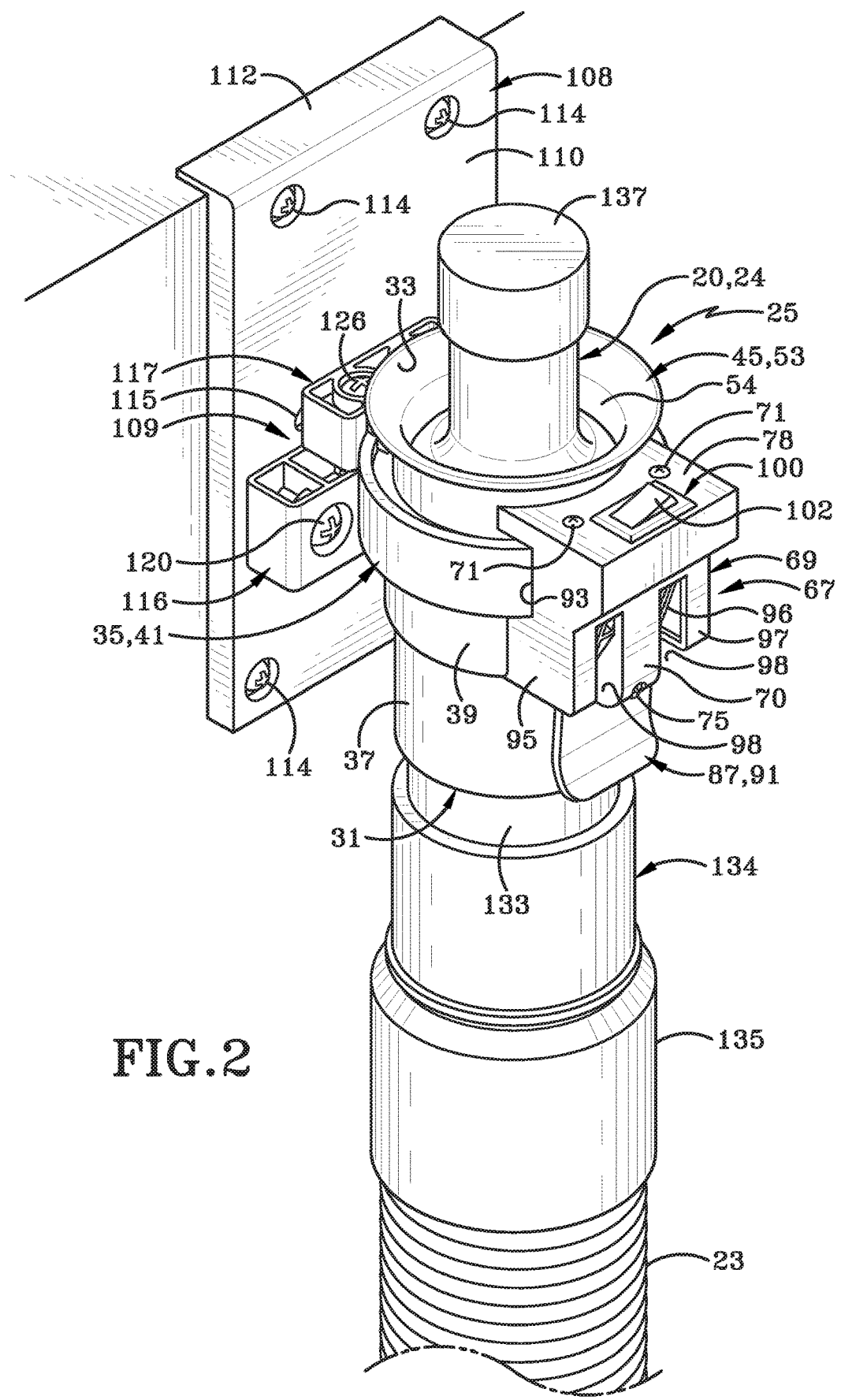
FIG. 2 is a top perspective view showing one of the inlet valves of the present disclosure which is a unique locking collar mounted on a supporting structure with the cleaning hose in a fully retracted position within a flexible outer conduit as shown in FIG. 1A, and with an end sealing cap mounted on the open end of the nozzle handle.
Figure 2A:
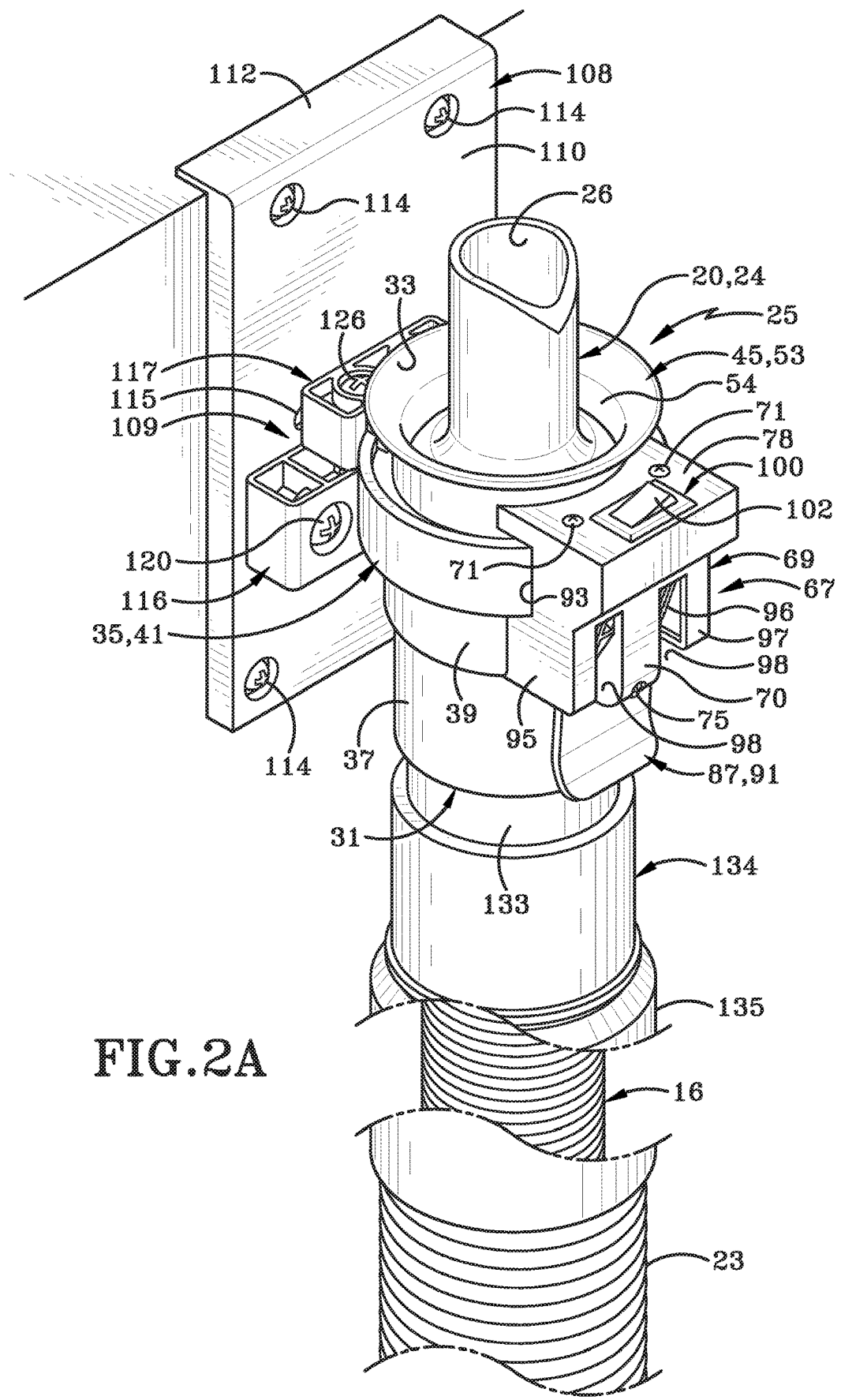
FIG. 2A is a top perspective view similar to FIG. 2 with portions broken away showing the locking collar of the present disclosure without the sealing end cap.
Figure 3:
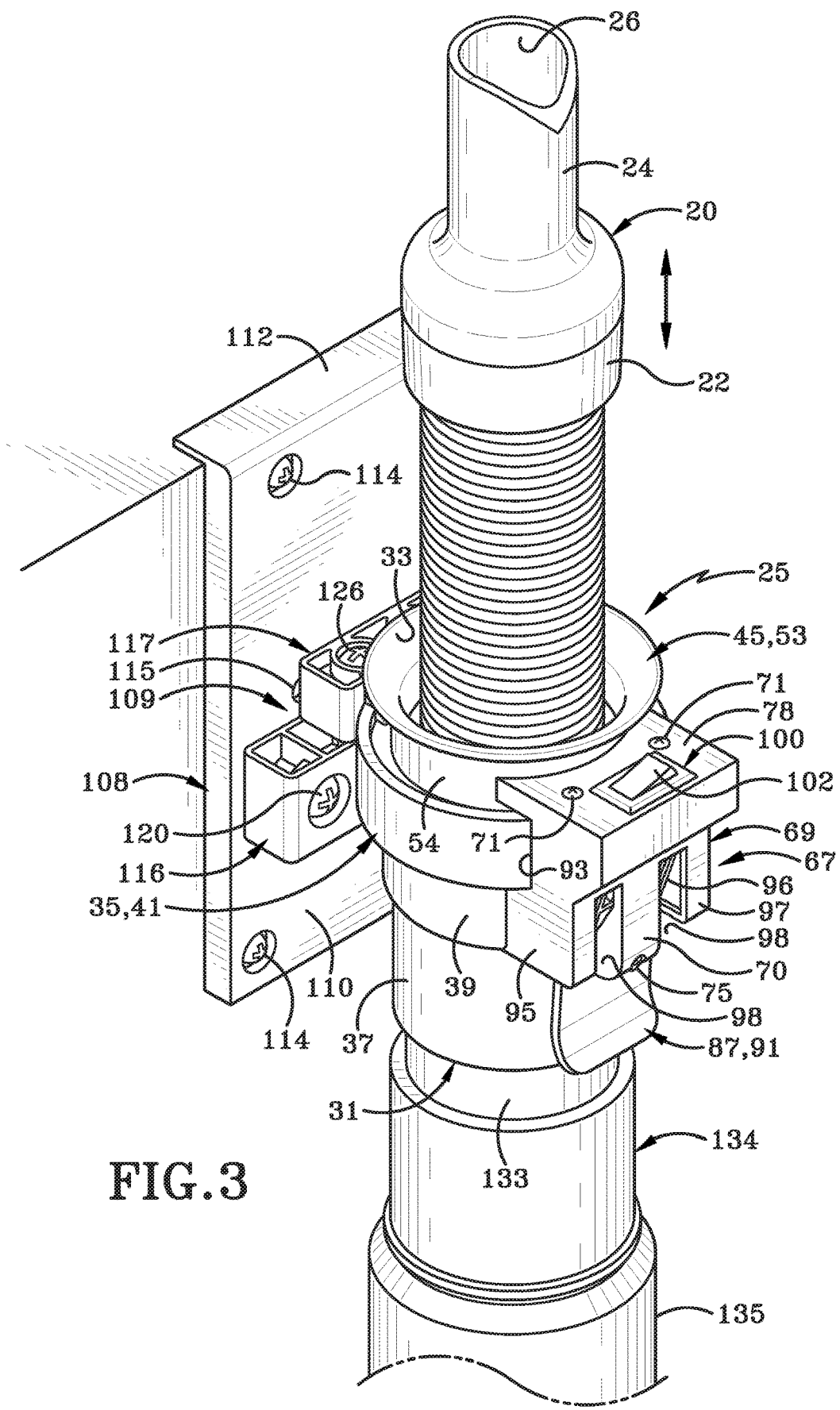
FIG. 3 is a top perspective view similar to FIG. 2 showing the nozzle handle removed from the locking collar and the internal hose in a partially extended position.
Figure 14:
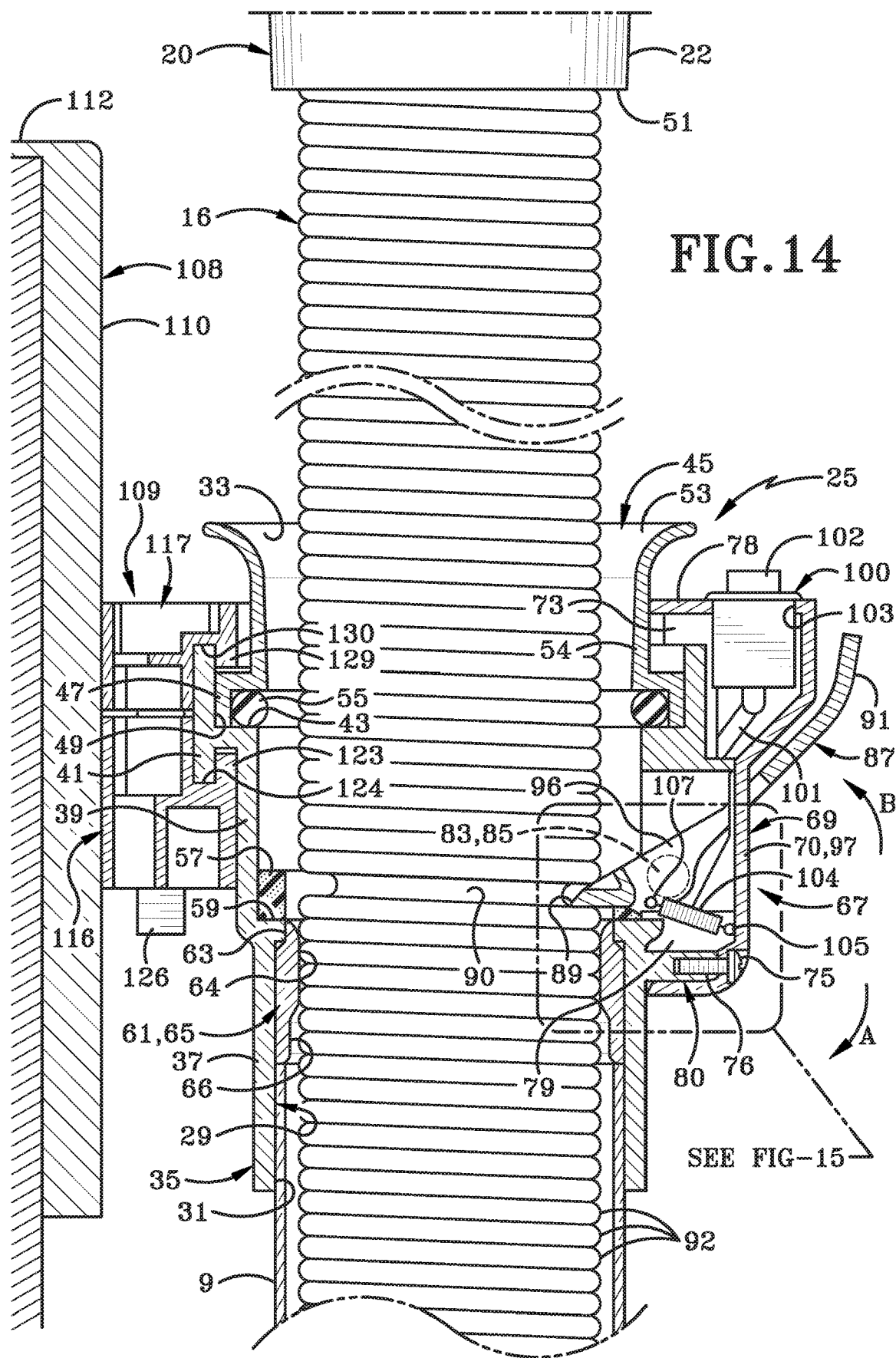
FIG. 14 is a view similar to FIG. 12 showing the locking finger in locking engagement with the retractable hose when the hose is in a partially extended position.

As shown in FIGS. 2, 2A and 3, the vacuum supply conduit is shown as a flexible hose 23 and in FIGS. 5-17 it is shown as a rigid conduit 9 for illustrative purposes. A section of a flexible hose 16 will be contained within each of the conduits 9 and 23 and will have a nozzle handle 20 attached to the outer end of hose 23 for grasping by an operator for cleaning an adjacent area. Collar 25 of the present disclosure and the main components thereof are shown in detail in FIGS. 4A, 4B, and 4C. Collar 25 preferably is molded of plastic, although it could be formed of metal without affecting the concept of the invention. Collar 25 is formed with a through bore or passage 29 which terminates in an open inner end 31 and an open outer end 33 (FIGS. 12 and 14). Collar 25 includes a main body 35 which has a cylindrical end section 37 and a larger diameter cylindrical central section 39 which terminates in an annular upper ring 41 connected to central section 39 by an annular shoulder 43.

An annular end section or collar, indicated generally at 45 (FIGS. 4C and 12), terminates in an inner right angle shoulder 47 which is slidably received within and against the inside surface 49 of annular ring 41 and sets upon annular shoulder 43 of central section 39. Shoulder 43 is formed at the junction of the upper portion of annular ring 41 and the top end of central section 39. End collar 45 terminates in an outwardly flared end flange 53 which guides the handle 20 into the collar body when the hose is moving toward a stored position. Flange 53 forms the open outer end 33 of the locking collar and has a smooth inner cylindrical wall 54 which forms a through bore of end collar 45.

An O-ring 55, formed of a rubber or some type of resilient material, is located between step shoulder 47 of end collar 45 and annular shoulder 43 of central section 39. Ring 55 has an inner diameter generally complementary to the inner diameter of end collar 45 and provides a frictional sliding fit with handle 20 to assist in retaining handle 20 within body 35 when in its stored position. A sealing ring 57 formed of a resilient material such as rubber, felt or a foam material, is seated upon an annular shoulder 59 formed between central section 39 and cylindrical end section 37. Ring 57 provides an air seal with the annular bottom edge 51 of handle 20 when the handle is in its stored position as shown in FIG. 12.

An annular hose stop, indicated generally at 61 (FIGS. 4A, 12 and 17), terminates in an inwardly curved upper shoulder 63 and a main cylindrical body 65 which terminates in a larger diameter section 66 and a smaller internal diameter 64. Hose stop 61, as shown particularly in FIG. 12, is slidably received in the internal diameter of cylindrical end section 37 with the stepped upper shoulder 63 engaging shoulder 59 to properly position stop 61 within the interior of end section 37. Hose stop 61 prevents the distal end of the hose from being pulled out of locking collar 25 if the hose is not needed for use in the other inlet valves throughout the dwelling. Ring 61 can easily be eliminated from locking collar 25 permitting easy removal of the hose therefrom without affecting the concept of the present disclosure.

Figure 4A:
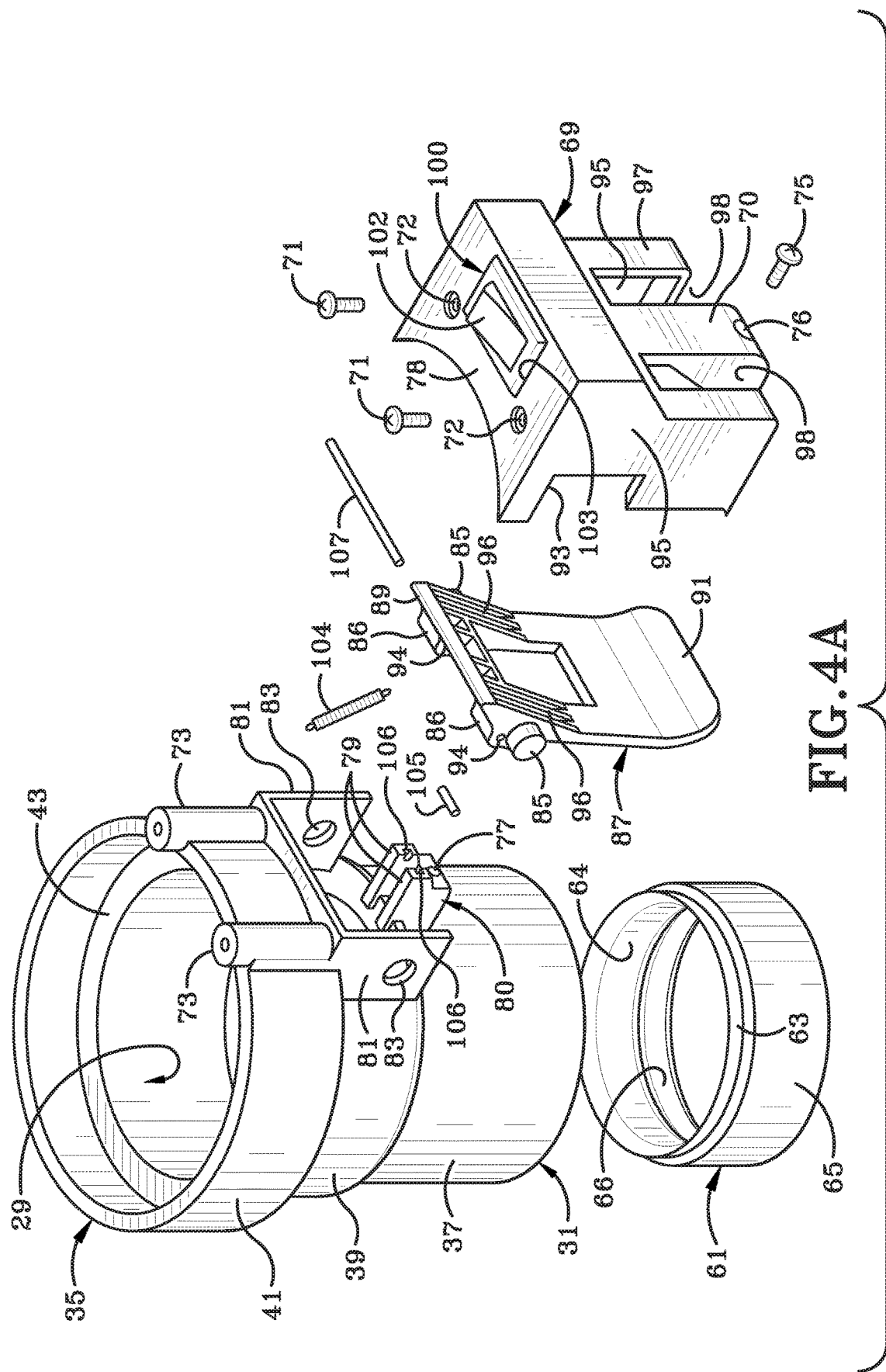
FIG. 4A is an exploded perspective view showing the lock housing, locking mechanism and hose stop components of the locking collar.

In accordance with another feature of the invention, a locking mechanism indicated generally at 67, is mounted on main collar body 35 (FIG. 4A). Locking mechanism 67 includes a lock housing 69 which is mounted on the exterior of body 35 by a pair of fasteners 71 which extend through a pair of holes 72 formed in top wall 78 and threadably engage a pair of spaced posts 73 formed integrally with annular ring 41, and by another fastener 75 which extends through a hole 76 formed in a central post 70 of lock housing 69. Fastener 75 is engaged within an opening 77 formed in the lower end of a stud 80 having a pair of spaced members 79 formed integrally with and projecting outwardly on stud 80 of central section 39.

Locking mechanism 67 furthermore includes a pair of spaced flanges 81 which are formed integrally with and extend outwardly from central section 39 of body 35. Each flange 81 is formed with a hole 83 which snap fittedly receives a pair of bosses 85 which are formed on and extend outwardly from the ends of a locking member or finger indicated generally at 87. Locking member 87 terminates in a laterally extending locking edge 89 and an opposite finger tab 91.

Figure 5:
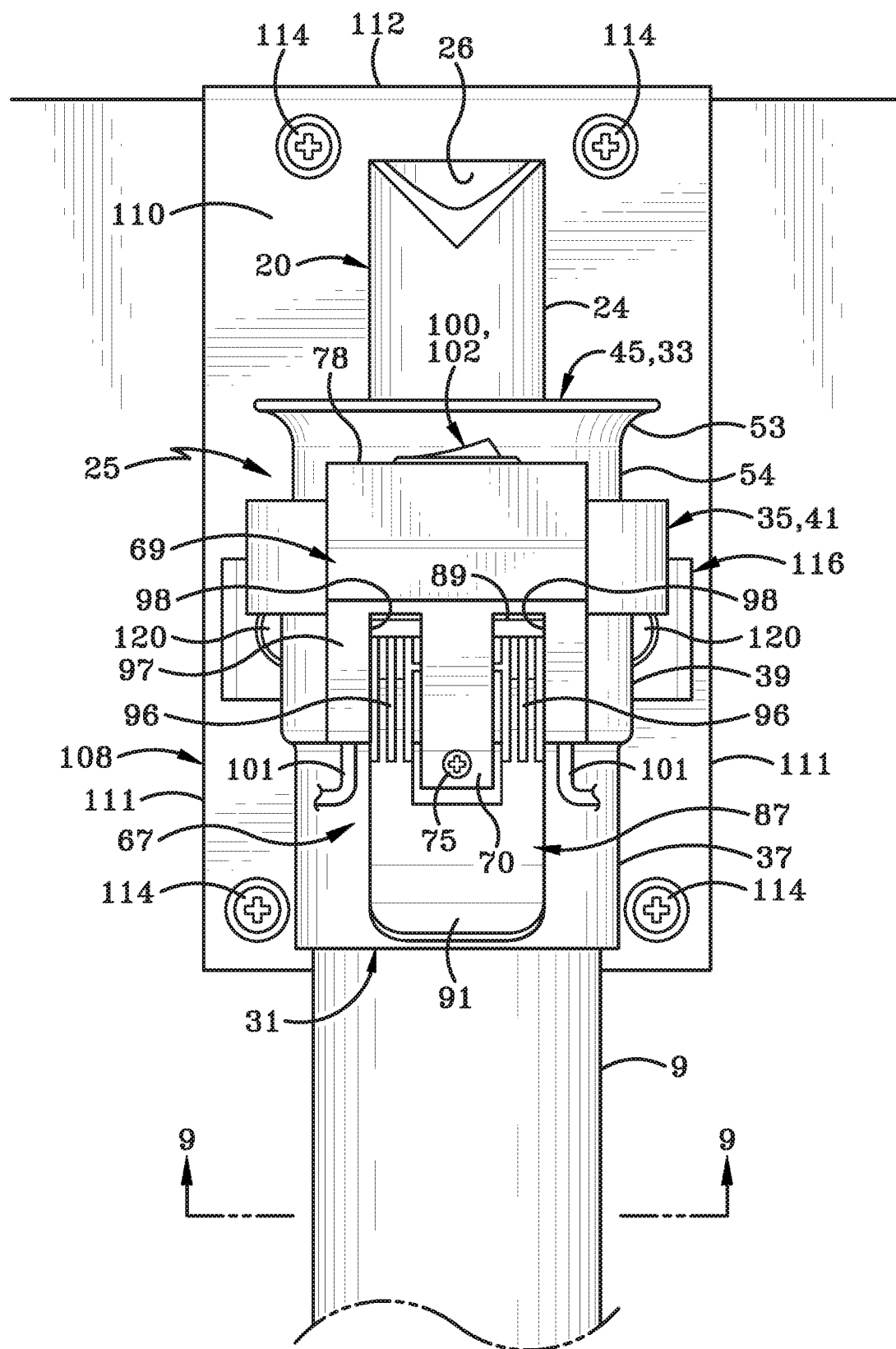
FIG. 5 is a front elevational view of the locking collar and nozzle handle with a rigid outer conduit as shown in FIG. 1, with the locking finger in the unlocked position.
Figure 6:
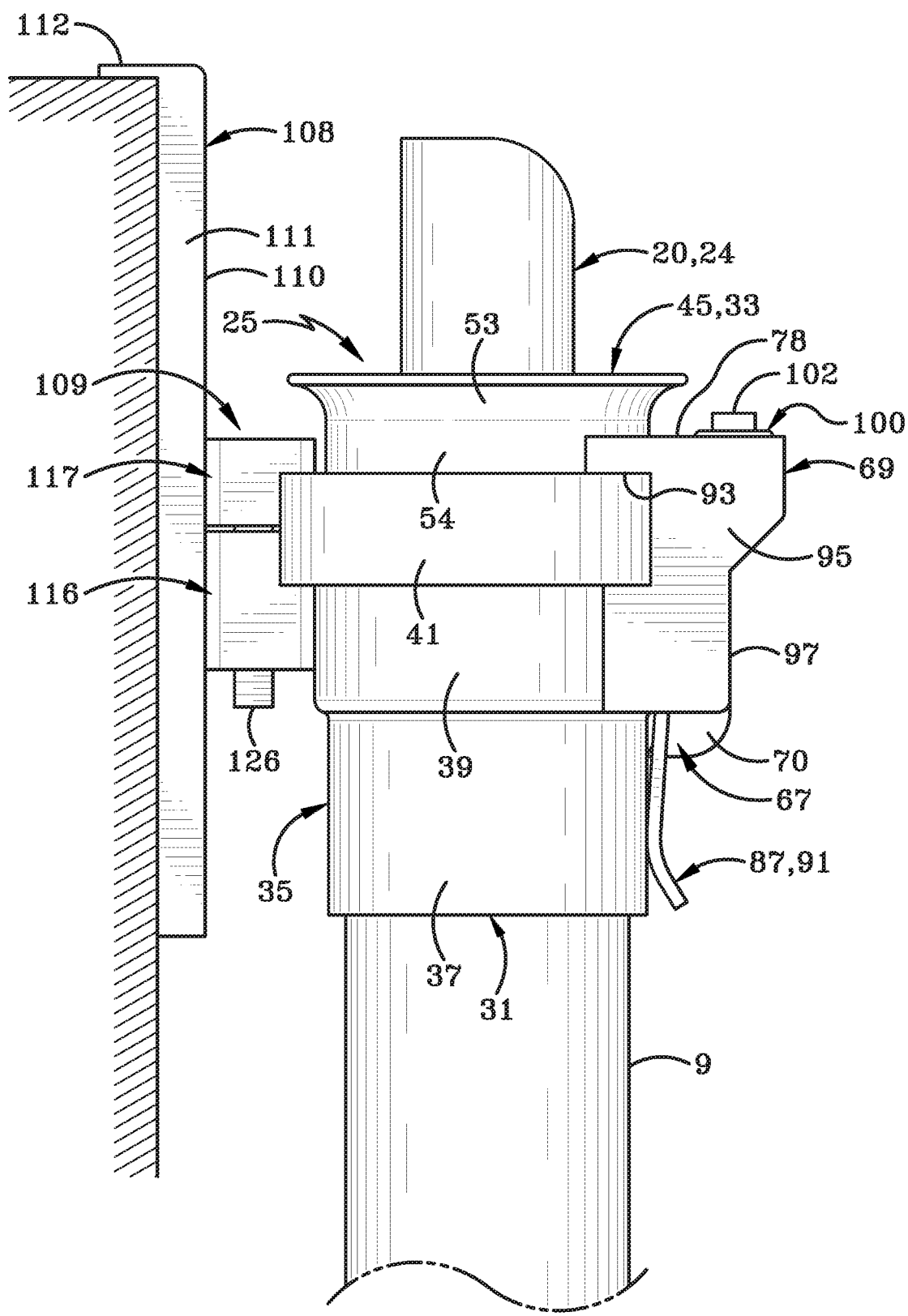
FIG. 6 is a left side elevational view of the locking collar as shown in FIG. 5.

Lock housing 69 is formed with a pair of cut-outs 93 in side walls 95 thereof which receive annular ring 41 therein when mounted on body 35 as best shown in FIG. 6. Rear wall 97 of lock housing 69 is formed with a pair of cut-outs 98 adjacent central post 70 through which spaced portions 96 of locking finger 87 extend when lock housing 69 is secured to main body 35 enabling locking finger 87 and in particular finger tab 91 thereof, to extend externally of lock housing 69 as shown in FIGS. 5 and 6.

In further accordance with the invention, an electric switch 100 is mounted within lock housing 69 and is adapted to be connected to vacuum sources 5 and 15 by electrical conductors or wires 101. Switch 100 includes an actuation toggle button 102 which extends through an opening 103 formed in a top wall 78 of housing 69.

Figure 15:
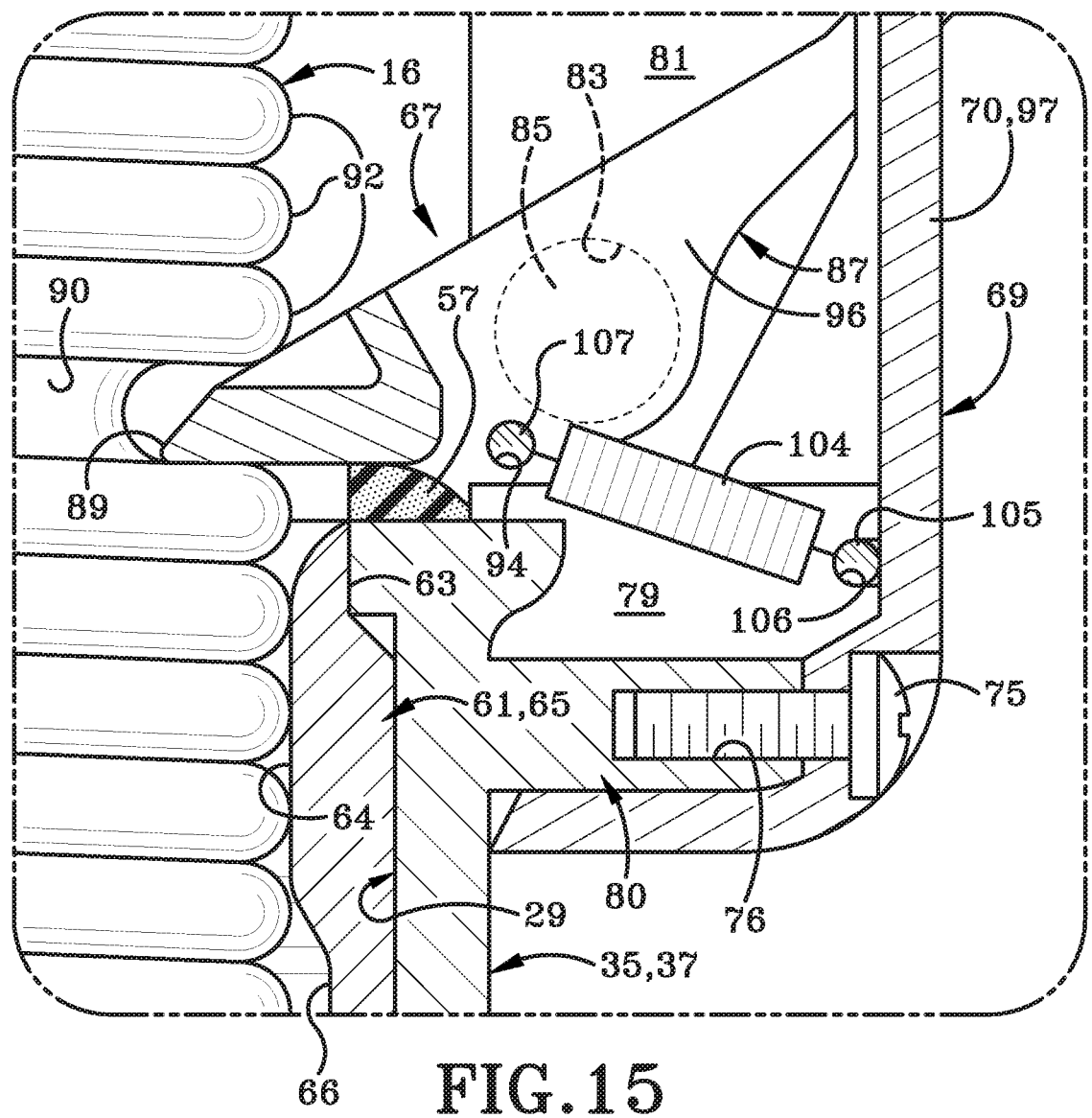
FIG. 15 is an enlarged fragmentary view of the encircled portion of FIG. 12 showing the locking finger engaged with the cleaning hose.
Figure 16:
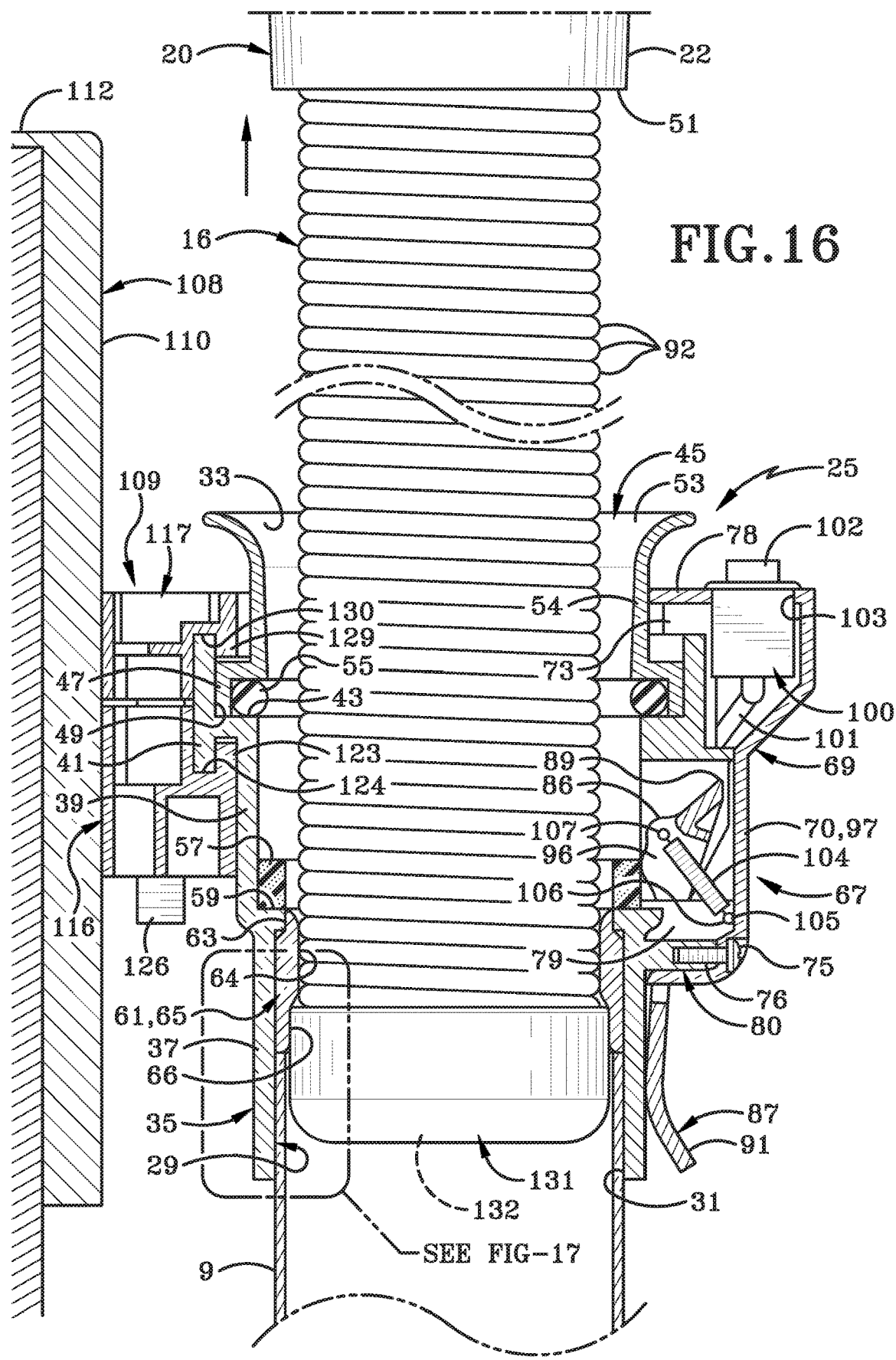
FIG. 16 is a view similar to FIG. 14 with the locking finger in its unlocked, retracted position.

Locking finger 87 is spring biased by a spring 104 toward a locking position when it is engaged with hose 16 as shown in FIG. 14 and toward an unlocked retracted position as shown in FIG. 16. Spring 104 extends between a pin 105 which is mounted within a pair of notches 106 formed at the outer ends of studs 79 (FIGS. 4A and 12) and at the opposite end to a pin 107 slidably received through a pair of openings 94 formed in a pair of lugs 86 formed on and extending outwardly on locking finger 87 generally adjacent locking edge 89. Spring 104 when in a first position biases locking edge 89 toward locking engagement with hose 16 as shown in FIGS. 14 and 15 and biases the locking finger into an unlocked disengaged position as shown in FIG. 16.

Figure 4B:
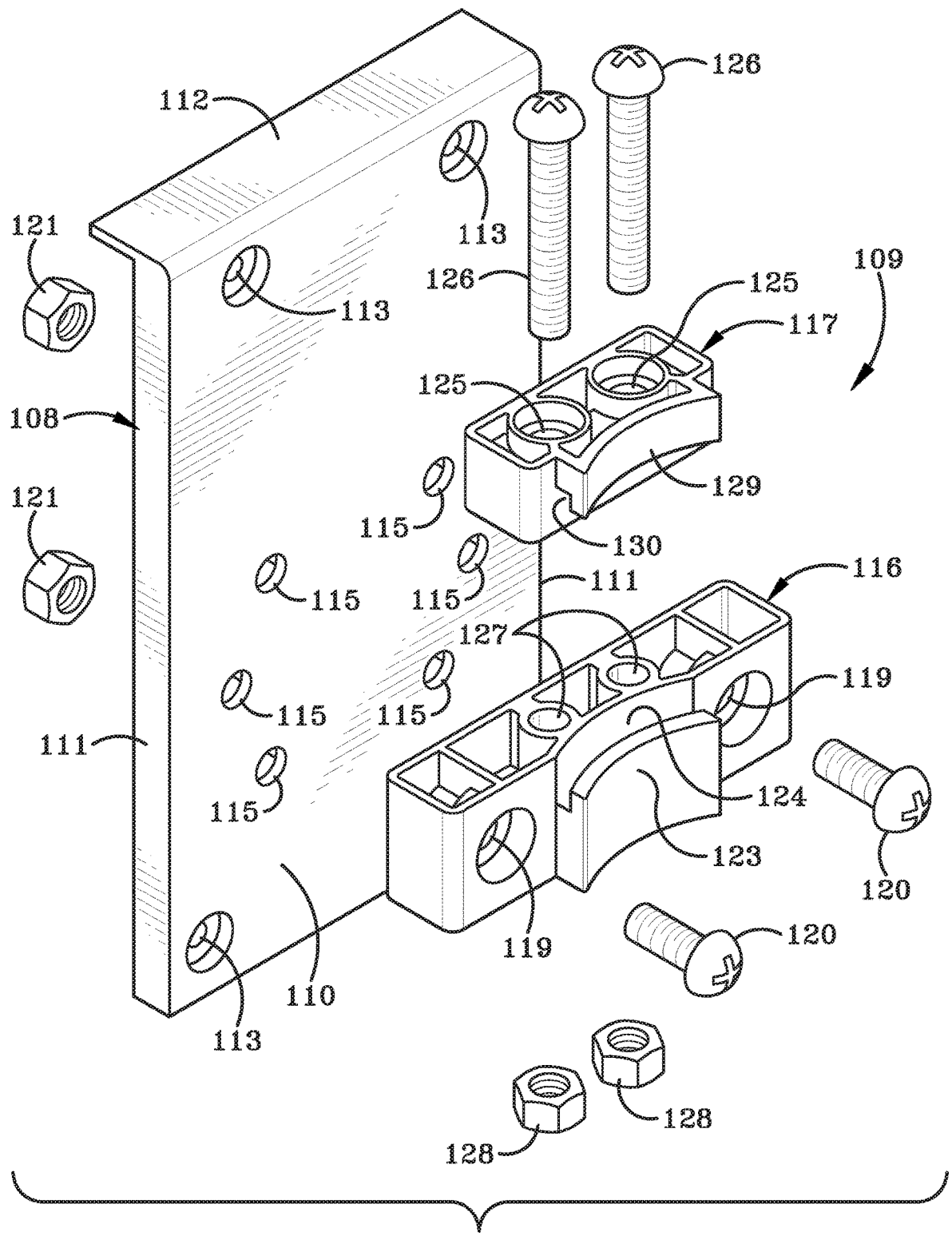
FIG. 4B is an enlarged exploded perspective view showing the locking collar mounting clamps and collar support bracket.
Figure 4C:
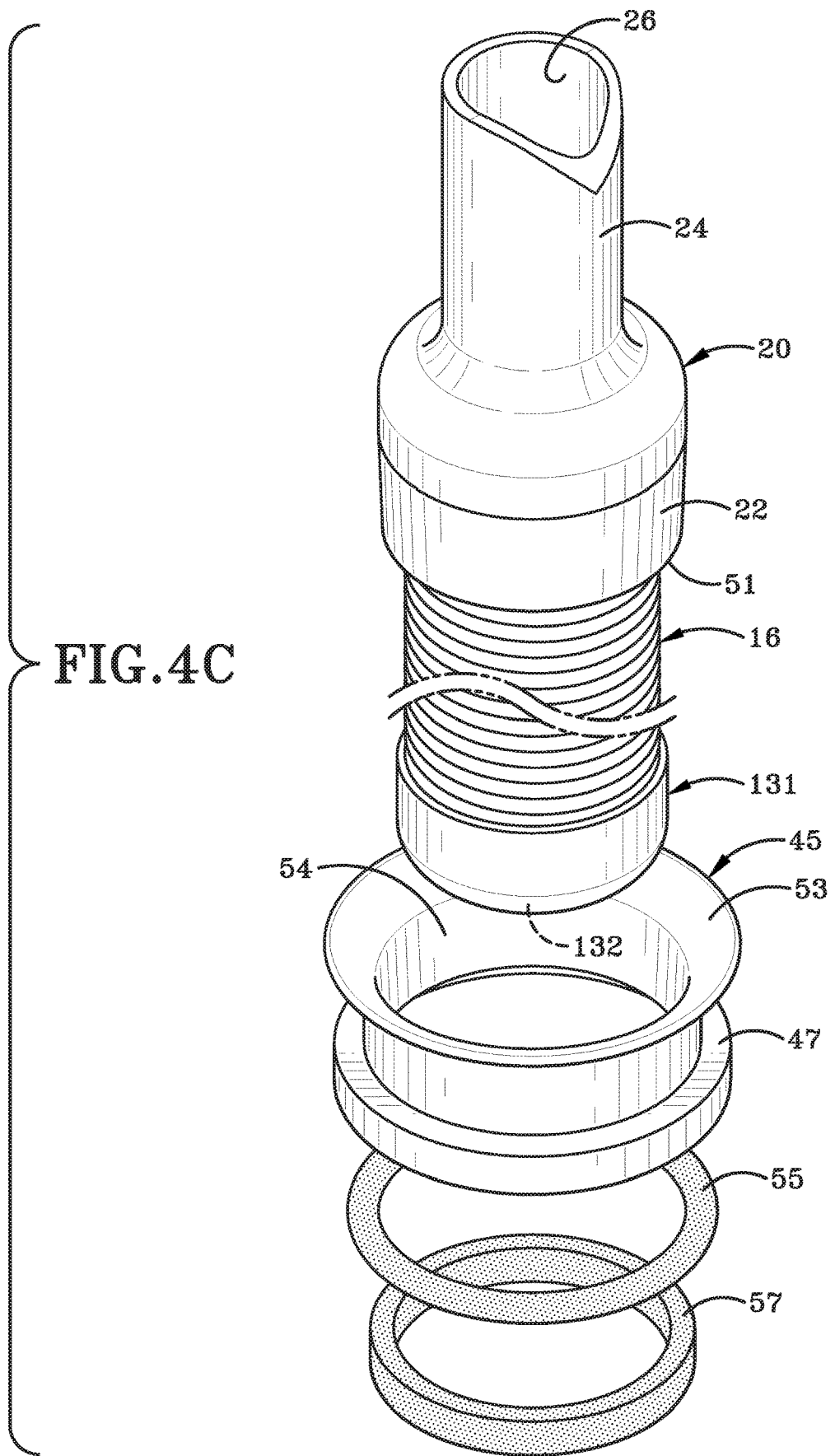
FIG. 4C is a fragmentary exploded view of the nozzle handle and internal hose in combination with the sealing rings and flared end component of the locking collar.

In accordance with another feature of the invention, locking collar 25 includes a mounting bracket indicated generally at 108 (FIGS. 4B and 7) and a clamp mechanism indicated generally at 109, for adjustably mounting body 35 onto bracket 108. Mounting bracket 108 includes a flat plate 110 formed with a pair of right angled side flanges 111 and a top ledge 112 which extends outwardly beyond end flanges 111. Four mounting holes 113 are formed generally adjacent the four corners of plate 110 for receiving fasteners (not shown) for securing bracket 108 to a supporting structure. Holes 113 can be counter-bored as shown in FIG. 4B so that the fastener heads are generally flush with the surface of plate 110 when bracket 108 is secured to a supporting structure.

Figure 7:
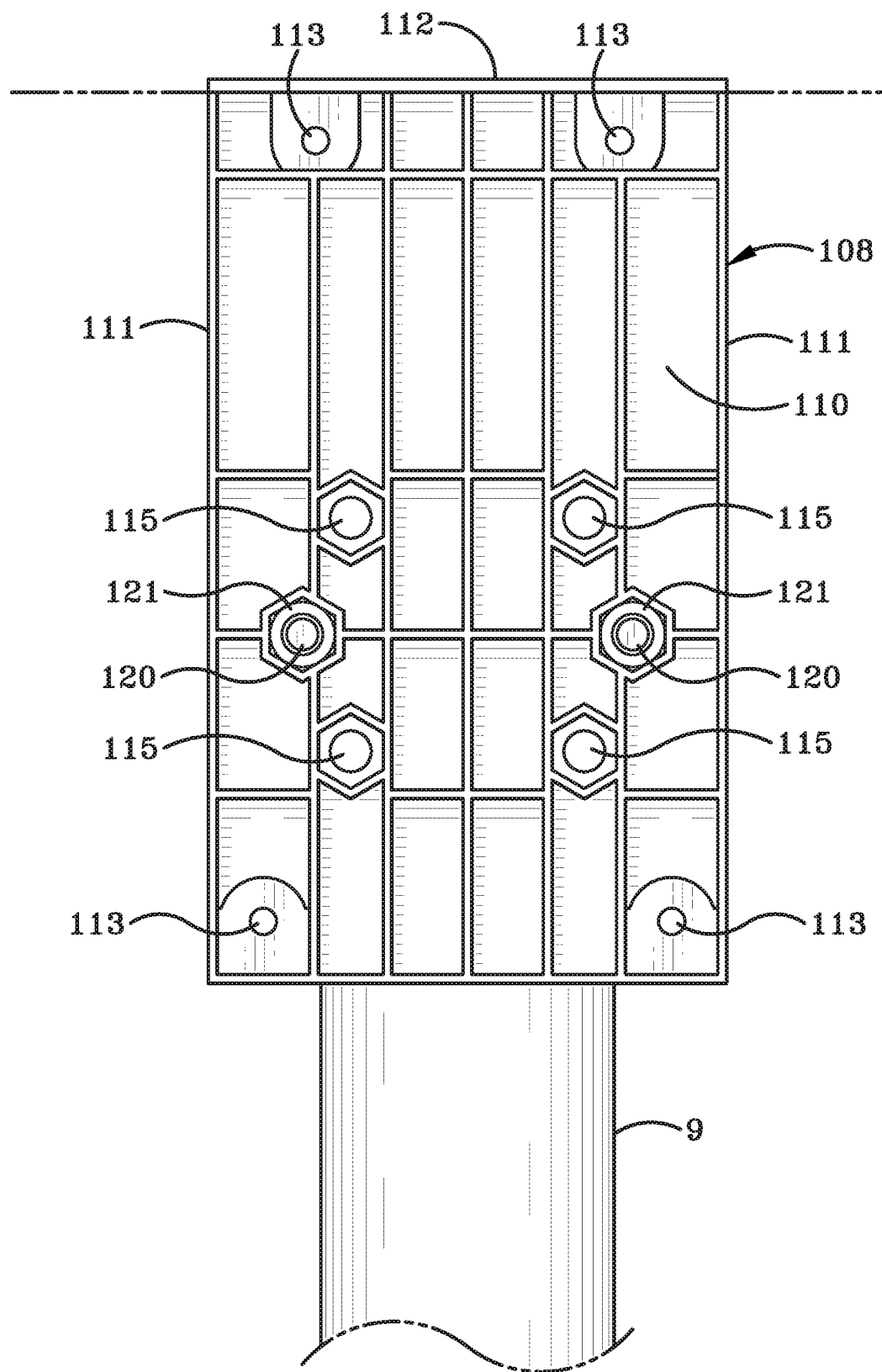
FIG. 7 is a rear elevational view of the mounting bracket attached to the locking collar.

A plurality of holes 115, six are shown in the drawings, are formed through plate 110 for adjustably mounting a pair of clamp members 116 and 117 thereon as discussed below which form clamp mechanism 109. Clamp members 116 and 117 have a generally rectangular configuration with bottom clamp 116 being formed with a pair of holes 119 for receiving a pair of fasteners 120 which project through a selected pair of holes 115 formed in plate 110 and secured thereon by a pair of nuts 121 as shown in FIGS. 4B and 7. Lower clamp body 116 is formed with an arcuate projection 123 forming an arcuate slot or channel 124 with the front surface of clamp 116.

Upper clamp 117 is formed with a pair of holes 125 for receiving a pair of bolts 126 therethrough which extend through aligned holes 127 formed in lower clamp 116 for securing engagement with a pair of nuts 128 for clamping clamp members 116 and 117 together. Upper clamp 117 is formed with an arcuate projection 129 which forms an arcuate slot or channel 130 between projection 129 and the body of upper clamp 117. When clamp bodies 116 and 117 are clamped together by fasteners 126, arcuate channels 124 and 130 align and receive annular ring 41 therein, as shown in FIG. 6, to adjustably mount main body 35 on clamp mechanism 109 and subsequently on mounting bracket 108.

Handle 20 includes a cylindrical end section 22 which is attached to the end of hose 16 by a threaded engagement, adhesive, or other type of securement means to firmly attach handle 20 to the end of hose 16. Handle 20 further will include a reduced diameter nozzle end 24 terminating in an open end 26 through which dirt and other debris is collected by the vacuum imparted onto hose 16 during a cleaning operation. The opposite end of hose 16 will have an end seal 131 (FIGS. 4C and 16) secured thereto by a threaded engagement, adhesive, or other securement means.

Figure 17:
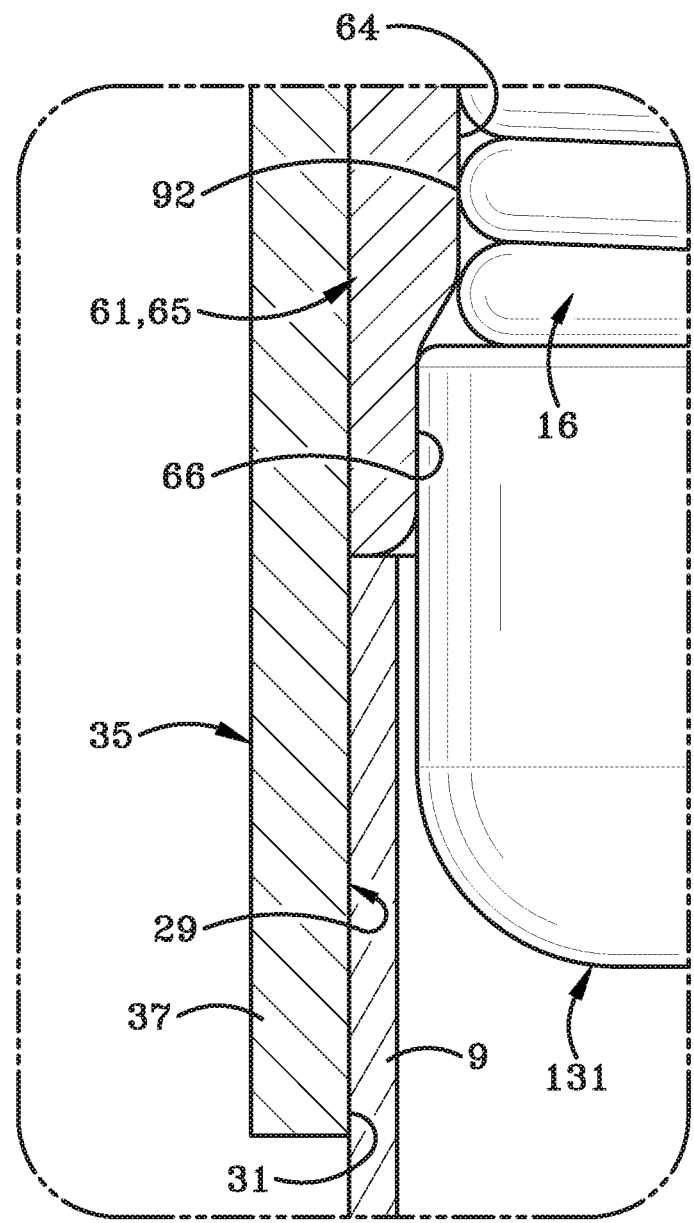
FIG. 17 is a greatly enlarged fragmentary view of the encircled portion of FIG. 16.

Hose end seal 131 is an annular ring formed having an internal bore generally complementary to the internal bore of hose 16 so as not to impede the vacuum flow. As best shown in FIGS. 16 and 17, the outer diameter of hose end seal 131 will be slightly smaller but complementary to the diameter of hose stop 61, but larger than the internal diameter of cylindrical body 65 of hose stop 61. This ensures that hose end seal 131 will not pull through locking collar 25 as shown in FIG. 16. Thus, as a user pulls hose 16 through the conduit, seal 131 will limit the outward movement of the hose by engagement of end seal 131 with the smaller diameter of hose stop 61.

FIGS. 1A, 2, 2A, 3 and 4C show collar 25 attached to a flexible conduit 23, and FIGS. 5-17 show collar 25 attached to a rigid conduit 9 for illustration purposes only. Either type of conduit will work equally well with collar 25.

As shown in FIG. 12, rigid conduit 9 is connected to locking collar 25, and in particular to main body 35 by slidingly inserting it into the end of cylindrical end section 37 where it abuts against the bottom edge of hose stop 61 pressing curved shoulder 63 thereof against annular shoulder 59. Hose stop 61 preferably is glued in position. Conduit 9 will be secured in end section 37 by an adhesive, threaded engagement, or other type of attachment well-known in the central vacuum cleaning art.

Flexible conduit 23 can be secured to locking collar 25 by a short section of rigid tube 133 and a coupler 134 preferably having a bell-shaped end 135 for receiving the end of hose 23 therein. It will also be secured by a threaded engagement, adhesive, or other type of attachment means as with rigid conduit 9. The inside diameter of conduits 9 and 23 is generally complementary to the outer diameter of hose end seal 131 in order to provide a sliding fit therebetween, as well as providing an air seal therebetween ensuring that the majority of the vacuum source is transmitted through the conduit and subsequently through the interior of hose 16 to achieve maximum dirt and debris pickup through the open end of handle 20 yet enabling hose 16 and end seal 131 to slide easily into and out of conduits 9 and 23.

Locking collar 25 is installed easily in a structure or RV by first attaching mounting bracket 108 to a support structure by fasteners 114 which can be screws, bolts, rivets, or other type of fastener depending upon the nature of the support structure to which mounting bracket 108 is attached. Preferably, top flange 112 is placed against an edge of the supporting structure to align the mounting bracket thereon and enable it to be placed in a variety of locations within a structure. Bracket flange 112 can be placed horizontally on a structure as shown in FIG. 2A or can extend vertically along a structure edge (not shown) or in various other positions for subsequent attachment of collar 25 thereon.

Lower clamp body 116 is attached to bracket plate 110 by inserting fasteners 120 through a pair of selected holes 115 and secured thereon by nuts 121. Main body 35 is mounted on lower bracket 116 by inserting the lower end of annular ring 41 within arcuate groove 124. Top body clamp 117 is placed in position with the top portion of ring 41 being seated within arcuate groove 130. Upper clamp body 117 is then secured on lower clamp body 116 by fasteners 126 and nuts 128. Initially, the clamping pressure exerted between clamp bodies 116 and 117 will be sufficient to secure ring 41 therebetween, yet loose enough to permit body 35 to be rotated with respect to mounting bracket 108 between various angular positions as shown in FIG. 8. After rotation of body 35 to the desired position, bolts 126 are then tightened to prevent further rotation of ring 41 within aligned channels 124 and 130. This feature enables body 35 to be adjusted to various angular positions on a supporting structure enabling it to be mounted at various locations and on various structures within a supporting structure, especially within an RV where spaced is limited. This adjustability will provide the best access for a user to pull handle 20 and attached hose 16 through collar 25 for a cleaning operation.

Figure 10:
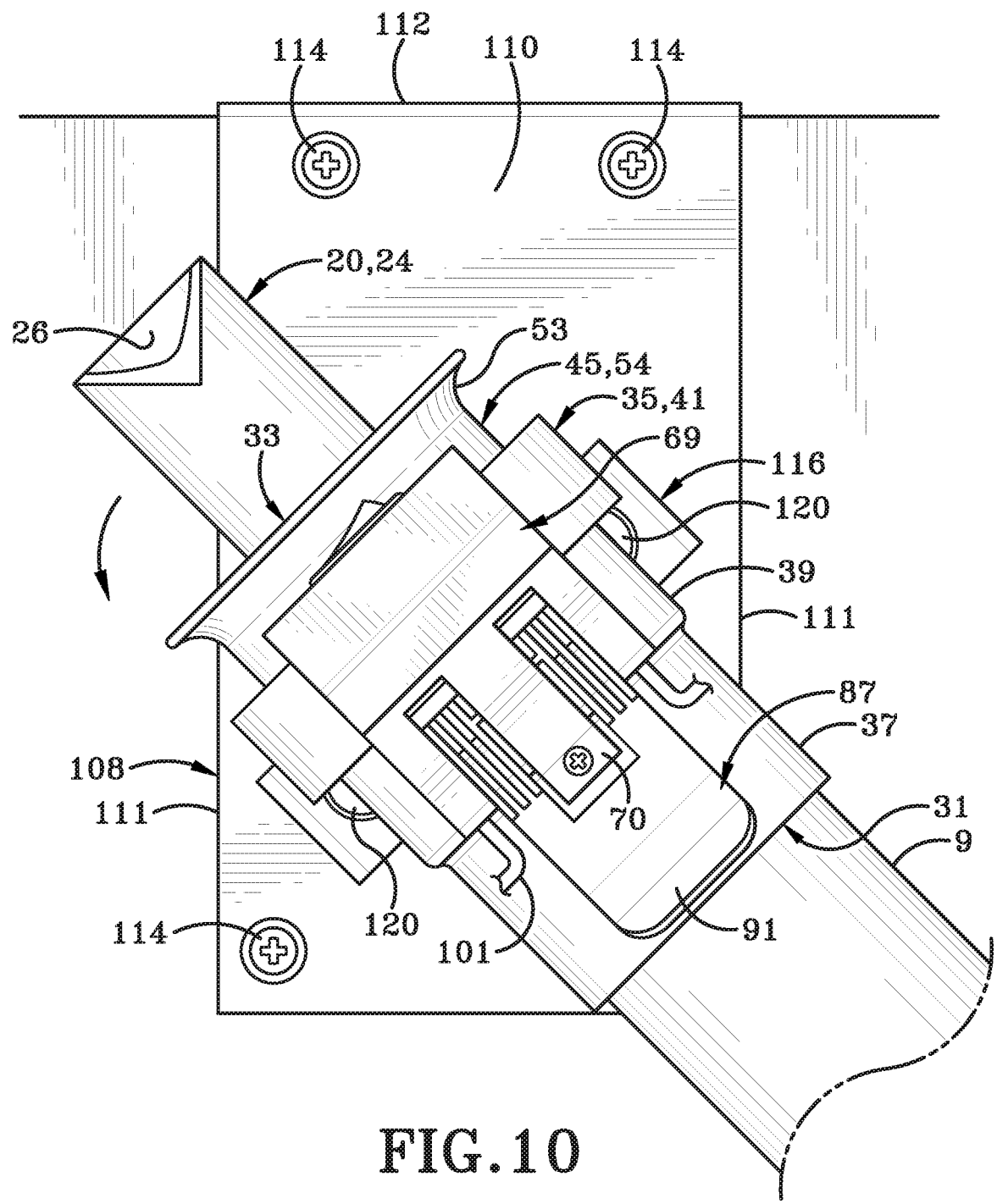
FIG. 10 is a view similar to FIG. 5 showing the locking collar and mounting clamps rotated 45° in a counterclockwise direction from its vertical position.
Figure 11:
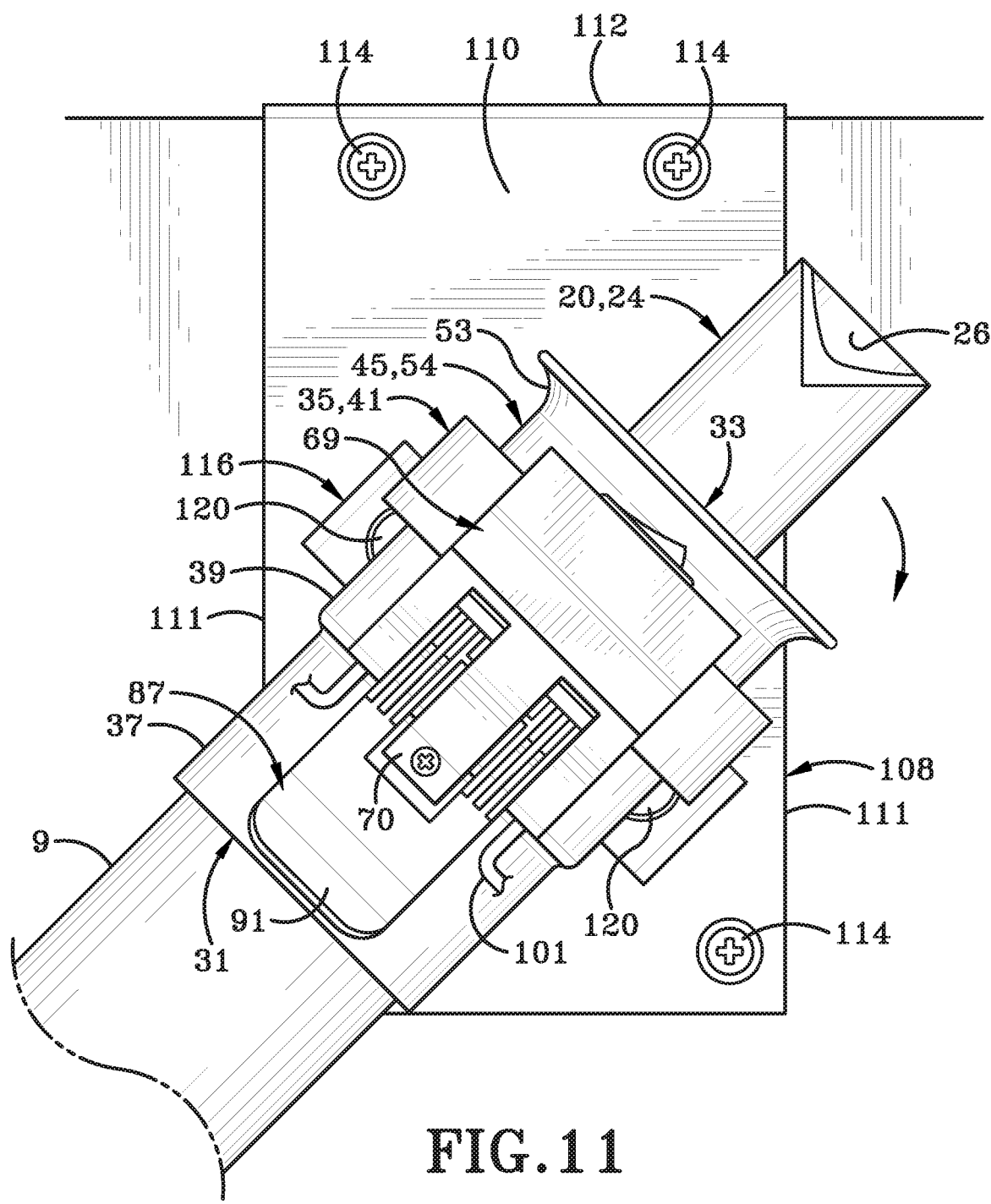
FIG. 11 is a view similar to FIG. 10 showing the locking collar and mounting clamps rotated 45° in the clockwise direction from the vertical position of FIG. 5.
Figure 12:
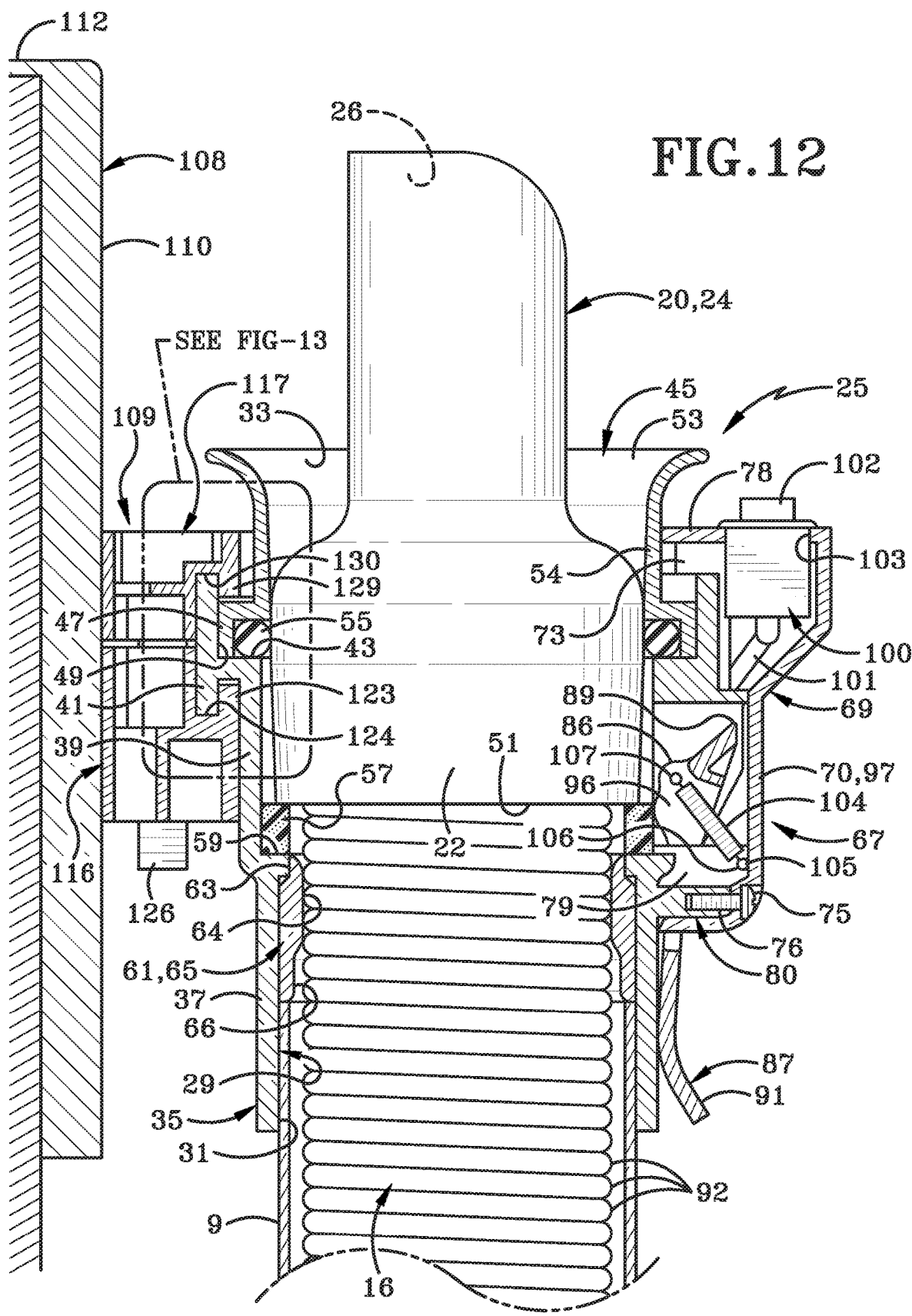
FIG. 12 is an enlarged sectional view taken along line 12-12, FIG. 8 showing the cleaning nozzle handle in a sealed and stored position in the locking collar.
Figure 13:
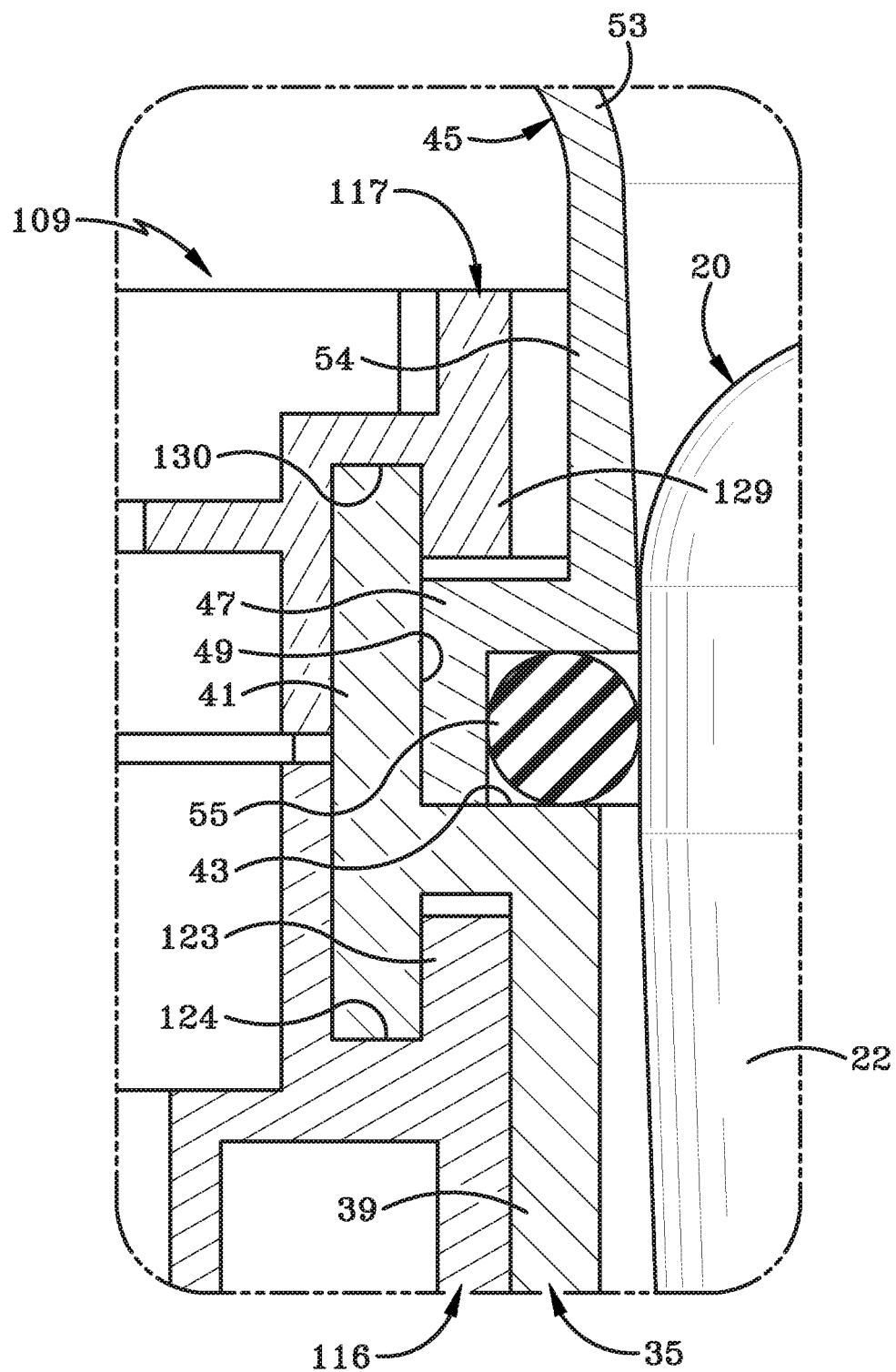
FIG. 13 is an enlarged view of the encircled portion in FIG. 12.

In accordance with another feature of the invention, which is especially helpful when mounting collar 25 in the narrow confines of an RV, is the ability to place collar 25 at various angular positions on mounting bracket 108 as shown particular in FIGS. 7, 10, and 11. This is achieved by selecting an appropriate pair of holes 115 through which mounting bolts 120 will extend when mounting the clamp mechanism onto mounting bracket 108. As shown in FIG. 7, locking collar 25 is in a true vertical position and alignment with respect to the mounting plate as shown in FIGS. 5 and 6. However, it can easily be mounted in a variety of angular positions with respect to the mounting plate as shown in FIGS. 10 and 11, by merely selecting the appropriate holes on mounting bracket 108 for receiving bolts 120.

Another feature of clamp mechanism 109 is the ability to mount clamp bodies 116 and 117 directly onto a supporting structure by a pair of fasteners, such as screws, which will replace bolts 120 and extend directly through holes 119 into the supporting structure eliminating the need for bracket 108. Again, after securing bottom clamp body 116 to a supporting structure, top clamp body 117 is then secured thereto by bolts 126. It is readily apparent that bottom clamp member 116 can be mounted at various angles on a supporting structure, whether it extends vertically, horizontally, or on the side, top or bottom of a structure such as a cabinet or wall, after which the angular position of the valve body can be adjusted thereon as shown in FIG. 8.

When a user wishes to use handle 20 for cleaning an area adjacent collar 25, he or she will manually pull outwardly on handle 20 extending hose 16 from within its stored position within conduits 9 or 23 to a desired length. Locking finger 87 will pivot freely in the direction of arrow A of FIG. 14 enabling hose 16 to slide past locking end 89 of finger 87 until the desired amount of hose is pulled from within the conduit. Locking finger 87 will pivot automatically in the direction of arrow B by the bias of spring 104 whereupon locking end 89 will automatically become engaged in a locking relationship within one of the valleys 90 formed between adjacent peaks 92 of hose 16. The operator can easily extend the hose further from within the conduit by merely pulling outwardly on the handle whereupon the lock finger will pivot out of locking engagement with hose 16 until the desired length is reached. Upon stopping this outward movement locking finger 87 will immediately assume another locked position within another valley 90. To unlock hose 16, the operator merely pivots locking finger 87 out of its locked position by manually moving finger tab 91 in the direction of arrow A of FIG. 14 to the unlocked position of FIG. 16. In this position, locking end 89 is removed from within its locked position with the hose. Finger 87 will remain in the unlocked position of FIG. 16 after being manually moved to this position by the biasing action of spring 104.

The hose will be automatically withdrawn into the interior of the conduit after unlocking finger 87 by the force of the vacuum or by a coil spring within the hose, which construction and action is well known in the vacuum cleaning art. Hose 16 can be a rigid non-expandable hose if desired, which also is easily retracted within the conduit by the vacuum force and by manually pushing the hose back into the conduit when a cleaning operation is completed. In a typical installation, hose 16 may have a length of approximately 7 feet and extendable to a length of approximately 30 feet. Locking collar 25 is easily adaptable for use with various types of cleaning hoses whether they be the expandable type with or without internal springs, or a more rigid non-expandable hose.

When collar 25 is used in a vacuum cleaning system having multiple inlets such as shown in FIG. 1, a sealing end cap 137 (FIG. 2) is provided for manually placing over the open end 26 of handle 20 to seal the open end. End cap 137 in combination with sealing ring 57 as shown in FIG. 12 sufficiently seals the vacuum in conduits 9 or 23 and the open end of the handle. This double seal effectively seals the vacuum within the conduit and open end of the handle, enabling the vacuum supply to maintain the vacuum on the other inlets as shown in FIG. 1 and eliminates collar 25 from being enclosed in an air-tight box as in prior art inlet valves. End cap 137 preferably will have a tether (not shown) either connected to mounting plate 108, handle 20 or collar 25. When collar 25 is used in a single inlet dedicated vacuum cleaning system as shown in FIG. 1A, no end cap 137 will be required.

If desired, end cap 137 could be replaced with a type of molded holster (not shown) which will hold the handle in a stored position and seal the handle end simultaneously within the concept of the present disclosure.

In summary, the vacuum cleaning system and collar of the present disclosure enables the system to be installed in a usual dwelling with multiple vacuum inlets and particularly in an RV where space is at a premium. The collar can be mounted at various positions on a variety of supporting structures by a simple L-shaped mounting bracket 108 or directly by clamp members 116 and 117 which rotatably mount the collar body thereon enabling it to be rotated to a variety of positions. This adjustability of mounting the collar on the bracket in a variety of angular positions, as well as the rotational mounting of the collar body on the supporting clamp brackets enables the collar to match the available space and enables the user to easily grasp the handle therefrom when performing a cleaning operation.

The use of internal sealing ring 57, together with the sealing provided by end cap 137, enables the collar to be used in a multiple inlet valve vacuum cleaning system and provide an inlet valve which is open to the ambient atmosphere avoiding the additional expense of providing an air-tight inlet valve. The incorporation of switch 100 in the locking mechanism housing provides a readily accessible means of turning the vacuum system ON and OFF. Likewise, ring 55 provides a retention mechanism to assist in retaining handle 20 within the collar as shown in FIG. 12 in addition to assisting the vacuum seal therewith. Again, the rotational mounting of the collar body offers a wide degree of installation versatility while still securely holding the handle in a stored position, and the selective mounting of the clamp members on the bracket and the L-shaped configuration of the bracket and multiple mounting holes allows installation at various angular orientations and on various supporting structures, especially in an RV where space is at a premium.

Figure 18:
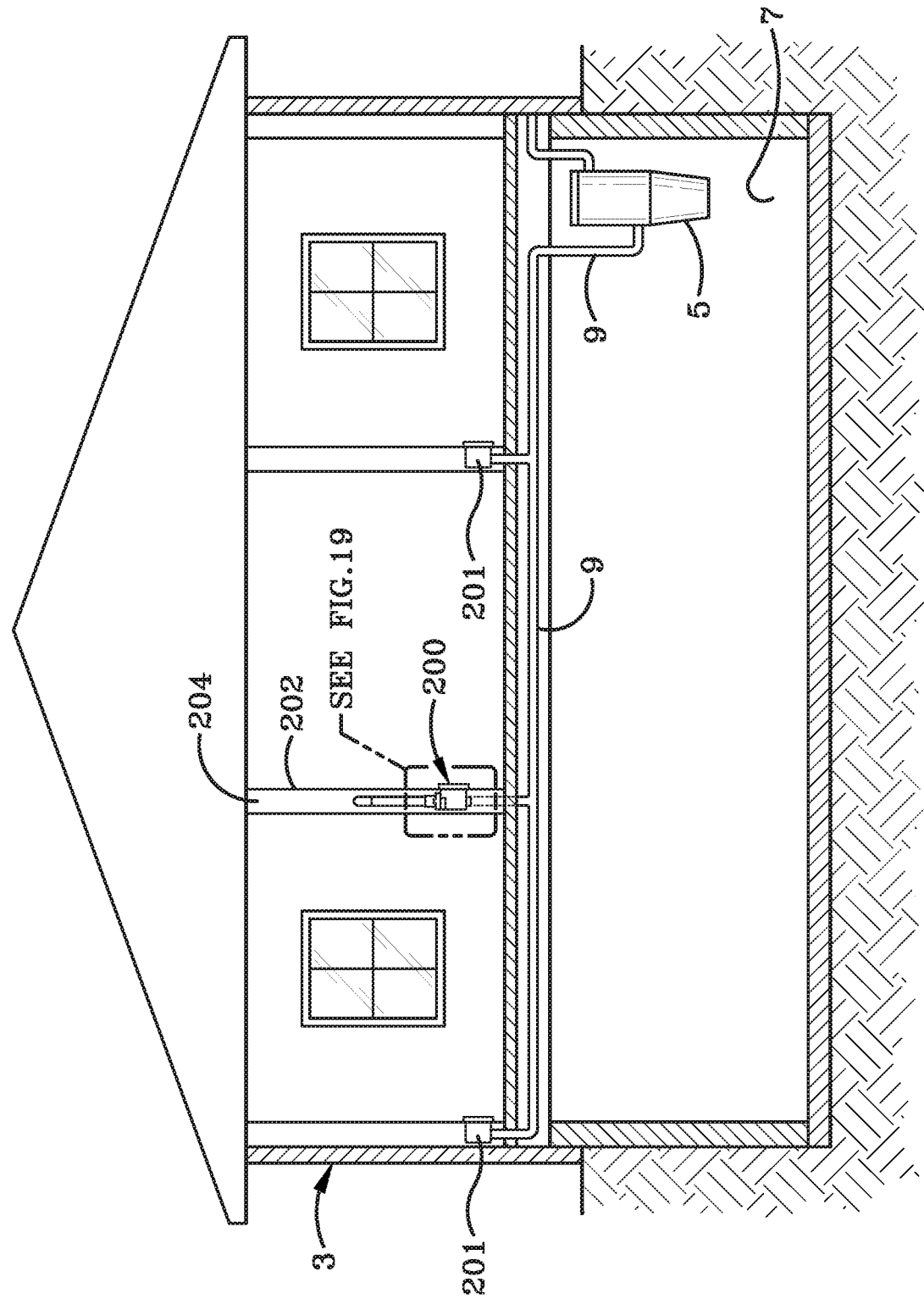
FIG. 18 is a diagrammatic view similar to FIG. 1 showing other types of inlet valve boxes mounted within a structure.
Figure 19:
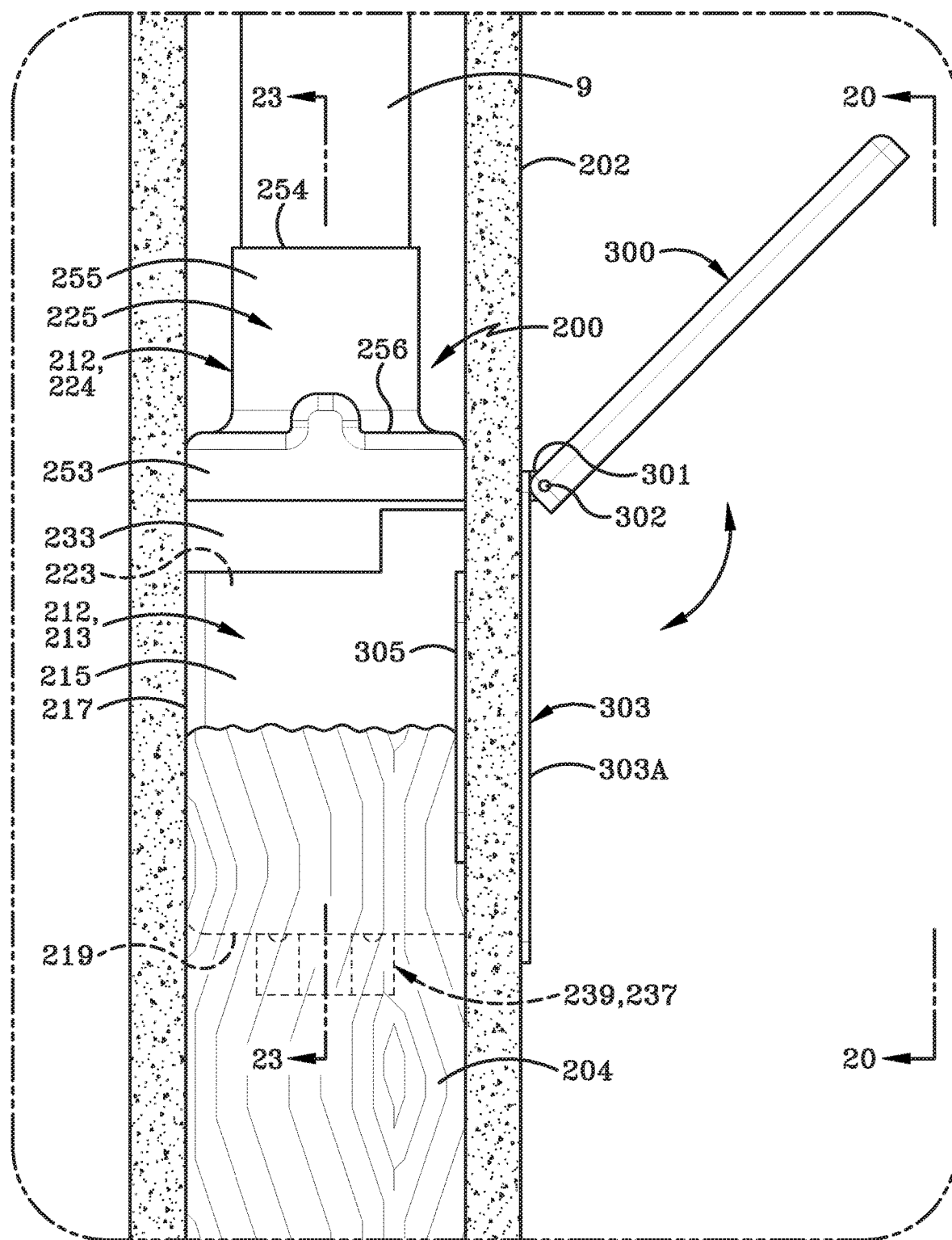
FIG. 19 is an enlarged view of the encircled portion of FIG. 18 with portions broken away showing another type of inlet valve of the present disclosure mounted in a wall opening with the closure door in open position.

FIG. 18 is another example of a central vacuum cleaning system in which another embodiment of the inlet valve of the present disclosure is incorporated, and which is indicated generally at 200. Inlet valve 200 is shown mounted within structure 3 and connected to central vacuum source 5 by a conduit 9. The vacuum system may contain other types of inlet valves such as indicated at 201, located at other locations in the structure. Again, the number of conduits and inlet valves and types of inlet valves will depend upon the size of the structure, number of rooms, size of the vacuum source 5, and other factors.

Inlet valve 200 is shown particularly in FIGS. 18-26 attached to a wall stud 204 and accessible through an opening formed in an attached wall board 202, such as drywall used in a usual home construction. Inlet valve 200 of this modified embodiment is hereafter referred to as a valve box to distinguish from locking collar 25 discussed above. Valve box 200 can be used in various types of constructions and other structure locations than that shown in FIGS. 18 and 19 within the concept of the present disclosure.

Valve box 200 includes a main body or housing indicated generally at 212, formed by a lower portion 213 and an upper portion 224. Lower portion 213 (FIGS. 20A and 21A) is formed by a pair of side walls 215, a rear wall 217, a top wall 218 and a bottom wall 219, which walls define an interior chamber 214, a front or outer end opening 221 and an open top 223. Lower portion 213 preferably will have a rectangular shape as shown in FIG. 21A.

Upper portion 224 (FIGS. 20B and 21C), includes a box top 225 which is mounted on and encloses open top 223 of lower portion 213. The upper edges of side walls 215 of lower portion 213 are formed with U-shaped channels 227 (FIG. 20A) which slidably receive therein complementary-shaped channels 229 formed alongside walls 231 of a lower rectangular-shaped bottom portion 233 of box top 225 to mount upper portion 224 on lower portion 213. This sliding engagement enables lower portion 213 and upper portion 224 of housing 212 to be produced independently, preferably of a molded plastic, and then assembled after the various internal components thereof which are described below, are mounted respectively in lower portion 213 and top portion 224.

An enlarged opening 235 (FIG. 22A) is formed in bottom wall 219 of lower portion 213 of housing 212 and receives therein a generally rectangular portion 237 (FIGS. 20A, 21A, and 22A) of a bottom bracket indicated generally at 239, which is secured therein by screws 238. It is readily understood that portion 237 and complementary-shaped opening 235 can have other shapes such as round, oval-shaped, etc. Bracket 239 is formed with a pair of spaced vertically extending channels 241 (FIG. 23) in which are mounted a pair of compression coil springs 243. Springs 243 engage a horizontally extending pin 245 which extends through a diametric hole 247 formed in a ball 249. Ball 249 is located in a central channel 251 formed in bottom bracket 239. A downwardly extending ramp 240 (FIGS. 20 and 22B) is formed by a recessed area in top wall 242 which is formed with an upper flange 244 in which ball 249 is located. The purpose and function of bracket 239 and ball 249 are described further below.

Box top 225 (FIGS. 20B, 21C and 25), in addition to having a lower rectangular portion 233, includes a cylindrical intermediate portion 253 which is connected to an upper reduced diameter cylindrical top portion 255 by a horizontal annular portion 256 providing a bell-shaped configuration to box top 225. Box top 225 is formed with a hollow interior 258 which terminates in a top opening 254. Box top 225 preferably will be a one-piece molded plastic member as are portions 213 and 224 of housing 212. The hollow interiors 214 and 258 of lower portion 213 and box top 225 provide a through bore for inlet valve 200 which terminates in inner open end 254 and outer open end 221 for the passage of a flexible hose 285 therethrough.

Figure 25:
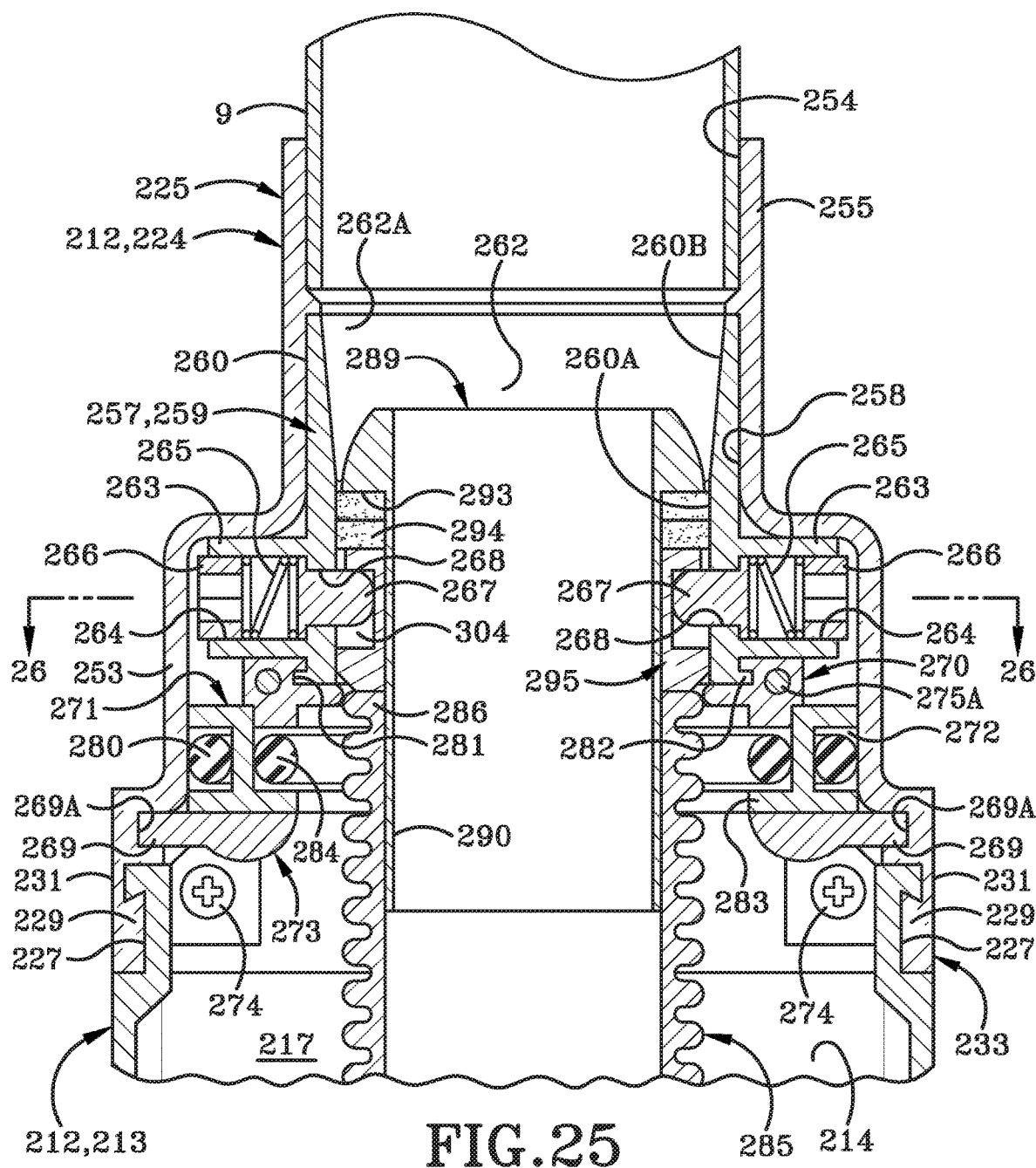
FIG. 25 is an enlarged fragmentary sectional view taken on line 25-25 in FIG. 24 of the distal end of the hose when the hose is in a fully extended position.
Figure 26:
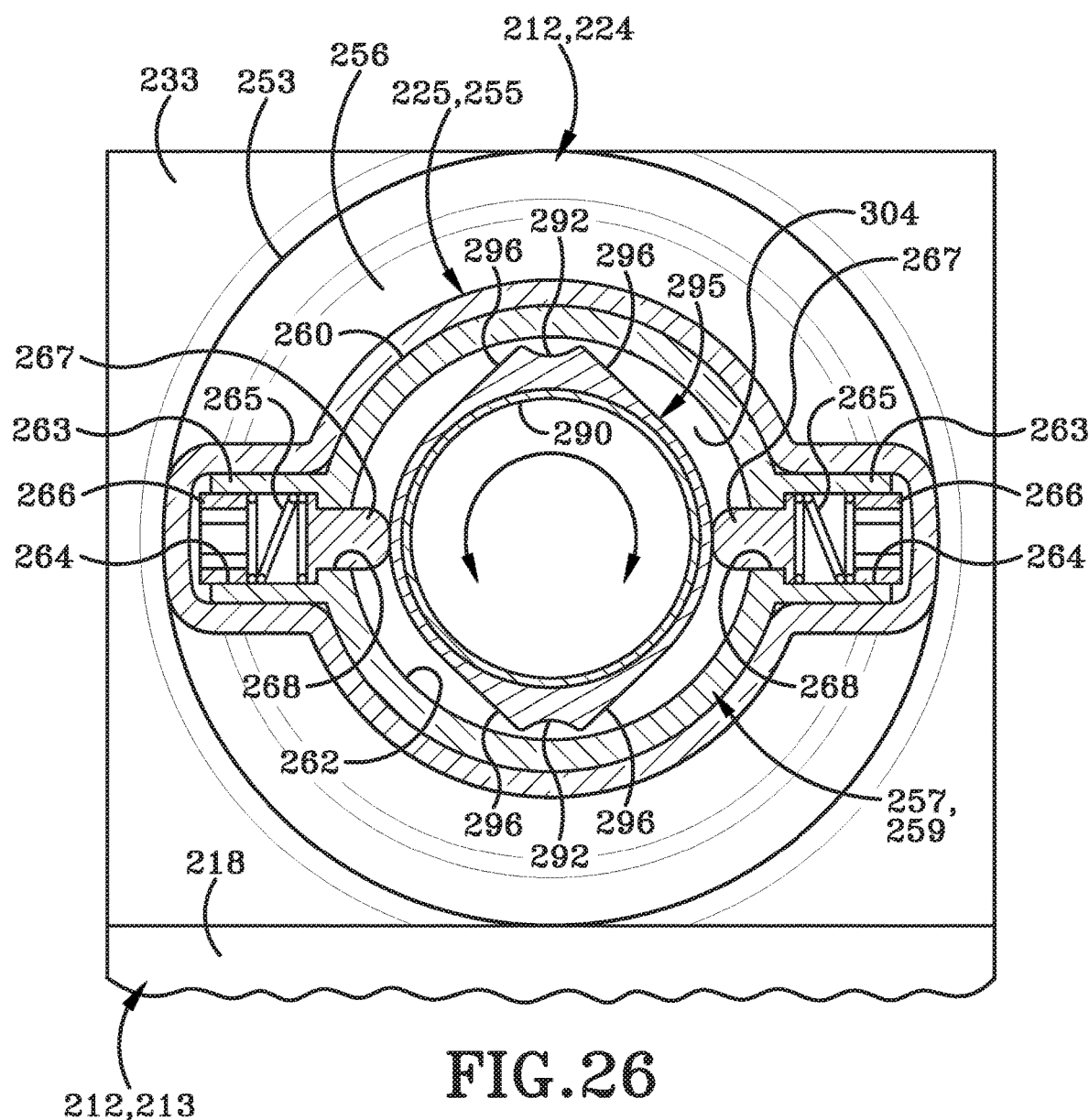
FIG. 26 is a sectional view taken on line 26-26 in FIG. 25.

Within box top 225 is a cylindrical sleeve (FIGS. 22A, 22B, 24 and 25) indicated generally at 257, which provides another seal when the hose reaches its fully extended position as discussed further below. Sleeve 257 has a generally annular configuration formed by an annular wall 259 which has a cylindrical outer surface 260 and a cylindrical lower inner surface 260A which terminates in an outwardly tapered upper inner annular surface 260B which forms a top opening 262A. A pair of diametrically opposed cylindrical lugs 263 extend outwardly from annular wall 259 (FIGS. 25 and 26). Each lug 263 has a hollow bore 264 in which is contained a spring 265 retained therein by an end plug 266. Each spring 265 biases a button 267 outwardly through a hole 268 formed through wall 259 and into the hollow bore 262 of cylindrical sleeve 257. The function of buttons 267 is described further below.

Figure 20:
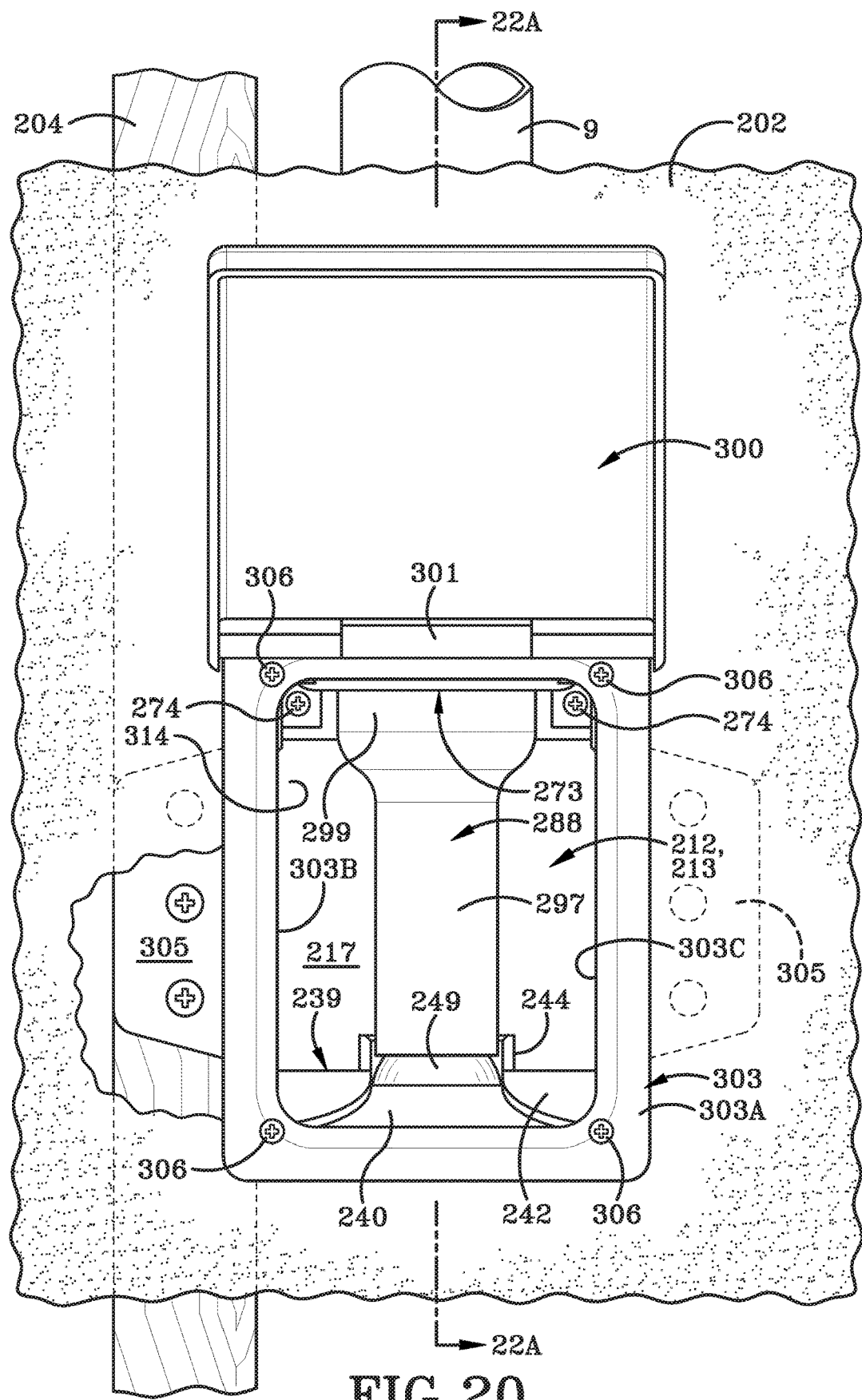
FIG. 20 is a front elevational view looking in the direction of arrows 20-20 in FIG. 19.
Figure 20B:
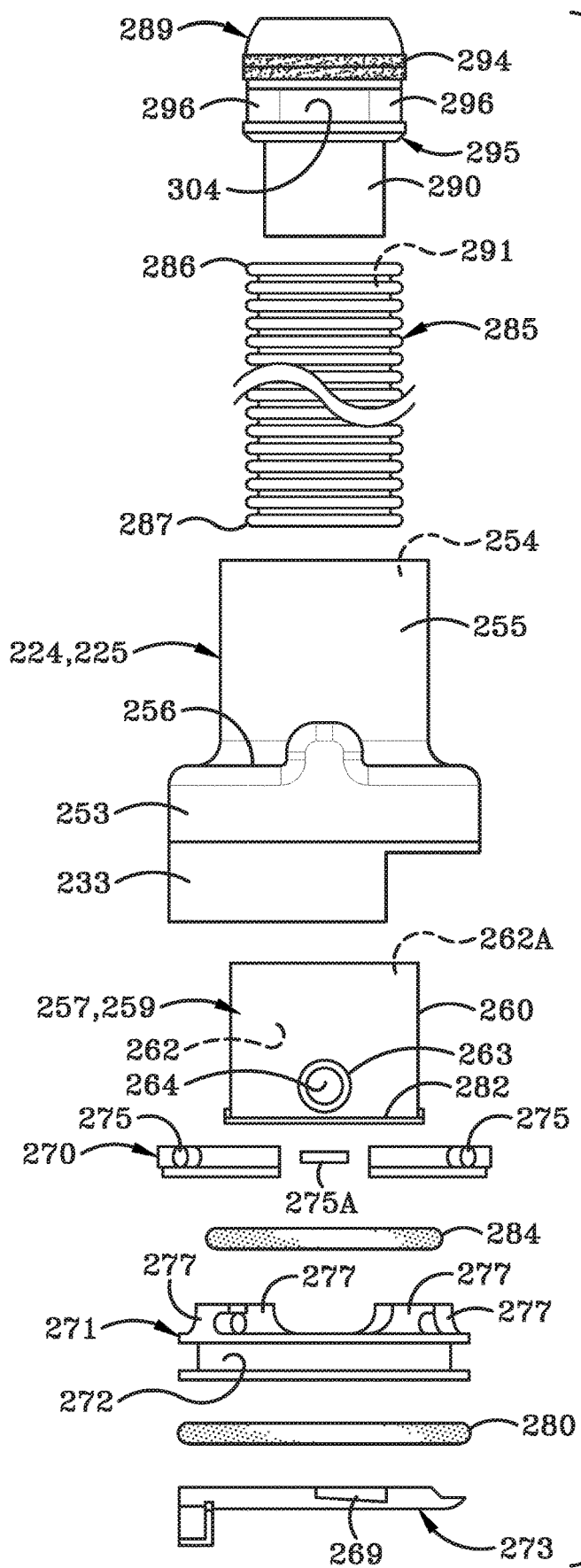
FIG. 20B is an exploded side elevational view of many of the components in the upper portion of the valve box of FIGS. 20-20A and the distal end of the vacuum hose.
Figure 21C:
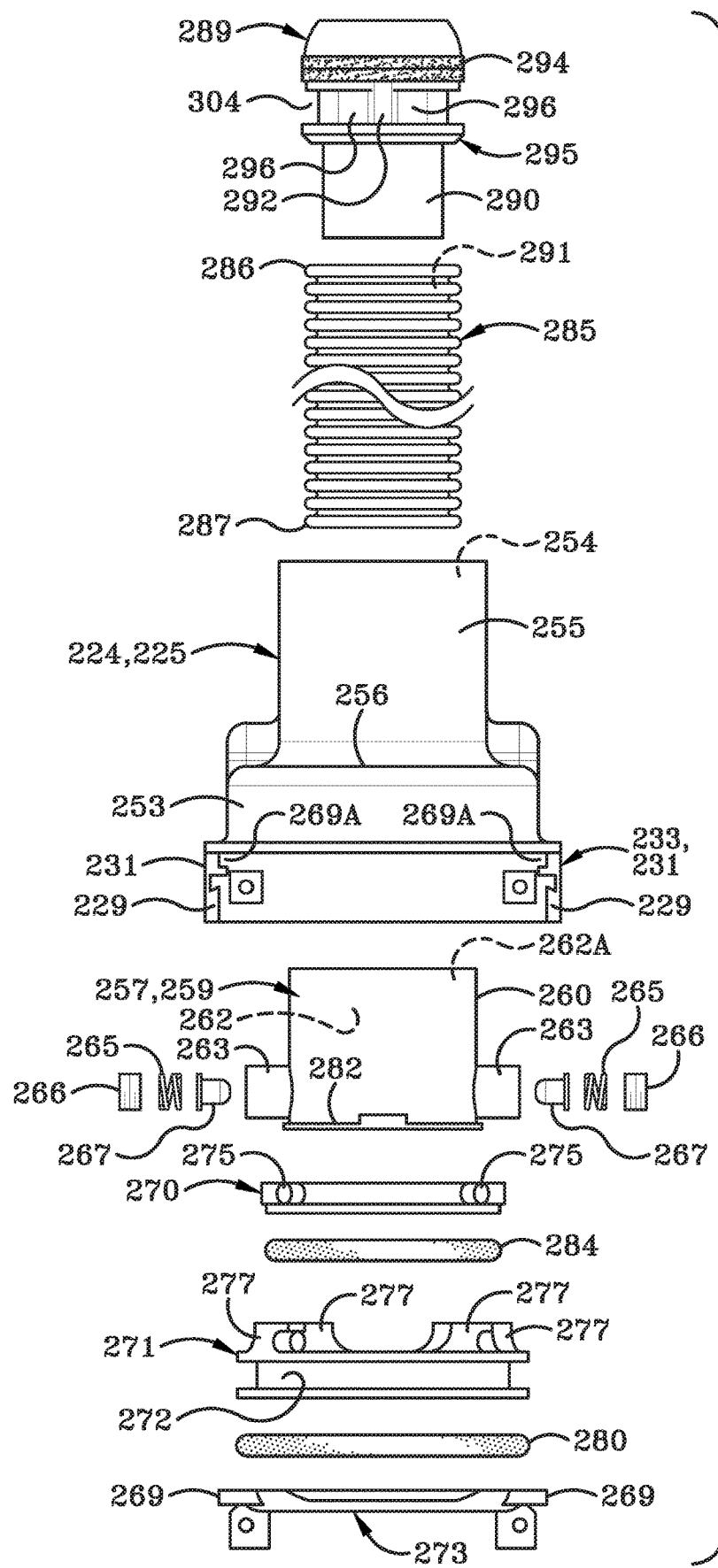
FIG. 21C is an exploded elevational view of the upper components of the valve box and distal end of the vacuum hose as shown in FIG. 20B.

Sleeve 257 is retained within interior 258 of box top 225 by a slip-fit engagement and by a two-piece hose stop ring indicated generally at 270 (FIGS. 20B and 21C). Ring 270 is clamped against the bottom of annular wall 259 of sleeve 257 by an annular O-ring support ring, indicated generally at 271 (FIG. 25). Ring 271 is seated upon and secured within box top 225 by a one-piece horseshoe-shaped retaining bracket 273. Bracket 273 is secured within the bottom of box top 225 by a pair of lugs 269 which are slidably received in a pair of channels 269A formed in lower rectangular portion 233 of box top 225 and then by a pair of screws 274 or other type fasteners. Retaining bracket 273 can be easily removed from valve box 200 together with support ring 271 and split ring 270 for ease of repair should the need arise in the future.

Ring 270 includes four outwardly projecting studs 275 which are slidably received in four channel forming lugs 277 projecting upwardly from O-ring support ring 271 which assembles stop ring 270 and support ring 271 within the box top 225. Ring 270 has a cylindrical inner channel 281 in which is seated the bottom circular edge 282 of sleeve 257. Top opening 254 of box top 225 slidably receives an end of a rigid conduit 9 therein and is secured usually by some type of an adhesive. The two semicircular pieces which form ring 270 are joined by a pair of pins 275A (FIGS. 20B and 25).

It is readily understood that ring 270 can be a single piece and not a split ring as described above and which provides some resistance to the hose being pulled out of valve box 200 but not prevent it from being removed therefrom. This will enable the hose to be replaced if necessary, without removing the valve box from the wall.

O-ring support ring 271 has an outer u-shaped channel 272 in which is secured an outer O-ring 280 and an inner annular ledge 283 on which is supported an inner O-ring 284. Inner and outer O-rings 284 and 280 of support ring 271 form an upper sealing assembly 310 for engaging a debris pickup nozzle handle indicated generally at 288, as shown in FIG. 22A, the function of which is described further below.

A length of a usual type of a flexible vacuum cleaning hose 285 is slidably mounted within the interior of conduit 9 and has a distal end 286 and a nozzle end 287 on which is mounted a nozzle handle 288. Referring to FIGS. 20B, 21C and 22A, a hose plug indicated generally at 289, is mounted in distal end 286 of hose 285 by inserting a cylindrical tubular end section 290 into the interior bore 291 of hose 285 and secured therein by an adhesive, friction fit, threaded connection or other type of securement means. The top end of hose plug 289 is curved downwardly and forms a bottom annular horizontally extending ledge 293 against which is seated a sealing ring 294. Sealing ring 294 is formed of a flexible material, preferably a felt-type of material, and has an annular configuration with an outer diameter just slightly smaller than the inside diameter of conduit 9. An annular button release ring indicated generally at 295, is secured to and extends about cylindrical tubular end section 290 of plug 289 and clamps sealing ring 294 in position against ledge 293. Ring 295 preferably is secured on end section 290 by an adhesive or other type of attachment. Ring 295 is formed with an annular channel 304 having a pair of camming surfaces 296 which are separated by a pair of diametrically opposed vertically extending grooves 292 the function of which are discussed below (FIGS. 25 and 26).

Nozzle handle 288 is of a usual construction having a cylindrical elongated end 297 which terminates in a debris pickup end opening 298 (FIGS. 20A and 22A). End 297 flares outwardly into a cylindrical hose attachment end 299 into which the nozzle end 287 of hose 285 is secured by an adhesive, threaded attachment or other type of securement means.

Hose 285 is of a usual construction used for central vacuum cleaning systems and has sufficient flexibility to move into and out of valve box 200 and around bends in the conduit when manipulated by an individual during use and which slides easily along the interior of conduit 9 yet provides a sliding vacuum seal therebetween by sealing ring 294. Hose 285 can be the type which is non-extendable or stretchable as used in many types of vacuum cleaning systems within the concept of the present disclosure.

The other edges 215A of housing side walls 215, edge 219A of bottom wall 219 and edge 218A of top wall 218 form front end opening or port 221 through which nozzle handle 288 and hose 285 extend from for performing a debris pickup cleaning operation and then retracted into the housing for subsequent storage in the interior chamber 214 of housing 212. Preferably, an outer closure door 300 (FIG. 21B) is pivotally mounted at the upper end of lower portion 213 of housing 212 at the junction with box top 225 for opening and closing front end opening 221 in order to conceal interior chamber 214 of lower portion 213 and to provide an attractive faceplate for valve box 200 when mounted on wall stud 201 or other support structure. Door 300 is pivotably mounted with respect to housing 212 by a pivot pin 302 which extends through a flange 301 formed on and extending outwardly from a door mounting frame indicated generally at 303. Door mounting frame 303 has a rectangular outer frame 303A and a rectangular inner frame 303B which defines a rectangular opening 303C. Inner frame 303B extends perpendicularly from outer flange 303A.

Figure 22B:
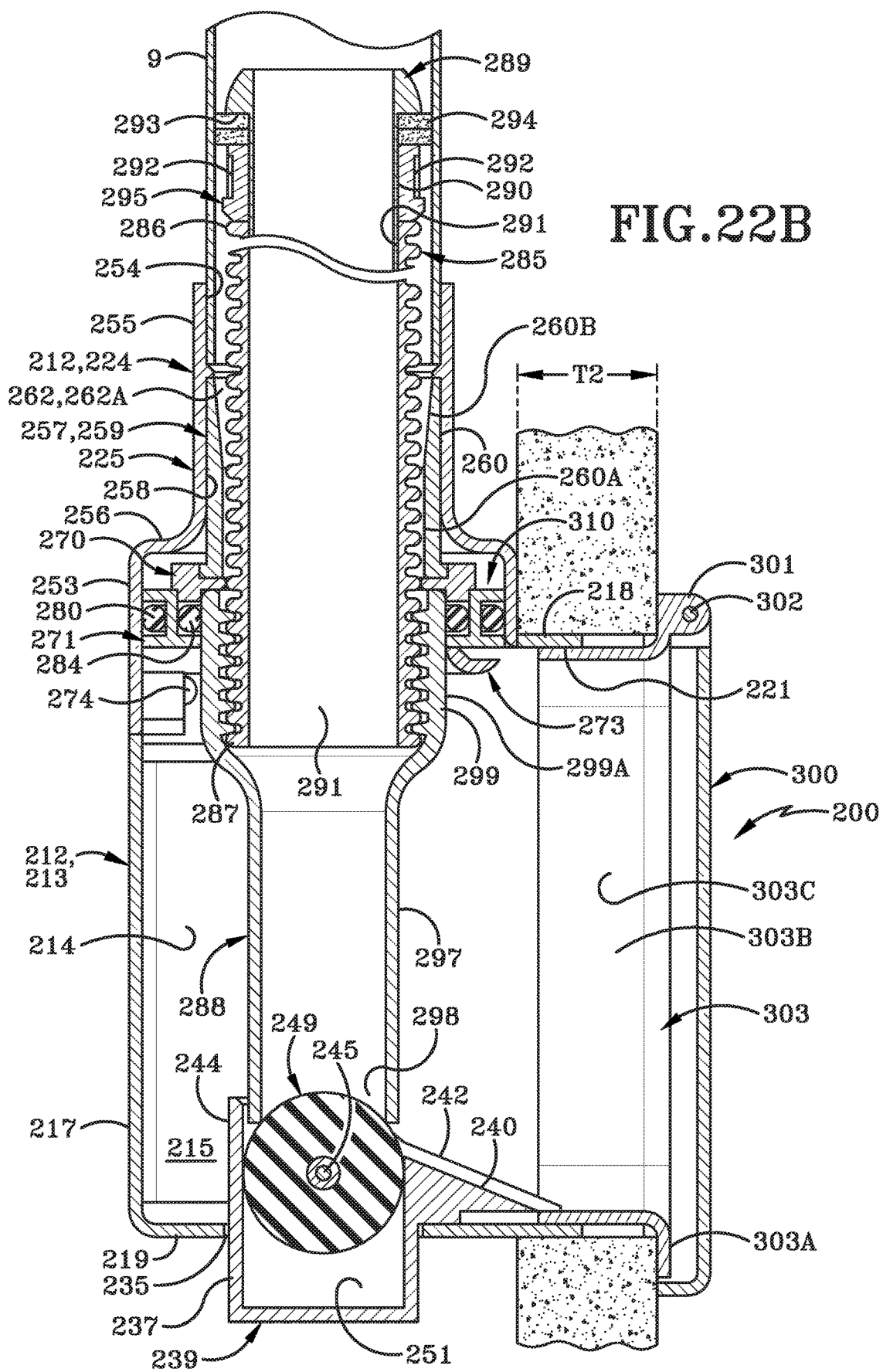
FIG. 22B is a sectional view similar to FIG. 22A showing the valve box mounted in a structure having a thicker outer wall than that shown in FIG. 22A.
Figure 23:
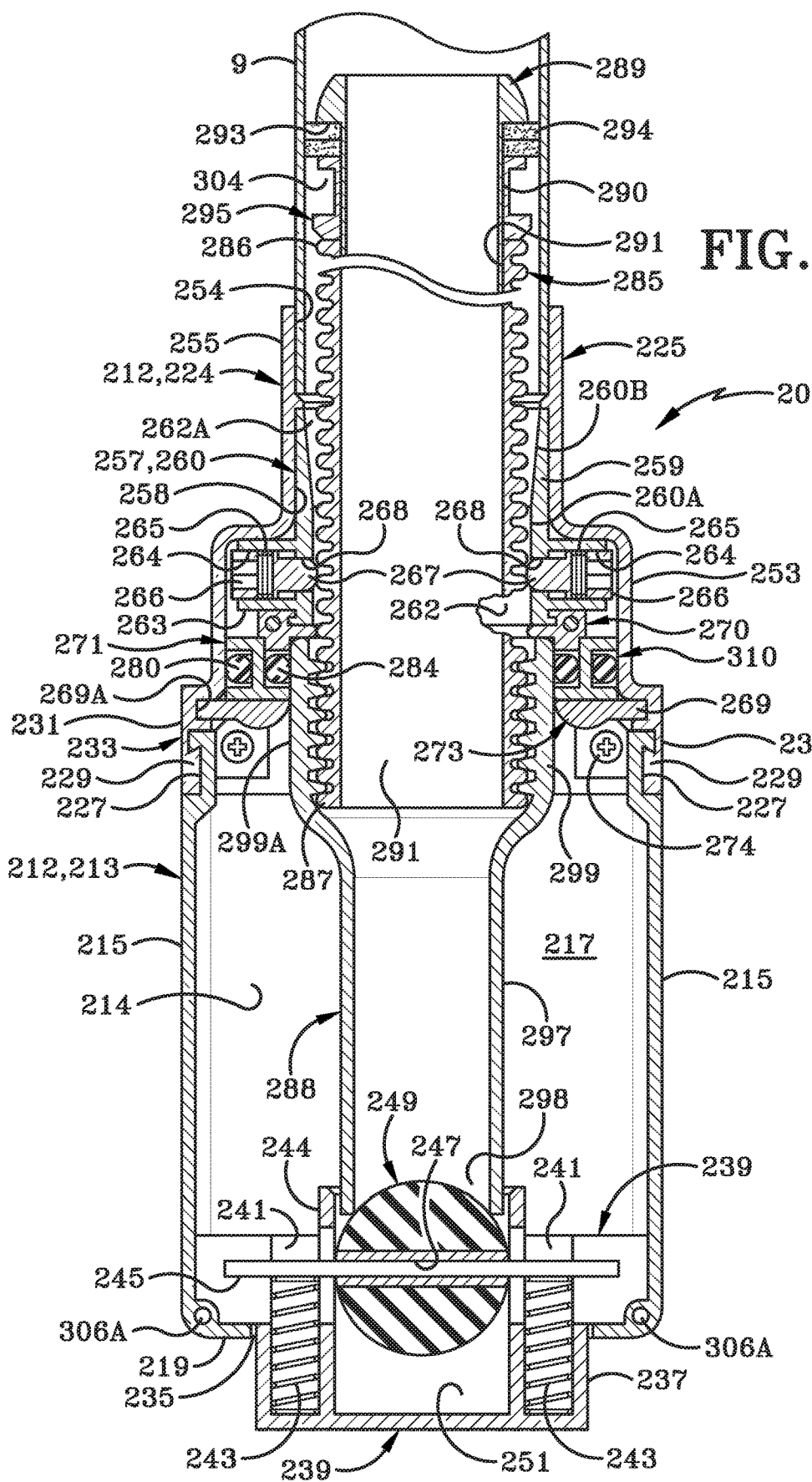
FIG. 23 is a vertical sectional front view of the valve box similar to FIG. 22A.

Door frame 303 is adjustably mounted on lower portion 213 of housing 212 by inner frame 303B forming a sliding friction fit with the interior surfaces of side walls 215, bottom wall 219 and top wall 218 as shown in FIGS. 22A and 22B to compensate for different thicknesses T1 and T2 of wall boards 206. The bottom member of inner frame 303B is slidably received beneath ramp 240 of bottom bracket 239 to assist in retaining door frame 303 on lower portion 213 of housing 212. Door frame 303 is secured to housing 212 by a plurality of fasteners 306 which extend into preformed holes 306A formed in the corners of lower portion 213, as shown in FIGS. 20 and 20A.

One or more mounting flanges 305 are formed integrally with or attached to one or both side walls 215 of lower portion 213 and extend outwardly therefrom for mounting valve box 200 to wall stud 204 or other support structure, which could be the aluminum or wood studs of a building, a concrete wall or other type of material from which the structure is formed. Door 300, door frame 303, mounting flanges 305 and valve box 200 can be formed of various materials such as of a rigid molded plastic or various other types of metal materials without affecting the concept of the invention.

In accordance with one of the features of the invention, lower portion 213 of housing 212 and box top 225 and their relationship to each other and to door 300 do not require or form an air-tight structure since such a condition is not required due to the unique double seal arrangement described further below.

The manner of use of valve box 200 within the vacuum system shown in FIG. 18 and the interrelation and function of the various components discussed above are now described in detail. As previously stated, one of the main advantages of valve box 200 is that it is not a sealed box as in prior art inlet valves used in central vacuum cleaning systems. This feature is achieved by providing upper and lower seals in housing 212 by the use of lower bottom bracket 239 containing sealing ball 249 and upper sealing assembly 310 containing O-rings 280 and 284 with additional sealing assistance by sealing ring 294 on the distal end of hose 285 and the inner surface of sleeve 257 as shown in FIGS. 22A and 24.

When nozzle handle 288 is in a retracted stored position (FIGS. 19, 22A and 23), ball 249 is biased upwardly by coil springs 243 into sealing engagement with end opening 298 of the nozzle handle. This seals the vacuum created within hose 285 by vacuum source 5 from the surrounding atmosphere. Also, when nozzle handle 288 is in this retracted stored position, upper sealing assembly 310 and in particular inner and outer O-rings 280 and 284 will seal the vacuum created within conduit 9 from the ambient atmosphere and interior of housing 212 (FIG. 6A). Thus both the vacuum created within the hose and that created within the connecting conduit is completely sealed within housing 212. This avoids the necessity of providing an air-tight box as required by other inlet valves for central vacuum cleaning systems.

Figure 24:
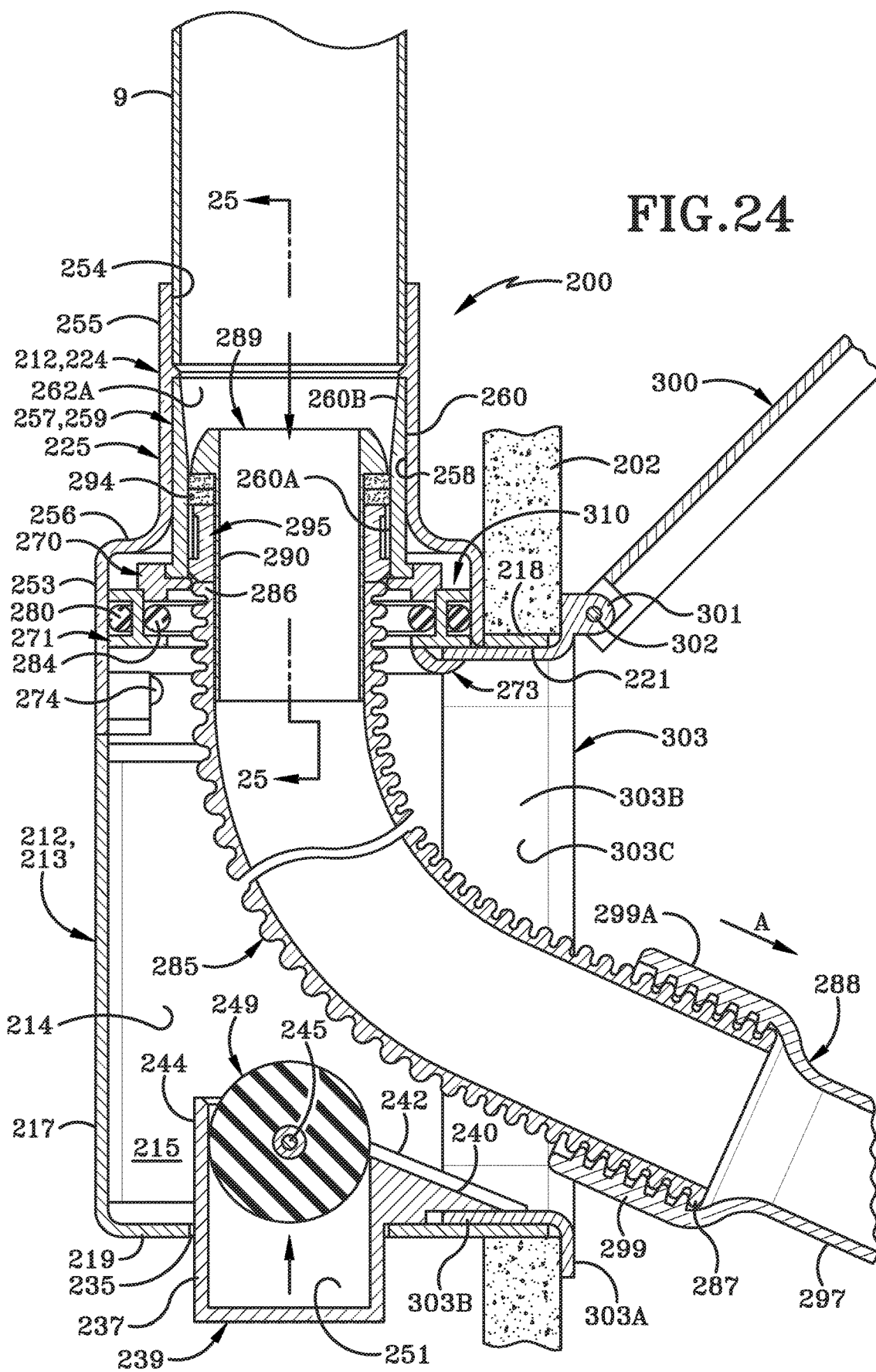
FIG. 24 is a side sectional view similar to FIG. 22B showing the nozzle handle removed from the valve box and the hose in a fully extended position.

When an individual desires to perform a cleaning operation, the individual merely grasps nozzle handle 288 and pulls outwardly, as shown by arrow A in FIG. 24, which will automatically cause ball 249 to be depressed downwardly within central channel 251. Continuing pulling outwardly on nozzle handle 288 will slide the hose along the interior of conduit 9 until a desired length is pulled from valve box 211 for use in a debris pickup cleaning operation. Hose plug 289, and in particular sealing ring 294, will provide a sliding seal within the interior of conduit 9 throughout its length of travel therein. This provides a sufficient seal so that most of the vacuum within conduit 9 is applied to end opening 298 of nozzle handle 288. After a cleaning operation has been completed, the user merely pushes the nozzle handle and hose back into valve box 200 through front end opening 221 in an opposite direction to that of arrow A in FIG. 24 until the end of the nozzle handle engages ramp 240 of bottom bracket 239 and upon continuing moving inwardly will easily depress ball 249 against springs 243 until the nozzle handle is fully seated in the housing after which the springs will bias ball 243 into sealing engagement with end opening 298 of nozzle handle 288 as shown in FIG. 22A. Nearly simultaneously with ball 249 sealing end opening 298, O-ring 284 will provide an air-tight seal with cylindrical outer surface 299A of hose attachment end 299. This operation is performed relatively easy by a user merely pushing the nozzle handle inwardly resulting in the hose sliding further into conduit 9. The vacuum created within the conduit also assists in pulling the hose into conduit 9. To remove nozzle 288 from housing 212, a user merely grasps cylindrical end 297 of the nozzle handle and pulls outwardly automatically depressing ball 249 enabling the hose to be easily pulled from housing 212.

Another advantage of the present disclosure is that hose stop ring 270 in combination with buttons 267 prevent the distal end of the hose from being pulled completely from valve box 200. As shown in FIGS. 24-26, upon distal end 286 of hose 285 reaching valve box 200, buttons 267 by the biasing force of springs 265 will snap into engagement within annular channel 304 of ring 295 and into engagement with camming surfaces 296 which prevents further movement of the hose in an outwardly direction from housing 212. After the cleaning operation has been performed, the individual merely will grasp the portion of hose 285 adjacent front end opening 221 of housing 212 and upon a slight rotation thereof will move camming surfaces 296 along the ends of buttons 267 until the buttons reach vertically extending grooves 292 (see FIGS. 24 and 26) whereupon a slight inward pressure on the hose coupled with the vacuum applied to conduit 9, will enable the hose to slide easily inwardly into the conduit until nozzle handle 288 reaches housing 212. Again, upon reaching this position, the nozzle handle will move easily along ramp 240 and over ball 249 until the ball snaps into sealing engagement with the open end of nozzle 288. Thus, a user will merely rotate the hose and push slightly inwardly which will automatically disengage the buttons from end plug 266 enabling the hose to be withdrawn easily into the conduit. The movement of nozzle handle 288 into the interior of housing 212 will automatically engage inner O-ring 284 of sealing assembly 310 with the external surface of nozzle 288. Thus, again upon replacing nozzle end 288 into housing 212, the vacuum within the hose and nozzle is sealed by ball 249 and the vacuum within conduit 9 is sealed by sealing assembly 310.

Also as shown in FIG. 25, as distal hose end 286 reaches box top 225 upon the full extension of the hose from within the valve box, sealing ring 294 will move along tapered annular surface 260B of sleeve 257 until providing a seal against cylindrical inner wall 260A of annular wall 259 as shown in FIG. 24. This creates an effective seal enabling the full power of the vacuum to be applied to the interior of hose 285. Thus, while the hose is being pulled from within valve box 211, a seal is applied by sealing ring 294 along the inside of conduit 9 and which will be maintained throughout the movement of hose 285 through conduit 9 and into box top 225 to its full extended position as shown in FIG. 25. Sealing ring 294 will maintain a sliding seal with the interior of conduit 9 as the hose is retracted back into conduit 9 until nozzle handle 288 reaches its final retracted stored position as shown in FIGS. 22A and 22B where an effective seal is created by ball 249 and upper seal assembly 310 provided by inner O-ring 284 and outer O-ring 280. Ball 249 provides a seal for the vacuum within the hose and nozzle handles, and upper seal 310 provide an effective seal from any area on the outside surface of the hose.

Figure 27:
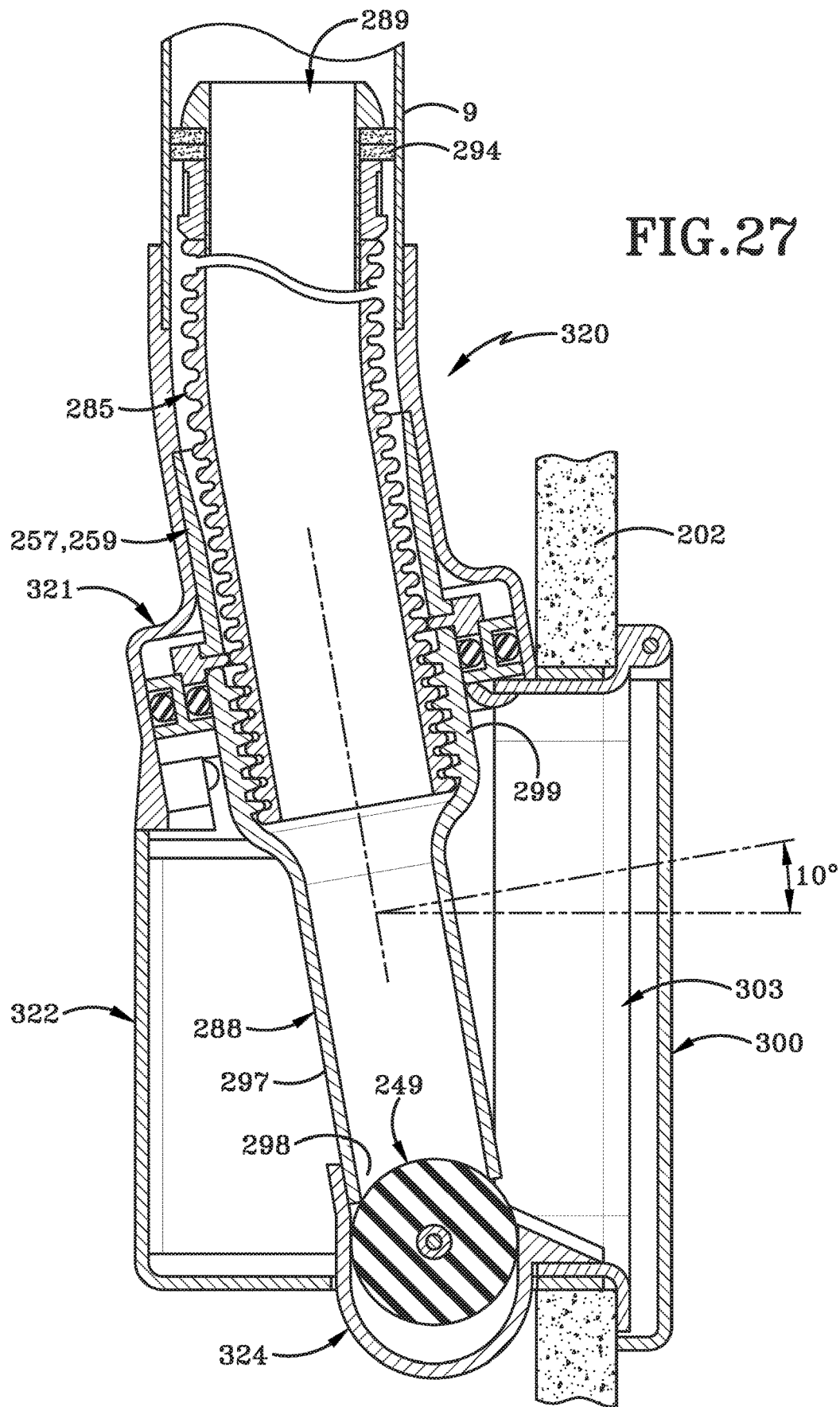
FIG. 27 is a side elevational view similar to FIG. 22A showing a modified valve box and seal assembly.
Figure 28:
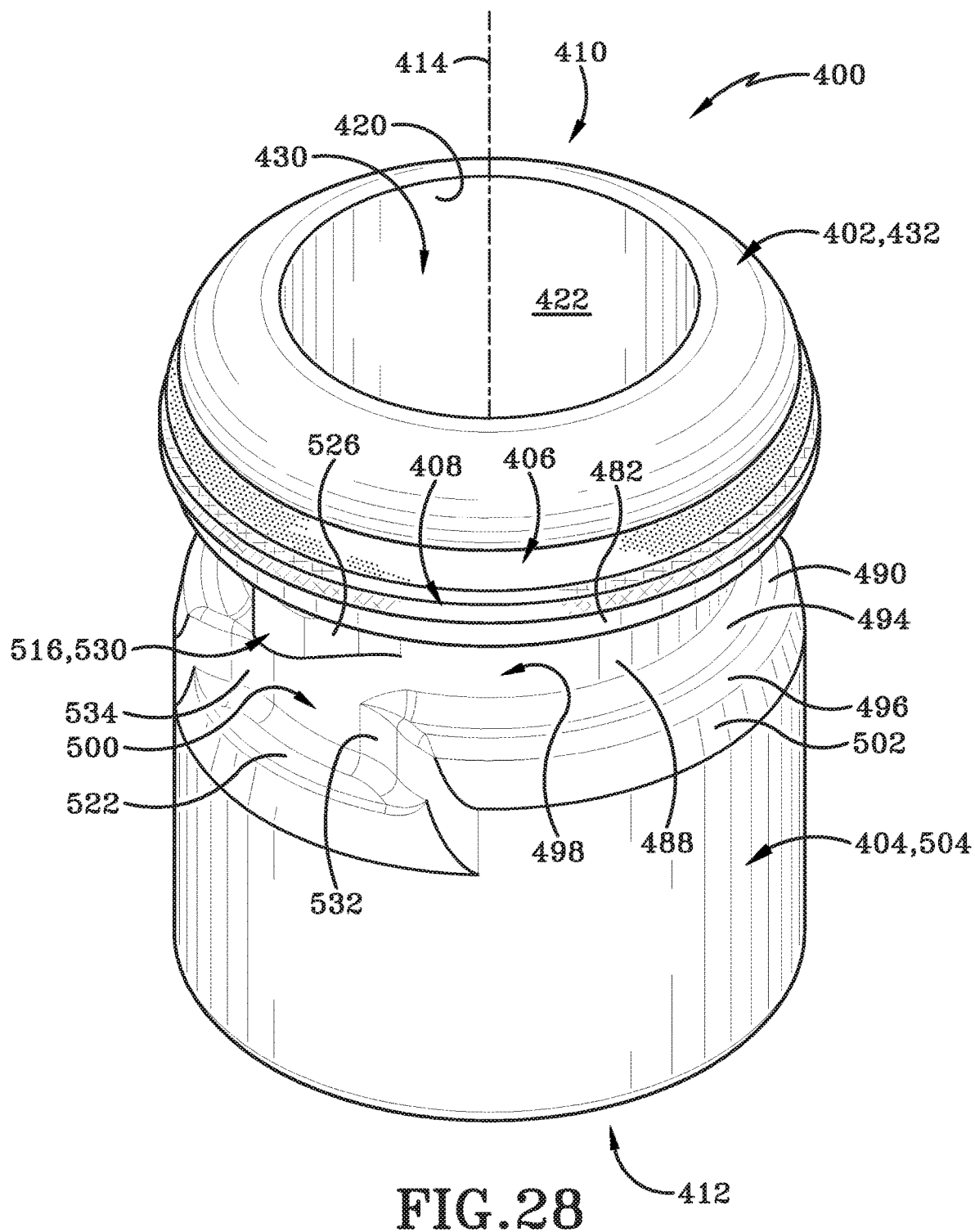
FIG. 28 is a perspective view of a hose plug in accordance with an alternative embodiment of the present disclosure.

A modified embodiment of valve box 200 is shown in FIG. 27 and is indicated generally at 320. Valve box 320 is nearly identical to that of valve box 200 discussed above, with the main difference being that a top box 321, which is nearly identical to box top 225, is at an angle of approximately 10 degrees with respect to a lower rectangular portion 322 which again is similar or nearly identical to lower portion 213 of valve box 200. This angular relationship facilitates the outward pulling movement on nozzle handle 288 making it easier to remove the nozzle handle from within the valve box and/or replacing the same therein. It also reduces the amount of force needed for nozzle handle end to depress ball 249. The other components of this embodiment are similar or the same as that described above with respect to valve box 200 and thus are not described in further detail.

It is readily understood that an ON/OFF switch (not shown) could be mounted in valve box 200 or closely adjacent thereto and connected by wires to vacuum source 5 for controlling the vacuum source as used in many types of prior art valves.

As depicted in FIG. 28 through FIG. 35, a hose plug in accordance with an alternative embodiment of the present disclosure shown generally at 400. Hose plug 400 may include a first section 402, a second section 404, a first seal or O-ring 406, and a second seal or felt ring 408. Hose plug 400 includes a first end 410 opposite a second end 412, defining a longitudinal axis 414 therebetween. Some portions of the hose plug will be described relative to the longitudinal axis 414 and may be used in conjunction with the terms circumferential, or radial, relative to the longitudinal axis 414.

Figure 30:
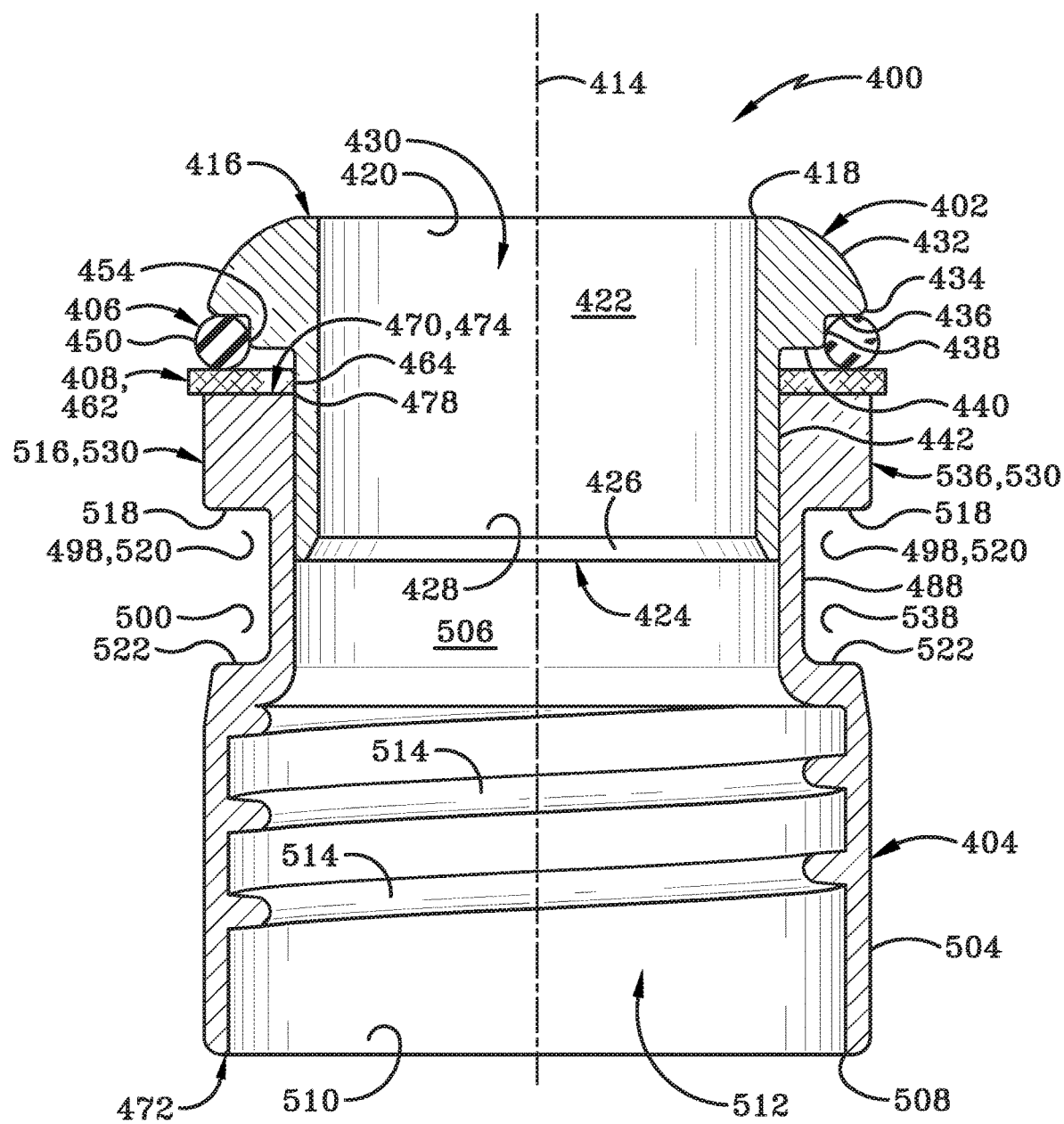
FIG. 30 is a longitudinal cross section taken along line 30-30 in FIG. 29.
Figure 31:
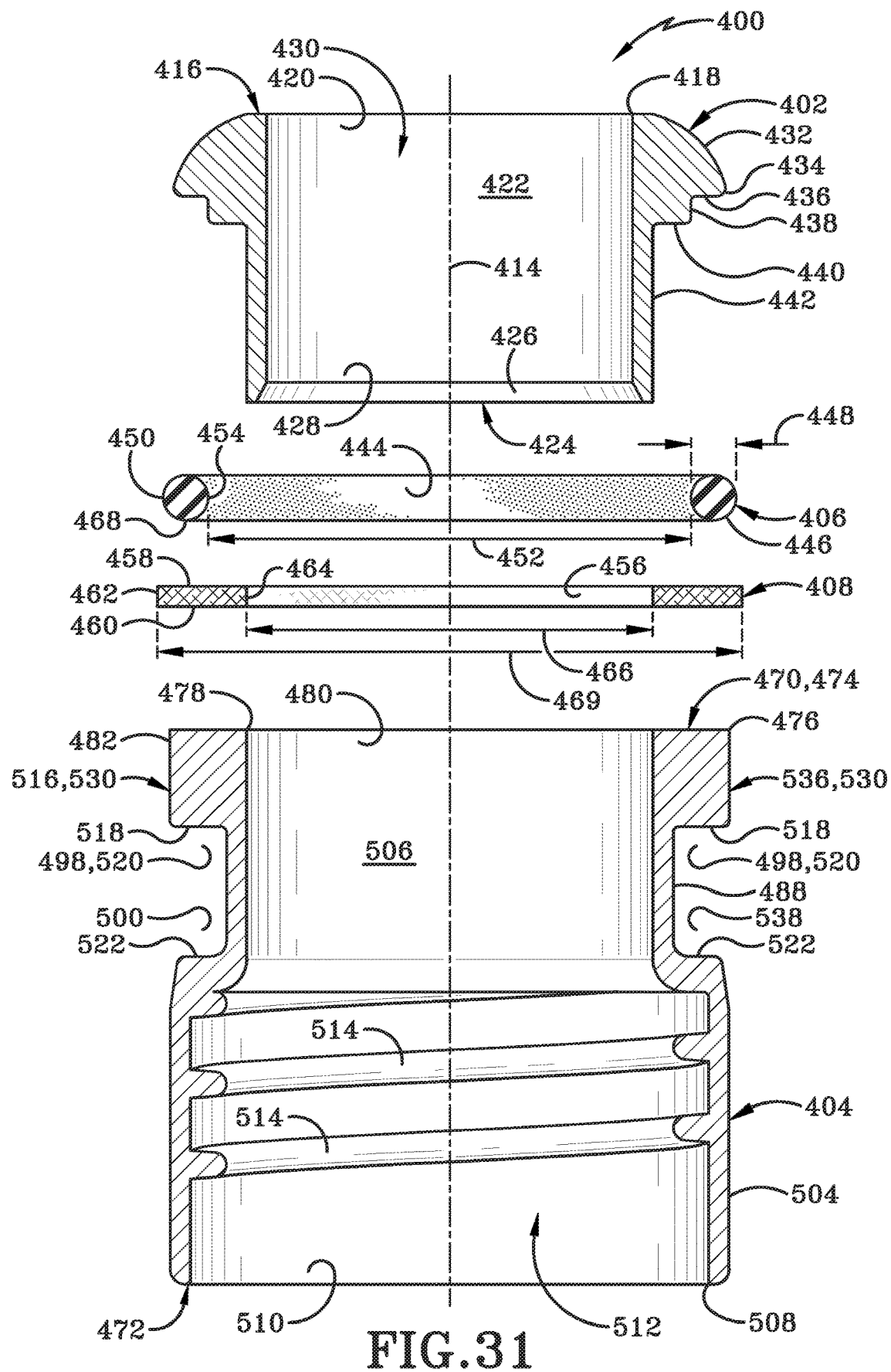
FIG. 31 is an exploded longitudinal cross section of the hose plug of FIG. 28.

As depicted in FIG. 30 and FIG. 31, first section 402 includes a first end 416, which also defines first end 410 of the hose plug 400. First end 416 extends circumferentially around longitudinal axis 414 and defines an inner annular edge 418 defining an opening 420. A cylindrical inner surface 422 extends longitudinally from inner edge 418 to an opposing second end 424. An annular chamfered edge 426 is adjacent to the second end 424 and defines a second opening 428. Chamfered edge 426 circumscribes longitudinal axis 414 such that a first bore 430 defined by the cylindrical inner surface 422 extends between first opening 420 and second opening 428.

First section 402 further includes an annular exterior curved wall 432, which curves downwardly from the first end 416 and curves radially outward from the longitudinal axis 414. The annular curved wall 432 is convexly curved between the first end 416 and a terminal end 434, which is the radial outermost portion of the first section 402. A first ledge 436 extends radially inward from the terminal end 434 to a wall 438 that extends generally parallel to the longitudinal axis 414. A second ledge 440 extends radially inward from the wall 438. The second ledge 440 extends radially inward to a longitudinally extending exterior cylindrical wall 442. A cylindrical wall 442 extends longitudinally to the second end 424. Wall 442 may be parallel to axis 414.

The first ledge 436 is positioned closer to the first end 416 than the second edge 440. Stated otherwise, the second edge 440 is positioned closer to the second end 424 than the first ledge 436. The first ledge 436 has a radius that is larger than the second ledge 440. The first ledge 436 is an annular ledge that extends circumferentially around the longitudinal axis 414. The second ledge 440 is an annular ledge that extends circumferentially around the longitudinal axis 414. The first ledge 436 and the second ledge 440 are concentric about the longitudinal axis 414. The longitudinally aligned length of cylindrical wall 442 is greater than that of wall 438 and curved wall 432. In one particular embodiment, the length of cylindrical wall 442 may be greater than the sum of the longitudinal length of wall 438 and curved wall 432, however other dimensional configurations are possible. Collectively, the curved wall 432, the first ledge 436, the wall 438, the second ledge 440, and the cylindrical wall 442 define an outer surface of the first section 402 that faces radially outward from the longitudinal axis 414. In one particular embodiment, first section 402 is formed from a uniform, monolithic member formed from a suitably rigid material so as to withstand deformation when the vacuum system of the present disclosure is in operation. First section 402 may be fabricated from a polymer material, however other rigid materials are entirely contemplated such as metal. Furthermore, the integral structure of the first section 402 may be formed from multiple elements having similar configurations as one having ordinary skill in the art would understand.

First seal 406 is a generally annular or ring-like member defining an interior aperture 444. In one particular embodiment, first seal 406 is generally shaped like a torus such that it has a convexly curved continuous outer surface 446. First seal 406 may generally be referred to as an O-ring having elastomeric properties. The first seal 406 is circular in cross section, having an interior diameter 448. Diameter 448 has a dimension that is greater than the radially aligned length of first ledge 436. As will be described in greater detail below, the diameter 448 of the cross section of first seal 406 enables the outer tangential edge 450 of first seal 406 to extend radially outward from the terminal end 434 of curved wall 432. First seal 406 includes an inner diameter 452 measured through the longitudinal axis 414 between opposing inner tangential edges 454. The inner diameter 452 of first seal 406 is slightly greater than a diameter of the first section 402 measured through longitudinal axis 414 between opposing walls 438 between the first and second ledges 436, 440. As will be described in greater detail below, the first seal 406 is configured to snugly fit and nest with the first ledge 436 and the wall 438. Diameter 448, of a cross section of the first seal 406, is greater in dimensional length the wall 438. Accordingly, the first seal 406 will extend below (i.e., towards the second end 412) the second ledge 440, when the first seal 406 is installed on the hose plug 400.

Second seal 408 is positioned towards the second end 412 from the first seal 406. Second seal 408 is an annular member defining an interior aperture 456, that is concentric about the longitudinal axis 414, and is concentric with the first seal 406. Unlike the first seal 406, which has a continuous convexly curved outer surface 446, the second seal 408 includes an annularly planar first surface 458, and an opposing annularly planar second surface 460. A short, longitudinally extending cylindrical side wall 462 extends between the first surface 458 and the second surface 460. An inner cylindrical side wall 464 extends between the first surface 458 and the second surface 460.

Second seal 408 includes an inner diameter 466, which is measured between opposing inner walls 464, extending through the longitudinal axis 414. The inner diameter 466 of second seal 408 is less than the inner diameter 452 of first seal 406. Inner diameter of 466 of second seal 408 is configured to be slightly larger than the outer diameter of the first section 402 measured between opposing cylindrical walls 442 through the longitudinal axis 414. Accordingly, the second seal 408 is configured to snugly fit adjacent cylindrical wall 442 on first section 402, positioned below the first seal 406. In one particular embodiment, the annularly planar and flat first surface 458 of second seal 408 is positioned and nests against a bottom tangential edge 468 on first seal 406. Second seal 408 includes an outer diameter 469 that is measured through the longitudinal axis 414 to the outer cylindrical wall 462. The outer diameter 469 of second seal 408 is slightly larger than the outer diameter of first seal 406. Accordingly, when the hose plug 400 is assembled, the second seal 408 has the greatest radial length relative to the longitudinal axis 414 on the hose plug 400. As will be described in greater detail below, the second seal 408, having the widest or greatest radial portion of the hose plug 400, enables a proper seal to be established between the hose plug 400 and the valve box assembly.

Second seal 408 may be fabricated from a type of fabric material such as felt. In one particular embodiment, second seal 408 provides a sealing arrangement that is flexible in the manner so as to prevent debris and other aggregate materials from passing by the second seal 408 when it is engaged with a portion of the box top assembly 225 or the conduit for the same. However, it is envisioned that felt-like material forming the second seal 408 does not need to be completely air-tight or hermetic because the first seal 408 establishes the hermetic seal between the hose plus 400 and an inner surface of the conduit of the box top assembly. However, it is clearly envisioned the second seal 408 may form a hermetic seal and include the properties of precluding aggregate materials or other dust particles from passing thereby. Furthermore, while it is envisioned that the elastomeric first seal 406 be positioned closer to the first end 410 of the hose plug 400, it is entirely possible for the first and second seal to be switched such that the felt material of the second seal 408 is positioned closer to the first end 410 of the hose plug 400.

Second section 404 includes a first end 470 opposite a second end 472 aligned along the longitudinal axis 414. The first end 470 is defined by an annular surface 474 bound by an outer edge 476 and an inner edge 478 defining an opening 480. A cylindrical wall 482 extends downwardly from the first end 470 to a terminal end 484. A ledge 486 extends radially inward from the terminal end 484 to an inner cylindrical wall 488. In one particular embodiment, cylindrical wall 482 and cylindrical wall 488 are substantially parallel to the longitudinal axis 414. Additionally, the ledge 486 is substantially perpendicular to the longitudinal axis 414.

Figure 29:
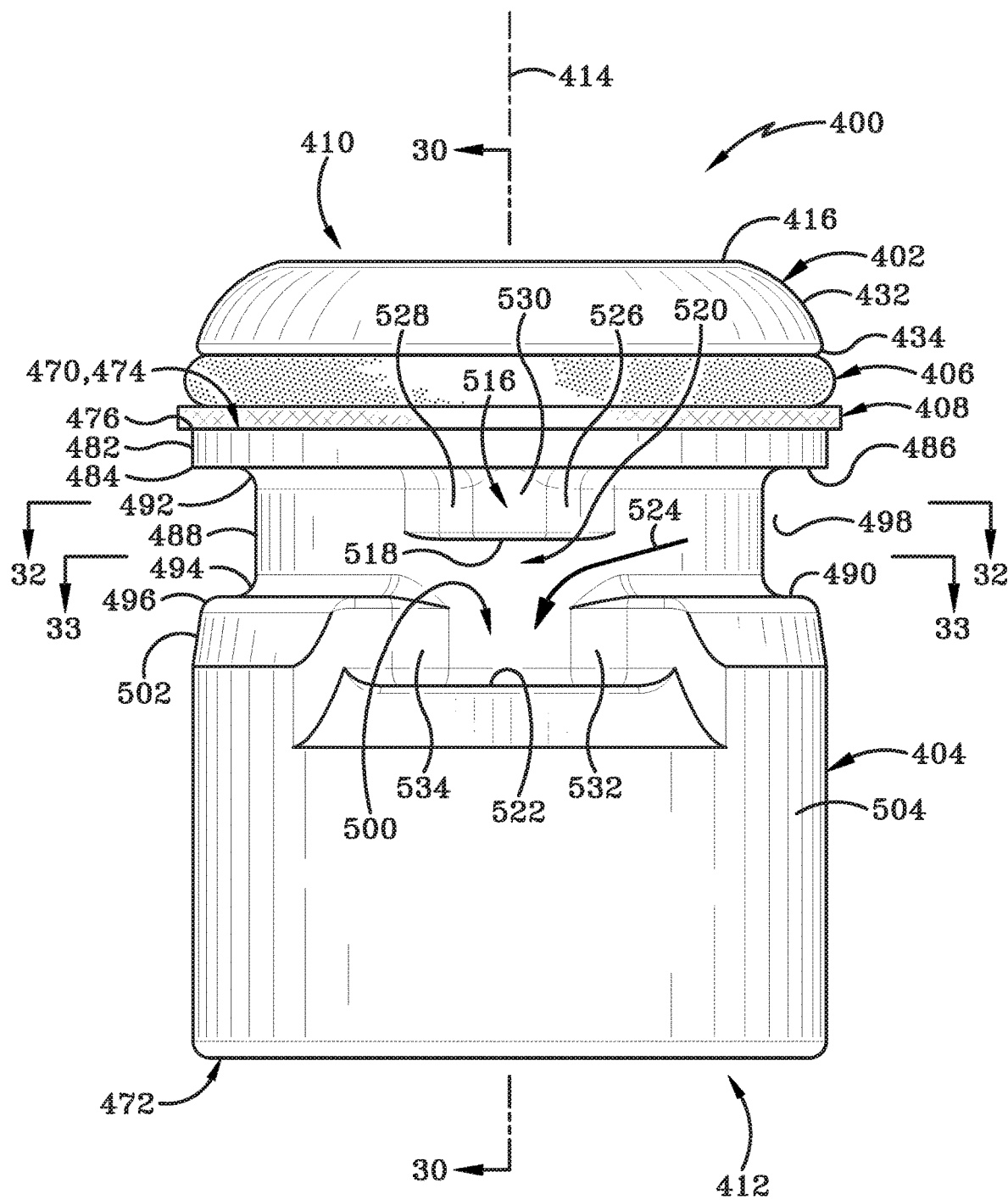
FIG. 29 is a side elevation view of the hose plug depicted in FIG. 28.

Second section 404 includes a first end 470 opposite a second end 472 aligned along the longitudinal axis 414. The first end 470 is defined by a planar annular surface 474 bound by an outer edge 476 and an inner edge 478 defining an opening 480. A cylindrical wall 482 extends downwardly from the first end 470 to a terminal end 484. A ledge 486 extends radially inward from the terminal end 484 to an inner cylindrical wall 488. In one particular embodiment, cylindrical wall 482 and cylindrical wall 488 are substantially parallel to the longitudinal axis 414. Additionally, the ledge 486 is substantially perpendicular to the longitudinal axis 414. Ledge 486 extends in a radial manner between the terminal end 484 and an inner corner 492. In one particular embodiment, the ledge 486 is a continuous annular edge having a radially aligned length between the terminal end 484 and the inner corner 492 that is in a dimensional range slightly greater than the first ledge 436. The inner cylindrical wall 488 extends longitudinally between the inner corner 492 and a second inner corner 494. The longitudinal length of the inner cylindrical wall 488, between the first and second inner corners 492, 494, is slightly longer than the dimensional length of the button 267 extending through the sleeve 257. Portions of the button 267 are configured to engage the inner wall 488 in a contacting manner. The bottom ledge 490 extends radially outward from the second corner 494 to an outer end 496. In one particular embodiment, the lower ledge 490 faces an opposite direction of the ledge 486, such that the faces of the ledges 489, 490 face each other. In one particular embodiment, the surface defined by the ledge 490 is not continuous in as much as a portion of the second section 404 defines a longitudinally aligned slot 500 (FIG. 29). Collectively, the ledge 486, the inner wall 488, and the second ledge 490 define an annular channel 498 configured to receive the buttons 267 therein. The annular channel 498 extends substantially around the hose plug 400 concentrically about the longitudinal axis 414.

A tapered section 502 extends longitudinally from the outer edge 496 toward the second end 472 of the second section 404. The tapered section 502 joins a cylindrical side wall 504 to extend generally longitudinal and parallel to the longitudinal axis 414 toward the second end 472. In one particular embodiment, the tapered section 502 is angled relative to the longitudinal axis 414 in a range from about one degree to about ten degrees.

Second section 408 includes an inner surface 506 extending from the first end 470 to the second end 472. An inner annular edge 508 defines a second end opening 510 such that a hollow bore 512 is in open communication with the opening 480 and the opening 510, as defined by the inner surface 506. The inner surface 506 may further include spiraling threads 514, which are sized to threadably connect with a portion of the hose 285. More particularly, the threads 514 are configured to threadably mate with the distal end 286 of the hose 285. Stated otherwise, the hose 285 is configured to be inserted into the bore 512 of second section 404 by inserting the distal end 286 of the hose 285 through the second end opening 510 and releasably and threadably attaching the second section 404 to the hose 285 via the threads 514, which mate with an exterior portion of the hose 285. However, this to be understood that the hose plug 400 may be embodied similar to the other embodiment contained herein such that the cylindrical side wall 504 of the second section 404 is inserted into the distal end 286 of the hose 285, and secured by a frictional interference fit or another type of connection fit, such as a mechanical connection, such as a screw, or a chemical connection, such as an adhesive.

As depicted in FIG. 29, a first cam 516 extends radially outward from the longitudinal axis 414. First cam 516 is positioned within annular channel 498. First cam 516 is connected with the inner cylindrical wall 488, includes a lower edge 518 that is positioned between the ledge 486 and the ledge 490. Accordingly, a portion 520 of the annular channel 498 extends continuously below the lower ledge 518 of the first cam 516 and above the ledge 490. The portion 520 of the annular channel 498 extending below the lower ledge 518 is in open communication with the slot 500 that is longitudinally aligned with the first cam 516 relative to the longitudinal axis. The slot 500 extends towards the second end 472 to a lower ledge 522. As indicated by the path of travel arrow 524, and as will be described in greater detail below, the button 267 is able to bypass the first cam 516 and slide down into the slot 500 by crossing through the portion 520 of the channel 498 that is positioned below the lower ledge 518, and above the ledge 490.

The first cam 516 includes mirroring sloped surfaces. More particularly, first cam 516 includes a first sloped surface 526 and a second sloped surface 528. In one particular embodiment, the surfaces 526, 528 are convexly curved between an apex 540 of the cam 516, and the inner cylindrical wall 488. In another particular embodiment, the surfaces for 526, 528 are concavely curved between the apex 530 and the inner cylindrical 488. The apex 530 may define a convexly curved protrusion configured to depress the button 267 retained within the housing.

Second section 404 may further include a first sloped wall 532 and a second sloped wall 534 extending adjacent the longitudinal slot 500. The sloped walls 532, 534 extend along the slot 500 and are positioned below the bottom ledge 490 when viewed from the side. In one particular embodiment, the sloped walls 532, 534 are positioned along a similar longitudinal dimension as the tapered wall 502. Stated otherwise, the tapered wall 502 is interrupted by downwardly sloping walls 532, 534 which slope radically inward towards the cylindrical wall 488 in order to define slot 500 collectively with the lower ledge 522. In one particular embodiment, the sloped walls 532, 534 may be concavely curved, may have a flat slope, or may be convexly curved. Lower ledge 522 is longitudinally aligned with the cam 516.

As depicted in FIG. 30, when viewed in cross section, the hose plug 400 may be formed from multiple components arranged together. The first seal 406 engages ledge 436 and wall 438, and extends radially beyond the terminal end 434. The lower tangential edge 468 of the first seal 406 engages the first surface 458 of the second seal 408. The second surface 460 of the second seal 408 engages the annular surface 474 defined by the first end 470 of the second section 404. The outer end 462 of the second seal 408 defines the radial outermost portion of the hose plug 400.

With continued reference to FIG. 30, the first section 402 is inserted into the second section 404. More particularly, the cylindrical side wall 442 of the first section 402 is inserted through the opening 480 into the bore 512 of the second section 404. The frictional interference fit between the first section located inside the second section 404 sandwiches and compressingly seals and press fits the first seal 406 and the second seal 408 into position. The second end 424 of the first section 402 is disposed longitudinally between the inner corner 492 and the second inner corner 494.

Figure 32:
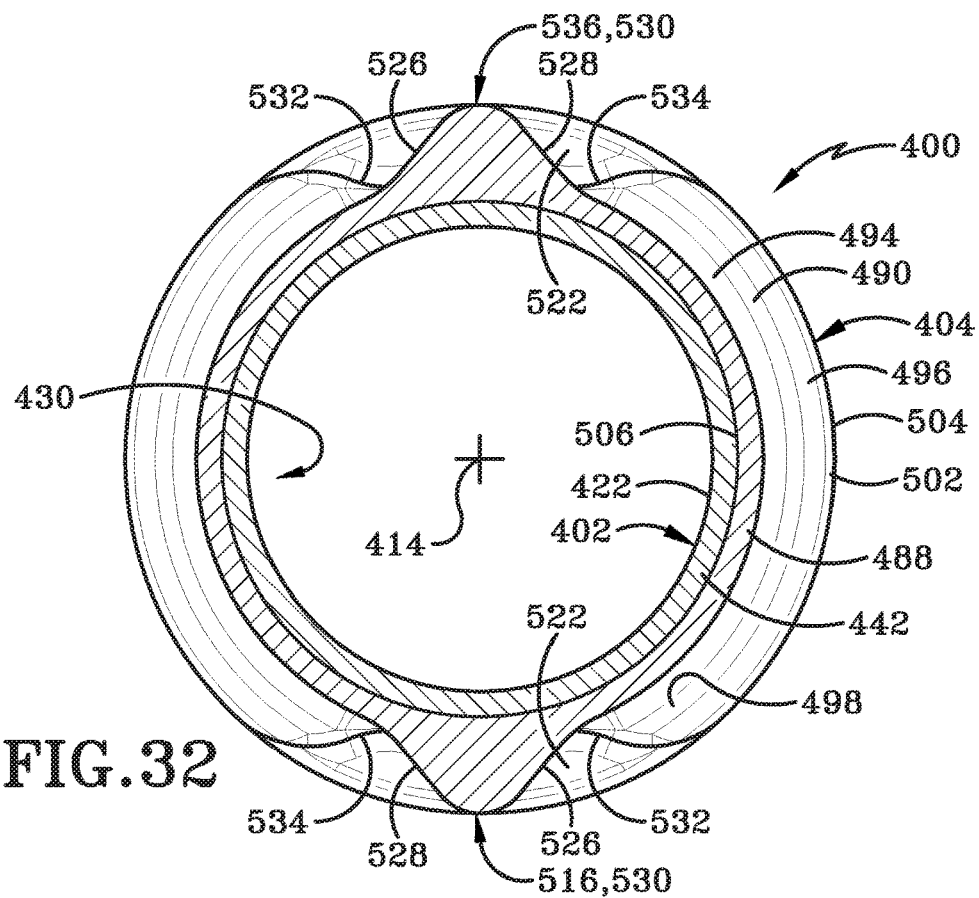
FIG. 32 is a cross section view of the hose plug taken along line 32-32 in FIG. 29.

FIG. 32 depicts a cross section of the hose plug 400 depicting that a second cam 536 may be positioned diametrically opposite the first cam 516. The second cam 536 may have a similar structure as the first cam 516 so as to include first and second sloped surfaces 526, 528 and an apex portion 530. The purpose of the second cam 536 being located diametrically opposite the first cam 516 relative to longitudinal axis 414 is to simultaneously depress the buttons 267 upon a rotational action of the hose plug 400, as indicated by arrow A in FIG. 35.

Figure 33:
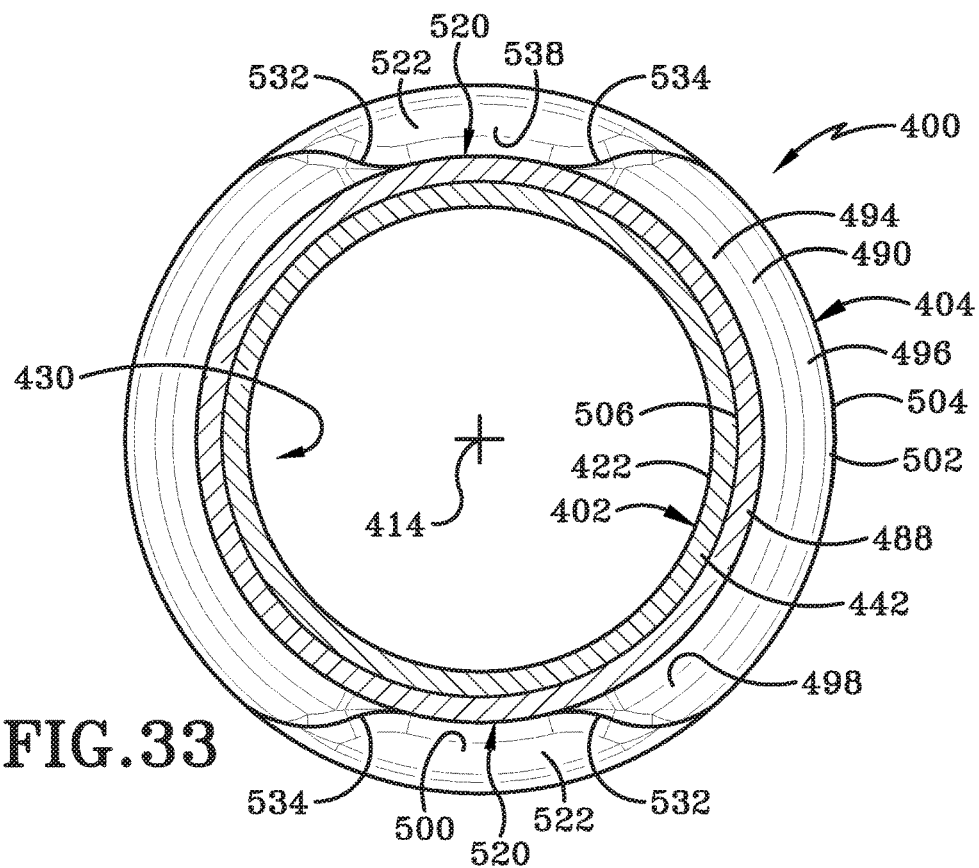
FIG. 33 is a cross section view of the hose plug taken along line 33-33 in FIG. 29.

FIG. 33 depicts that a second slot 538 may be located diametrically opposite the first slot 500 and include similar sloped walls 532 and 534. The purpose of the second slot 538 being located diametrically opposite the first slot 500 is to enable the buttons 267 to slide into the slot 538 and bypass the second cam 536 in the event the button 267 follows the path of arrow 524, as best shown in FIG. 29. Thus, the first cam is longitudinally aligned with the first slot and the second came is longitudinally aligned with the second slot.

FIG. 34 depicts an enlarged view of the hose plug 400 inserted into the sleeve 257 with the buttons 267 disposed in the annular channel 498. In this connected position, the hose plug is secured within the sleeve 257 within the interior 258 of box top 225. The first and second seals 406, 408 engage an inner surface 540 of the sleeve 257. The double seal of the first and second seals 406, 408 ensure the hose plug 400 adequately seals the conduit such that the vacuum suction extends fully through the conduit of the hose 285, and not there around. In order to remove the hose plug 400 from the sleeve 257, an operator will rotate the hose plug 400 in the direction of arrow B. A slight downward force may be pulled on the hose 285 to establish a physical connection between the buttons 267 and the ledge 486. The buttons 267 ride along the ledge 486 and are rotated in the direction of arrow B. The cams 516, 536 will engage the respective diametrically opposite buttons 267 and depress the same in the direction of arrow 542. When the buttons are fully depressed and are substantially even with the aperture formed in the wall 259, the hose plug 400 may be longitudinally pulled outward.

As depicted in FIG. 35, there may be instances in which the rotation in the direction of arrow B of hose plug 400 occurs but the desired effect is not to pull the hose plug 400 from its releasable connection with the sleeve 257. In these scenarios, the hose plug 400 may be rotated in the direction of arrow B with a slight inward pressure as indicated in arrow C, such that the buttons 267 do not ride along the upper edge 486 and get depressed by the first and second cams 516, 536. Rather, the slight inward pressure in the direction of arrow C enables the buttons 267 to follow the path of arrow 524 (FIG. 29) and to slide down within the slots 500, 538. When the buttons 267 are in the slots 500, 538, a user may continue to forcibly push the hose plug 500 in the direction of arrow C, and rotate the hose plug in the direction of arrow B. This will allow the buttons to depress as they are urged inward by the sloped walls 532, 534, which are positioned on either side of the slots 500, 538. The sloped walls 532, 534 may push in the buttons 267 in the direction of arrow 542, so as to be substantially even with the wall 259, and the tapered wall 502 may continue to maintain the buttons 267 in a depressed and retracted state as the hose plug 400 is continued to be pushed inwardly in the direction of arrow C. The effectuates the hose plug 400 being pushed into the sleeve 257 in the box top 225, so as to move the entire hose assembly from the extended position to the retracted and stored position.

FIG. 35 further depicts the method of operating a vacuum hose comprising: rotating a vacuum hose having a hose plug connected to a distal end thereof about a longitudinal axis; effecting a biased button to move through an annular channel formed in the hose plug; moving the biased button in the annular channel below a cam; and moving the biased button into a slot formed in the hose plug orthogonal to the annular channel to prevent the vacuum hose from inadvertently being disconnected by the cam affecting the biased button.

An exemplary summary embodiment of the present disclosure may provide the hose plug 400 for connection with a vacuum hose conduit comprising: the first end 410 opposite the second end 412 defining the longitudinal direction therebetween; the longitudinal axis 414 extending from the first end to the second end; the first endwall (i.e., wall 432) that is convexly curved and oriented circumferentially around the longitudinal axis; a first channel disposed towards the second end from the first endwall and oriented circumferentially around the longitudinal axis, wherein the first channel is defined by the area or space bound by the ledge 436 and wall 438; the elastomeric O-ring or first seal 406 inserted in the first channel; the second channel disposed towards the second end from the first channel and oriented circumferentially around the longitudinal axis, wherein the second channel is defined by the area or space bound by the ledge 440 and wall 442; the flexible ring, such as second seal 408, inserted in the second channel; the annular ledge 486 disposed towards the second end from the second channel and oriented circumferentially around the longitudinal axis 414; the annular channel 498, which may also be referred to as a third channel, at least partially defined by the annular ledge such that the third channel is substantially disposed towards the second end from the second channel; the first cam 516 disposed within the third channel (i.e., channel 498) adjacent the annular ledge adapted to release the button 267 in positioned in the box top housing, wherein the button snaps into the third channel to secure the hose plug 400 to the housing; the first slot 500 longitudinally aligned with the first cam 516 extending towards the second end in open communication with the third channel 498 adapted to receive the button therein; and the cylindrical section or wall 504 extending towards the second end from the third channel 498, wherein the cylindrical section defines the slot 500.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed is:

1. A hose plug for connection with a vacuum hose conduit comprising:
   a first end opposite a second end defining a first direction therebetween;
   a first axis extending in the first direction from the first end to the second end;

a first wall defining at least a portion of a channel;

a first cam positioned within the channel adapted to depress a component associated with a valve for the vacuum hose conduit as the hose plug rotates about the first axis, wherein the first cam defines a rounded polygon in cross section, wherein the first cam includes a lower edge that extends radially outward from the first axis and is positioned within the channel; and a lower ledge of the channel that is closer to the second end than the lower edge of the first cam, wherein a lower portion of the channel extends continuously below the lower edge of the first cam and above the lower ledge of the channel.

2. The hose plug of claim 1, wherein the first cam includes:

a first sloped surface extending from the first wall.

3. The hose plug of claim 2, wherein the first sloped surface is offset from the first axis and oriented in a manner that at least 50% of lines tangent to the first sloped surface do not intersect the first axis.

4. The hose plug of claim 2, wherein the first sloped surface is offset from the first axis and oriented in a manner that every tangent line to the first sloped surface does not intersect the first axis.

5. The hose plug of claim 2, wherein the first sloped surface is flat and of a constant slope.

6. The hose plug of claim 2, wherein the first sloped surface is concavely curved.

7. The hose plug of claim 2, wherein the first sloped surface is convexly curved.

8. The hose plug of claim 2, wherein the first cam further includes:

a second sloped surface; and an apex;

wherein the apex is intermediate the first and second sloped surfaces.

9. The hose plug of claim 8, further comprising:

a second wall extending towards the second end of the hose plug from the channel, wherein the second wall has a larger dimension than the first wall;

wherein the apex has a dimension that is greater than the first wall and approximates the dimension of the second cylindrical wall.

10. The hose plug of claim 8, further comprising:

an O-ring offset towards the first end of the hose plug from the first cam.

11. A hose plug for connection with an end of a vacuum hose comprising:

a first end opposite a second end defining a longitudinal direction therebetween, and the second end adapted to connect with the vacuum hose and the first end adapted to connect with a vacuum hose conduit;

a longitudinal axis extending from the first end to the second end;

a cylindrical wall extending longitudinally between the first end and the second end, and the cylindrical wall defining an interior bore adapted to receive vacuumed debris therethrough after passing through the vacuum hose and the cylindrical wall defining an annular channel;

a first seal extending circumferentially around the longitudinal axis exterior to the first cylindrical wall;

a first cam positioned within the annular channel adapted to depress a component associated with a valve for the vacuum hose conduit as the hose plug rotates about the longitudinal axis, wherein the first cam defines a rounded polygon in cross section, wherein the first cam includes a lower edge that extends radially outward from the longitudinal axis and is positioned within the channel;

a lower ledge of the annular channel that is closer to the second end than the lower edge of the first cam, wherein a portion of the channel extends continuously below the lower edge of the first cam and above the lower ledge of the channel;

an apex on the first cam; and wherein the apex and an outer edge of the first seal have a similar radius relative to the longitudinal axis.

12. The hose plug of claim 11, wherein the first seal is an elastomeric O-ring, and wherein the first cam is positioned closer to the second end than the seal.

13. The hose plug of claim 11, wherein the first cam includes:

a first sloped surface extending radially from the first cylindrical wall.

14. The hose plug of claim 13, wherein the first sloped surface is flat and of a constant slope.

15. The hose plug of claim 13, wherein the first sloped surface is concavely curved.

16. The hose plug of claim 13, wherein the first sloped surface is convexly curved.

\* \* \* \* \*